(12) United States Patent
Xiong et al.

(10) Patent No.: US 12,513,794 B2
(45) Date of Patent: *Dec. 30, 2025

(54) LIGHT-EMITTING DIODE LAMP ILLUMINATION SYSTEM, AND DIMMER AND LIGHT-EMITTING DIODE LAMP THEREOF

(71) Applicant: JIAXING SUPER LIGHTING ELECTRIC APPLIANCE CO., LTD., Jiaxing (CN)

(72) Inventors: Aiming Xiong, Jiaxing (CN); Lin Zhou, Jiaxing (CN); Junren Chen, Jiaxing (CN)

(73) Assignee: Jiaxing Super Lighting Electric Appliance Co., Ltd., Zhejiang (CN)

( * ) Notice: Subject to any disclaimer, the term of this patent is extended or adjusted under 35 U.S.C. 154(b) by 71 days.

This patent is subject to a terminal disclaimer.

(21) Appl. No.: 17/987,854

(22) Filed: Nov. 15, 2022

(65) Prior Publication Data

US 2023/0189409 A1    Jun. 15, 2023

Related U.S. Application Data

(63) Continuation-in-part of application No. 17/982,810, filed on Nov. 8, 2022, now Pat. No. 11,838,999, (Continued)

(30) Foreign Application Priority Data

Jul. 16, 2018  (CN) .......................... 201810777596.4
Nov. 13, 2018  (CN) .......................... 201811347102.5
(Continued)

(51) Int. Cl.
    *H05B 45/10*    (2020.01)
    *H05B 45/20*    (2020.01)
(Continued)

(52) U.S. Cl.
    CPC ............. *H05B 45/10* (2020.01); *H05B 45/20* (2020.01); *H05B 47/185* (2020.01);
(Continued)

(58) Field of Classification Search
    CPC .... H05B 45/10; H05B 45/20; H05B 45/3725; H05B 47/11; H05B 47/185; H05B 45/31;
(Continued)

(56) References Cited

U.S. PATENT DOCUMENTS 6,459,919 B1    10/2002    Lys et al.
7,889,051 B1    2/2011     Billig et al.
(Continued)

FOREIGN PATENT DOCUMENTS

CN    201607820 U    10/2010
CN    102036458 A    4/2011
(Continued)

*Primary Examiner* — Minh Tran
(74) *Attorney, Agent, or Firm* — Muir Patent Law, PLLC

(57)  ABSTRACT

The disclosure provides an LED lamp lighting system, a dimmer and an LED lamp thereof, wherein the dimmer is configured to adjust the LED lamp. The LED lamp is powered by the dimmer, and the dimmer includes: a dimming signal generating module, receiving a dimming command, and outputting a dimming signal based on the received dimming command; a signal synthesis module, coupled to the dimming signal generating module and electrically connected to an output end of the dimmer, and configured to adjust the power supply signal generated by the dimmer based on the dimming signal, so as to output the modulated power supply signal synthesized with the dimming command, wherein, the AC component in the waveform of the modulated power supply signal is configured to describe the dimming command.

17 Claims, 44 Drawing Sheets

Related U.S. Application Data which is a continuation of application No. 17/377,545, filed on Jul. 16, 2021, now Pat. No. 11,497,092, application No. 17/987,854 is a continuation-in-part of application No. PCT/CN2021/094123, filed on May 17, 2021, said application No. 17/377,545 is a continuation of application No. 16/681,019, filed on Nov. 12, 2019, now Pat. No. 11,071,178, which is a continuation-in-part of application No. 16/511,575, filed on Jul. 15, 2019, now Pat. No. 11,191,136.

(30) Foreign Application Priority Data

| | | |
|---|---|---|
| Jul. 11, 2019 | (CN) | 201921080528.9 |
| May 15, 2020 | (CN) | 202010413742.2 |
| Jul. 24, 2020 | (CN) | 202010720416.6 |
| Jul. 29, 2020 | (CN) | 202010742063.X |
| Jul. 31, 2020 | (CN) | 202010760133.4 |
| Jan. 13, 2021 | (CN) | 202110043681.X |

(51) Int. Cl.
 *H05B 47/185* (2020.01)
 *H05B 47/195* (2020.01)
 *H05B 45/3725* (2020.01)
 *H05B 47/19* (2020.01)

(52) U.S. Cl.
 CPC ....... *H05B 47/195* (2020.01); *H05B 45/3725* (2020.01); *H05B 47/19* (2020.01)

(58) Field of Classification Search
 CPC .... H05B 47/19; H05B 45/355; H05B 47/195; H04B 3/54
 See application file for complete search history.

(56) References Cited

U.S. PATENT DOCUMENTS

| | | | |
|---|---|---|---|
| 8,773,031 B2 | 7/2014 | Sadwick et al. | |
| 9,084,319 B2 | 7/2015 | Sullivan et al. | |
| 9,131,581 B1 | 9/2015 | Hsia et al. | |
| 9,144,127 B1 | 9/2015 | Yu et al. | |
| 9,161,401 B1 | 10/2015 | Melanson et al. | |
| 9,161,415 B2 | 10/2015 | Catalano et al. | |
| 9,185,767 B2 | 11/2015 | Zanbaghi et al. | |
| 9,192,012 B2 | 11/2015 | Trinschek et al. | |
| 9,198,250 B2 | 11/2015 | Malyna et al. | |
| 9,210,757 B2 | 12/2015 | Tao et al. | |
| 9,220,150 B2 | 12/2015 | Hartmann et al. | |
| 9,258,864 B2 | 2/2016 | Pederson et al. | |
| 9,265,112 B2 | 2/2016 | Pederson et al. | |
| 9,265,119 B2 | 2/2016 | Catalano et al. | |
| 9,307,619 B2 | 4/2016 | Campbell | |
| 9,468,067 B2 | 10/2016 | Olariu | |
| 9,544,969 B2 | 1/2017 | Baddela et al. | |
| 9,743,467 B2 | 8/2017 | Malyna et al. | |
| 9,788,374 B1 | 10/2017 | Holleschau et al. | |
| 9,839,083 B2* | 12/2017 | van de Ven | H05B 45/20 |
| 9,930,743 B1* | 3/2018 | Wang | H05B 45/10 |
| 9,992,849 B1* | 6/2018 | Slivka | H05B 47/24 |
| 10,051,714 B2 | 8/2018 | Pederson | |
| 10,111,298 B2 | 10/2018 | Mezack et al. | |
| 10,182,484 B1* | 1/2019 | Thornton | H05B 47/24 |
| 10,236,174 B1* | 3/2019 | Miller | H05B 41/38 |
| 10,251,243 B2 | 4/2019 | Pederson | |
| 10,292,227 B1 | 5/2019 | Moumen | |
| 10,324,250 B2 | 6/2019 | Krames et al. | |
| 11,071,178 B2* | 7/2021 | Xiong | H05B 45/10 |
| 11,191,136 B2* | 11/2021 | Xiong | H05B 39/048 |
| 11,497,092 B2 | 11/2022 | Xiong et al. | |
| 2009/0160369 A1 | 6/2009 | Godbole et al. | |
| 2010/0259185 A1 | 10/2010 | Sadwick et al. | |
| 2011/0133655 A1 | 6/2011 | Recker et al. | |
| 2011/0275432 A1 | 11/2011 | Lutnick et al. | |
| 2012/0080944 A1 | 4/2012 | Recker et al. | |
| 2012/0299480 A1* | 11/2012 | Peting | H05B 45/3725 315/185 R |
| 2012/0299500 A1 | 11/2012 | Sadwick et al. | |
| 2013/0134903 A1 | 5/2013 | Neser et al. | |
| 2013/0141010 A1 | 6/2013 | Reed et al. | |
| 2013/0342120 A1* | 12/2013 | Creusen | H05B 45/48 315/193 |
| 2014/0049185 A1 | 2/2014 | Neser et al. | |
| 2014/0103810 A1 | 4/2014 | Shaffer, II et al. | |
| 2014/0128941 A1 | 5/2014 | Williams | |
| 2014/0361701 A1 | 12/2014 | Siessegger et al. | |
| 2015/0163878 A1 | 6/2015 | Dixon | |
| 2015/0216002 A1 | 7/2015 | Melanson et al. | |
| 2015/0237694 A1 | 8/2015 | Zudrell-Koch | |
| 2015/0237695 A1 | 8/2015 | Jelaca | |
| 2015/0237698 A1 | 8/2015 | Takahashi et al. | |
| 2016/0330808 A1 | 11/2016 | Brandt | |
| 2016/0374168 A1 | 12/2016 | Ackmann | |
| 2017/0079122 A1* | 3/2017 | Lee | H05B 47/19 |
| 2017/0223794 A1 | 8/2017 | Lewis et al. | |
| 2017/0374718 A1* | 12/2017 | Fang | H05B 45/46 |
| 2018/0027630 A1 | 1/2018 | DeJonge et al. | |
| 2019/0132923 A1* | 5/2019 | Rumer | H05B 45/22 |

FOREIGN PATENT DOCUMENTS

| | | |
|---|---|---|
| CN | 102958219 A | 3/2013 |
| CN | 103369802 A | 10/2013 |
| CN | 103379708 A | 10/2013 |
| CN | 103561503 A | 2/2014 |
| CN | 104427682 A | 3/2015 |
| CN | 204350401 U | 5/2015 |
| CN | 103561503 B | 7/2015 |
| CN | 105101540 A | 11/2015 |
| CN | 105191499 A | 12/2015 |
| CN | 105873269 A | 8/2016 |
| CN | 106793249 A | 5/2017 |
| CN | 103945600 B | 9/2017 |
| CN | 105191499 B | 9/2017 |
| CN | 107148804 A | 9/2017 |
| CN | 104582059 B | 10/2017 |
| CN | 103687154 B | 11/2017 |
| CN | 104540287 B | 11/2017 |
| CN | 105554953 B | 11/2017 |
| CN | 107409448 A | 11/2017 |
| CN | 206743585 U | 12/2017 |
| CN | 206807830 U | 12/2017 |
| CN | 104869690 B | 3/2018 |
| CN | 105873269 B | 5/2018 |
| CN | 108024415 A | 5/2018 |
| CN | 110996448 A | 4/2020 |
| WO | 2011064495 A1 | 6/2011 |
| WO | 2020015566 A1 | 1/2020 |

* cited by examiner

WF4

WF5

WF6

WF4

WF7

WF8

LIGHT-EMITTING DIODE LAMP ILLUMINATION SYSTEM, AND DIMMER AND LIGHT-EMITTING DIODE LAMP THEREOF

TECHNICAL FIELD

The present disclosure relates to the field of lighting appliances, in particular to an LED lamp lighting system, a dimmer, and an LED lamp thereof.

BACKGROUND

LED lighting technology is rapidly developing to replace traditional incandescent and fluorescent lamps. Comparing to fluorescent lamps filled with inert gas and mercury, LED straight tube lamps do not need to be filled with mercury. Therefore, various lighting systems for home or workplace dominated by lighting options with traditional fluorescent bulbs and tubes, LED lamps, such as LED straight tube lamps, LED bulbs, LED filament lamps, high watt LED lamps or all-in-one LED lamps are becoming highly anticipated lighting options with no surprise. The advantages of LED lamps include increased durability and lifespan, and lower energy consumption. As a result of considering all the factors, LED lamps would be the best lighting option.

In general LED lighting schemes, how to implement the dimming control the LED lamps is a widely discussed topic. In the existing dimming technology, one dimming method that adjusts the effective value of the input voltage by means of phase cutting/chopping, so as to realize the effect of dimming. However, since the integrity of the voltage waveform would be affected significantly by this dimming control method, various problems would be inevitably caused, such as reduced luminous efficiency and flickering of the LED lamp. Another method is to send the dimming signal to the driving circuit in the lamp through an independent signal line, so that the driving circuit can adjust the output voltage/current based on the received dimming signal, and then the luminance of the LED lamp can be controlled. However, in the application scenario set with multiple lamps, since each LED lamp needs to pull out one signal line to receive the dimming signal respectively, the complexity of LED lamp layout would be greatly increased, which is not conducive to implement the dimming control of multiple lamps.

Traditional incandescent lamps can adjust the luminance of the lamp through the thyristor (TRIAC), but when the thyristor is used in the LED lamps, although the dimming signal line is not needed, however, due to the nonlinear characteristics of the LED, the problem of LED lamps flickering might occur at low luminance, and the efficiency of LED lamps regulated by thyristors is poor.

In addition, there are many types of LED lamps on the market, but the current thyristor dimmers cannot be 100% compatible with LED lamps.

Digital Load Side Transmission (DLT), a digital wired dimming solution based on the power line carrier communication protocol bypasses the thyristor from the physical mechanism, and solves the compatibility problem between the LED lamps and dimmer switches (or dimmers). The compatibility between LED lamps with DLT dimming functionality and DLT dimming switches of different brands can reach 100%, which comes with zero flickering, smooth and noise-free dimming, and 1% minimum dimming depth. The cost is also comparable with the TRIAC solution, and the market development potential is expectable.

The DLT solution has great market potential, however, since the DLT solution was made public, due to the difficulty in developing the DLT dimming lamps, no mature solutions have appeared on the market. There are some obstacles to the real large-scale promotion and application of the DLT dimming solution.

Conventional circuit sensors (such as human body sensors, light sensors, etc.) generally use a resistance-capacitance (RC) buck conversion for power supply. The sensor of the whole circuit presents capacitive impedance, and the capacitive impedance would interfere with the power signal and affect the signal transmission on the power line, eventually causing the DLT dimming system to fail to work properly. In addition, the power supply circuit with RC driver is prone to fail when used in a power grid with wide voltage range. Therefore, the circuit sensor needs to be improved to be compatible with the DLT dimming system.

Furthermore, when the lighting system includes multiple lamps, and one or more lamps in the system fail and cause the entire lighting system to be paralyzed, it is impossible to perform efficient maintenance by simply replacing the lamps.

In addition, there is a kind of dimmer that can only add a signal line in addition to the power line to complete the dimming. This kind of dimmer adds a switch to the signal line, and uses the switch signal to perform two-level dimming. The cost is low, however, continuous dimming cannot be implemented thereby.

Among the existing wireless signal control technologies, infrared technology is relatively mature and low in cost, and can be used as a wireless control solution.

However, the transmission of infrared rays are directional, and the signal attenuates with the increase of distance. When it is necessary to control the cluster of lamps, some of the lamps might not receive the control signal normally and cannot be controlled synchronously. When there is an obstacle between the remote controller and the lamp, the lamp cannot be normally controlled.

In view of the above problems, the present disclosure and its embodiments are proposed below.

SUMMARY

Numerous embodiments relating to the present disclosure are described in this summary. However, the term "disclosure" is only used to describe certain embodiments disclosed in this specification (whether in the claims or not), rather than a complete description of all possible embodiments. Certain embodiments of the various features or aspects described below as "the present disclosure" can be combined in various ways to form an LED straight tube light or a portion thereof.

In some embodiments of the present disclosure, an LED lamp lighting system comprising: a dimmer, an input end of the dimmer is electrically connected to a first external power input end and is configured to receive an external power signal to generate a dimming signal; and an LED lamp, electrically connected to a first output end, a second output end and a second external power supply input end of the dimmer to receive the dimming signal and adjust the luminance or color temperature of the LED lamp.

In some embodiments of the present disclosure, the LED lamp comprises: the LED lamp comprises: a demodulating module, electrically connected to the dimmer and configured to receive the dimming signal and convert the dimming signal into a dimming control signal; an LED driving module, electrically connected to the external power supply and the demodulating module, and configured to perform power conversion to the external power signal to generate a driving power and adjust the driving power based on the received dimming control signal; and an LED module, electrically connected to the LED driving module and configured to receive the driving power and light up.

In some embodiments of the present disclosure, the dimmer comprises a first switch and a second switch, a first pin of the first switch is electrically connected to the first external power input end, a second pin of the first switch is electrically connected to the LED driving module and is configured as a switch of the LED lighting system; and a first pin of the second switch is electrically connected to the second pin of the first switch, and a second pin of the second switch is electrically connected to the demodulating module and is configured to generate the dimming signal.

In some embodiments of the present disclosure, the first switch is a normally-opened switch; and the second switch is an inching switch and is configured to be normally-opened.

In some embodiments of the present disclosure, the dimmer comprises a first switch, a third switch and a fourth switch, a first pin of the first switch is electrically connected to the first external power input end, a first pin of the third switch and a first pin of the fourth switch are electrically connected to a second pin of the first switch, a second pin of the third switch is electrically connected to the LED driving module and the demodulating module, and a second pin of the fourth switch is electrically connected to the LED driving module and the demodulating module.

In some embodiments of the present disclosure, the third switch and the fourth switch are inching switches and are configured to be normally closed.

In some embodiments of the present disclosure, the third switch and the fourth switch are configured as cannot be turned off at the same time.

In some embodiments of the present disclosure, an LED lamp lighting system comprises: a dimmer, an input end of the dimmer is electrically connected to a first external power input end, configured to convert a received external power signal into a dimming power signal based on a dimming command, and the dimming power signal comprising dimming information; and an LED lamp, electrically connected to an output end of the dimmer and a second external power input end, and configured to execute a dimming operation based on a received dimming power signal.

In some embodiments of the present disclosure, the external power signal is a mains AC signal, and the dimmer executes a phase-cutting processing on the external power signal based on the dimming command to generate the dimming power signal.

In some embodiments of the present disclosure, a phase cutting angle of the phase-cutting processing is less than 90 degrees, and the degree of the phase cutting angle corresponds to the luminance of the LED lamp.

In some embodiments of the present disclosure, when the phase cutting angle is a constant value, the luminance of the LED lamp remains unchanged when the amplitude of the external power signal changes.

In some embodiments of the present disclosure, the dimmer comprises: a dimming signal generating module, configured to generate a dimming signal based on the received dimming command; a zero-crossing detecting module, electrically connected to the first external power input end and the second external power input end, and configured to detect a zero-crossing point of the external power signal and generate a zero-crossing signal; a data modulating module, electrically connected to the first external power input end, and configured to rectify the external power signal and load the dimming signal onto the external power signal to generate the dimming power signal; a filtering circuit, electrically connected to the data modulating module, and configured to filter the received rectified signal to generate a filtered signal; a power supply module, electrically connected to the filtering circuit, and configured to executed a power conversion to the filtered signal to generate a power supply signal for use of the dimmer; and a control module, electrically connected to the zero-crossing detecting module to receive the zero-crossing signal, start to execute the data modulation at a specific time after the zero-crossing, and load the dimming signal onto the external power signal to generate the dimming power signal.

In some embodiments of the present disclosure, the dimming signal generating module comprises a wireless remote controller and a signal receiving module, the wireless remote controller is configured to convert the dimming command into a wireless dimming signal, and the signal receiving module is configured to convert the wireless dimming signal into the dimming signal.

In some embodiments of the present disclosure, the dimming signal generating module comprises a light sensing module, and the light sensing module generates the dimming signal based on the intensity of ambient light.

In some embodiments of the present disclosure, the data modulating module comprises a first diode, a second diode, a first Zener diode, a first transistor, a second transistor and a third transistor; an anode of the first diode is electrically connected to the external power input end and a first pin of the first transistor, and a cathode of the first diode is electrically connected to a cathode of the second diode and a cathode of the first Zener diode; a second pin of the first transistor is electrically connected to a second pin of the second transistor and a first circuit node, and a third pin of the first transistor is electrically connected to the control module; a first pin of the second transistor is electrically connected to an anode of the second diode and an output end of the dimmer, and a third pin of the second transistor is electrically connected to the control module; and a first pin of the third transistor is electrically connected to an anode of the first Zener diode, and a second pin of the third transistor is electrically connected to the third pin of the second transistor, and a third pin of the third transistor is electrically connected to the control module.

In some embodiments of the present disclosure, the external power signal is mains alternating current, and within an AC half-wave (half an AC cycle), the data modulating module comprises three working stages: a supply stage, a power stage and a data phase.

In some embodiments of the present disclosure, the external power signal is configured to provide power to the dimmer in the supply stage, the external power signal is configured to provide power to the LED lamp in the power stage, and during the data stage, the dimmer is configured to load the dimming signal onto the external power signal to generate the dimming power signal.

In some embodiments of the present disclosure, in the supply stage, the first transistor and the second transistor are in an off state.

In some embodiments of the present disclosure, in the power stage, the first transistor and the second transistor are in a conducting state.

In some embodiments of the present disclosure, in the data stage, the first transistor and the second transistor work in the amplification region, and the third transistor is turned on intermittently.

In some embodiments of the present disclosure, the LED lamp lighting system further comprises a fault detecting module, the fault detecting module is electrically connected to the dimmer and is configured to bypass the dimmer and execute a fault detection.

In some embodiments of the present disclosure, the fault detecting module comprises a first switch, and the first switch is electrically connected to the input end and the output end of the dimmer.

In some embodiments of the present disclosure, the LED lamp lighting system further comprising a sensor electrically connected to the dimmer and the LED lamp and configured to change a circuit state of the sensor based on environmental variation.

In some embodiments of the present disclosure, the environmental variation is the intensity of ambient light, whether a human body or ambient sound is detected, and the like.

In some embodiments of the present disclosure, the sensor comprises: a rectifying circuit, electrically connected to an external power source and configured to rectify the received external power signal to generate a rectified signal; a filtering circuit, electrically connected to the rectifying circuit and configured to filter the rectified signal to generate a filtered signal; a power converting circuit, electrically connected to the filtering circuit and configured to execute a power conversion to the filtered signal to generate a low-voltage DC signal; a switch component, electrically connected to a power supply circuit of the LED lamp and serial connected with the LED lamp to turn the power supply circuit on or off; and a sensor control module, electrically connected to the power converting circuit and the switching component and configured to operate using the low-voltage DC signal, and control the on-off state of the switching component based on the environmental variation.

In some embodiments of the present disclosure, the rectifying circuit is a full-bridge rectifying circuit.

In some embodiments of the present disclosure, the filtering circuit comprises at least one capacitor.

In some embodiments of the present disclosure, the power converting circuit is a DC buck converter circuit.

In some embodiments of the present disclosure, the switch component comprises a MOSFET transistor or a relay.

In some embodiments of the present disclosure, an infrared repeater comprises: an infrared signal receiving module, configured to receive infrared control signal; an infrared signal amplifying module, electrically connected to the infrared signal receiving module and configured to amplify the infrared control signal; and an infrared signal transmitting module, electrically connected to the infrared signal amplifying module and configured to transmit the amplified infrared control signal.

In some embodiments of the present disclosure, the infrared signal transmitting module comprises a plurality of infrared transmitting components, and the infrared transmitting components are arranged in an array.

In some embodiments of the present disclosure, the infrared signal receiving module comprises a plurality of infrared receiving components, and the infrared transmitting components are arranged in an array.

In some embodiments of the present disclosure, the infrared repeater is powered by a battery or commercial power.

In some embodiments of the present disclosure, the infrared signal receiving module comprises: an infrared receiving probe, a first pin of the infrared receiving probe is electrically connected to a power supply end, and a third pin of the infrared receiving probe is electrically connected to a common ground end; an infrared emitting module comprising a first infrared light emitting diode; an infrared amplifying module, comprising a first capacitor, a first resistor, a second resistor, a third resistor, a fourth resistor, a fifth resistor and a sixth resistor, a first transistor, a second transistor and a third transistor, and a first MOSFET transistor, wherein, a second pin of the first capacitor is electrically connected to the common ground end, the first resistor and the third capacitor is connected in parallel, a first pin of the second resistor is electrically connected to a first pin of the first capacitor, a second pin of the second resistor is electrically connected to a first pin of the first transistor, a second pin of the first transistor is electrically connected to a second pin of the third resistor, a third pin of the first transistor is electrically connected to the common ground end, and a first pin of the third resistor is electrically connected to the power supply end, a first pin of the second transistor and a first pin of the third resistor are electrically connected to a second pin of the first transistor and a first pin of the fourth resistor, a second pin of the fourth resistor is electrically connected to the common ground end, a second pin of the second transistor is electrically connected to the power supply end, and a third pin of the second transistor is electrically connected to a second pin of the third transistor, a third pin of the third transistor is electrically connected to the common ground end, a first pin of the fifth resistor is electrically connected to a third pin of the second transistor, a second pin of the fifth resistor is electrically connected to a first pin of the first MOSFET transistor, a second pin of the first MOSFET transistor is electrically connected to the cathode of the first infrared light-emitting diode, a third pin of the first MOSFET transistor is electrically connected to the common ground, a first pin of the sixth resistor is electrically connected to the power supply end, and a second pin of the sixth resistor is electrically connected to the anode of the first infrared light emitting diode.

In some embodiments of the present disclosure, an LED lamp, comprises: a driving circuit, an LED module and a demodulating module, wherein the demodulating module is electrically connected to an external power supply and is configured to generate a dimming control signal based on dimming information comprised in an external power signal; the driving circuit is electrically connected to the external power supply and the demodulating module, and is configured to convert the received external power signal to generate a driving power supply, and adjust the driving power supply based on the dimming control signal; and the LED module is electrically connected to the driving circuit to receive the driving power and light up.

In some embodiments of the present disclosure, the external power signal is a DC signal.

In some embodiments of the present disclosure, the LED lamp further comprises a rectifying circuit and a filtering circuit, wherein, the rectifying circuit is electrically connected to an external power supply to rectify the external power signal to generate a rectified signal; the filtering circuit is electrically connected to the rectifying circuit, and is configured to filter the rectified signal to generate a filtered signal; and the filtered signal is configured to be provided the driving circuit.

In some embodiments of the present disclosure, the filtering circuit comprises at least one capacitor.

In some embodiments of the present disclosure, the rectifying circuit comprises a full-bridge rectifying circuit.

In some embodiments of the present disclosure, the driving circuit is a step-down DC converting circuit.

DETAILED DESCRIPTION

The present disclosure provides an LED lighting system, an LED dimmer, an LED lighting device and a dimming control method to solve the problems mentioned in the background art and the problems discussed above. In order to make the above objects, features and advantages of the present disclosure more clearly understood, the specific embodiments of the present disclosure would be described in detail below with reference to the accompanying drawings. The following descriptions of the embodiments of the present disclosure are for illustration and illustration only and are not intended to represent all the embodiments of the present disclosure or to limit the present disclosure to specific embodiments.

In addition, it should be noted that, in order to clearly illustrate the various disclosed features of the present disclosure, each embodiment is described below in the form of a plurality of embodiments. It does not mean, however, that each embodiment can only be implemented in isolation. Those skilled in the art can design by combining feasible implementation examples based on the requirements or replace the replaceable components/modules in different embodiments based on the design requirements. In other words, the embodiments taught in this case are not limited to the aspects described in the following embodiments, but also include the substitutions and arrangements among the various embodiments/components/modules where feasible, which would be described herein.

Figure 1A:
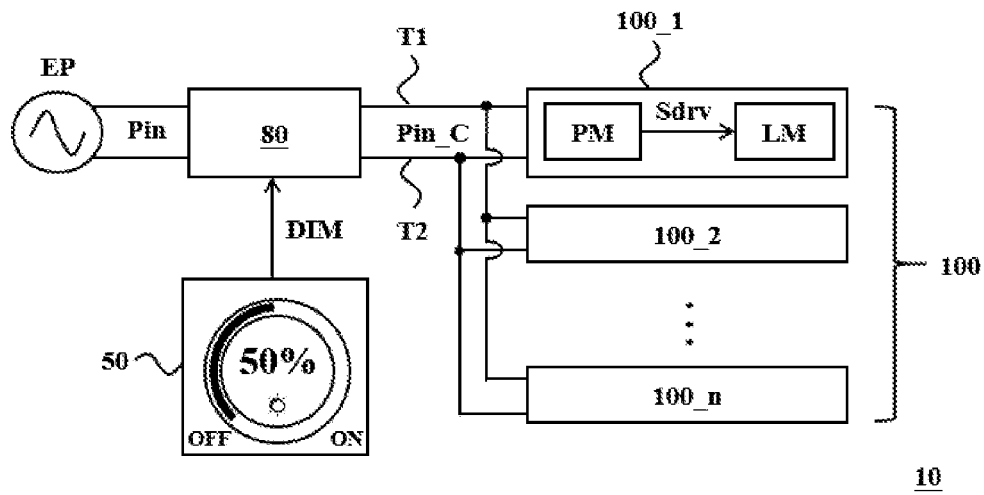
FIGS. 1A, 1B and 1C are schematic diagrams of functional modules of an LED lighting system in accordance with some embodiments of the present disclosure.

FIG. 1A is a schematic block diagram of an LED lighting system in accordance with some embodiments of the present disclosure. Referring to FIG. 1A, the LED lighting system 10 of this embodiment includes a dimmer 80 and an LED lighting device 100, wherein the LED lighting device 100 further includes a power module PM and an LED module LM. In some embodiments, the LED lighting system may also be referred to as an LED lamp lighting system.

In the LED lighting system 10, the input end of the dimmer 80 is electrically connected to the external power grid EP to receive the input power Pin from the external power grid EP. The output end of the dimmer 80 is electrically connected to the LED lighting device 100 through the first connecting end T1 and the second connecting end T2 of the LED lighting device 100, so as to provide the modulated power Pin_C after the dimming treatment to the LED lighting device 100. In other words, the external power grid EP is electrically connected to the LED lighting device 100 through the dimmer 80 to supply power to the LED lighting device 100 for use. As described herein, the input power supply Pin or the modulated power supply Pin_C can be an AC power supply and can be referred to at least any one of input voltage, input current and input power. The external grid EP can be mains electricity or ballasts. In addition, in the LED lighting system 10, the power supply circuit formed between the external power grid EP and the LED lighting device 100 can be defined as a bus bar.

The LED lighting device 100 can include one or more LED lighting devices 100_1-100_n (where the number of the LED device is represented as n, and n is a positive integer greater than or equal to 1), wherein each LED lighting device 100_1-100_n has a similar or the same configuration. The following takes the LED lighting device 100_1 as a representative to illustrate the electrical connection relationship of the LED lighting device 100 in the LED lighting system 10. The LED lighting device 100_1 receives the modulated power supply Pin_C from the first connecting end T1 and the second connecting end T2, wherein the power supply module PM generates the driving power Sdrv based on the modulated power supply Pin_C to provide the driving power Sdrv to the LED module LM, so that the LED module LM lights up in response to the driving power Sdrv. In the embodiment with a plurality of LED lighting devices 100_1-100_n (e.g., n≥2), each LED lighting device 100_1-100_n may be configured to be connected in parallel with each other, that is, the first connecting end T1 of each LED lighting device 100_1-100_n are electrically connected together, and the second connecting end T2 of each LED lighting devices 100_1-100_n are electrically connected together. In some embodiments, the driving power Sdrv can also be referred to as a driving signal.

In some embodiments, the LED lighting device 100 can be any type of LED lamp driven by AC power, such as LED spotlight, LED down light, LED bulb light, LED track light, LED panel light, LED ceiling light, LED straight tube lamps or LED filament lamps, etc., the present disclosure is not limited thereto. In the embodiment that the LED lighting device 100 is an LED straight tube lamp, the LED lighting device 100 can be a built-in driving type LED straight tube lamp, such as a ballast compatible (Type-A) straight tube lamp or a ballast bypass type (Type-B) straight tube lamp.

From the perspective of the overall operation of the LED lighting system 10, the dimmer 80 performs dimming processing onto the input power Pin based on the dimming command DIM and generates the processed modulated power Pin_C thereby. The user can instruct a corresponding dimming command DIM to the dimmer 80 through a control interface 50. The control interface 50 can be implemented in various forms such as a switch, a knob, a touch panel or a wireless signal receiver, which is not limited in this disclosure. In addition, based on what dimming process is selected to be implemented, the dimming process can include, changing the signal characteristics of the input power Pin, such as changing conducting angle, frequency, amplitude, phase or a combination thereof. The dimmer 80 includes at least one controllable electronic component (not shown) that is electrically connected to the bus bar or is capable of affecting the current/voltage of the bus bar, such as a thyristor, a single-chip microcomputer, a transistor, and the like. The controllable electronic components can adjust the signal characteristics of the input power Pin in response to the dimming command DIM, so that the input power Pin is converted into the adjusted modulated power Pin_C. In the configuration of the LED lighting system 10 in this embodiment, the dimmer 80 can be regarded as adjusting the signal characteristics of the AC input power supply Pin to generate the AC modulated power supply Pin_C with the dimming signal, that is, in this embodiment, the AC modulated power supply Pin_C after being processed by dimming process is at least includes AC component and the dimming signal component. The configuration of the dimmer 80 would be further discussed in the following embodiments.

When the LED lighting device 100 receives the modulated power supply Pin_C, on the one hand, the power supply module PM would further convert the modulated power supply Pin_C into a stable driving power supply Sdrv to be provided to the LED module LM for use; and on the other hand, the power supply module PM would generate the driving power Sdrv with different voltages (can be referred to as driving voltages), currents (can be referred to as driving currents) and/or pulse widths based on variation of the signal characteristics of the modulated power supply Pin_C. After the driving power supply Sdrv is generated, the LED module LM is turned on and emits light in response to the driving power supply Sdrv. As described herein, the luminance of the LED module LM is related to the driving voltage, driving current and/or pulse width, and the driving voltage and/or driving current are adjusted based on the signal characteristics of the modulated power supply Pin_C, wherein the signal characteristic of the modulated power supply Pin_C is controlled by the dimming command DIM. In other words, the dimming command DIM is directly related to the luminance of the LED module LM. The operation of the power module PM to convert the modulated power supply Pin_C into the driving power supply Sdrv can include, but is not limited to, signal processing processes such as rectification, filtering, and DC-to-DC conversion. Details would be further described in the following embodiments.

In the arrangement of multiple LED lighting devices 100_1-100_n (n≥2), the modulated power supply Pin_C can be provided to the LED lighting devices 100_1-100_n simultaneously, so that the LED lighting devices 100_1-100_n would be turned on at the same time. As a result, in some embodiments, when the dimming command DIM is applied/adjusted, the luminance of the LED lighting devices 100_1-100_n would be changed synchronously. Since the LED lighting system 10 implements the dimming control by adjusting the signal characteristics of the input power Pin, independent signal line for each LED lighting device 100_1-100_n to receive the dimming signal is no longer needed and the wiring and installation complexity in multi-lamp control scenario can be greatly simplified.

Figure 1B:
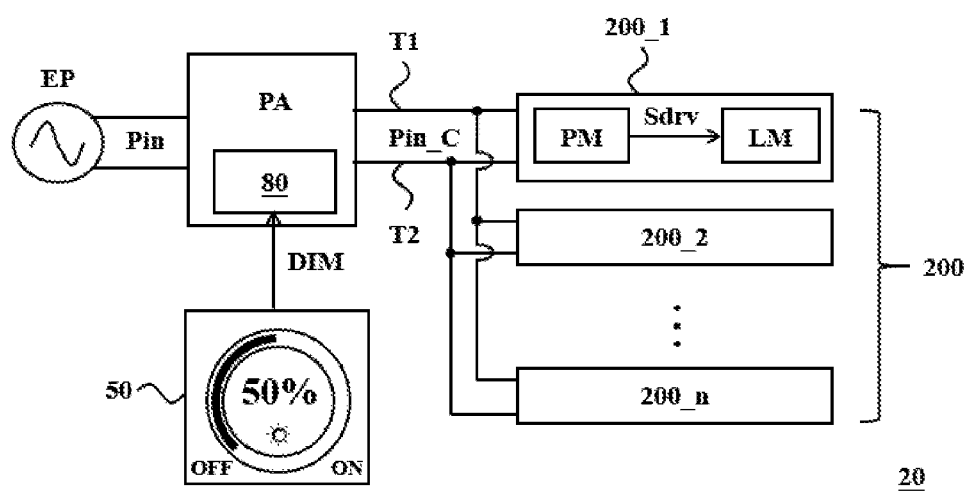

FIG. 1B is a schematic diagram of functional modules of an LED lighting system in accordance with some embodiments of the present disclosure, which depicts a system configuration diagram showing a dimmer included in a power adapter. Referring to FIG. 1B, the LED lighting system 20 includes a power adapter PA and an LED lighting device 200. In the LED lighting system 20, the power adapter PA is disposed outside the LED lighting device 200, and can be configured to convert the AC input power Pin into a power supply signal, wherein the power adapter PA includes a dimmer 80, which can be configured to perform a dimming process on the power supply signal converted by the power adapter PA based on the dimming command DIM, and the modulated power supply Pin_C is processed and generated accordingly. Compared to the aforementioned embodiment of FIG. 1A, in the configuration of the LED lighting system 20 of this embodiment, the dimmer 80 can be referred as adjusting the signal characteristics of the rectified input power Pin to generate the DC modulated power supply Pin_C appended with dimming signal. That is, the modulated power supply Pin_C after the dimming process in this embodiment, includes at least a DC component and a dimming signal component. The configuration of the dimmer 80 would be further described in the embodiments below. In some embodiments, the input power supply may also be referred to as an external power supply, the meaning and the function would be similar, and the present disclosure is not limited thereto.

Similar to the aforementioned embodiment in FIG. 1A, the LED lighting device 200 can also include one or more LED lighting devices 200_1-200_n (e.g., the number of the LED devices is expressed as n, where n is a positive integer greater than or equal to 1), wherein each of the LED lighting devices 200_1-200_n have similar or identical configurations, and are similar to the aforementioned LED lighting devices 100_1-100_n. Therefore, the configuration and operation of the power module PM and the LED module LM of each LED lighting device 200_1-200_n can be referred to the foregoing embodiments and is omitted herein. It should be noted that since the modulated power supply Pin_C provided by the dimmer 80 to the LED lighting device 100 in the embodiment of FIG. 1A is AC power supply, where the modulated power supply Pin_C provided by the power adapter PA to the LED lighting device 200 is a power supply signal, so the power modules PM in the LED lighting devices 100 and 200 can have different configurations depending on the type of received power supply. For example, the power module PM in the LED lighting device 100 may include a rectifying circuit, a filtering circuit, and a DC-to-DC converting circuit, etc.; and the power module PM in the LED lighting device 200 may only include a filtering circuit and a DC-to-DC converting circuit without rectifying circuit disposed.

In some embodiments, the LED lighting device 200 can be any type of LED lamp driven by a power supply signal and disposed with an external power adapter, such as LED spotlights, LED downlights, LED bulb lights, LED track lights, LED panel lamp, LED ceiling lamp, LED straight tube lamp or LED filament lamp, etc., this disclosure is not limited thereto. In an embodiment where the LED lighting device 200 is an LED straight tube lamp, the LED lighting device 200 can be an externally driven (Type-C) LED straight tube lamp.

Figure 2:
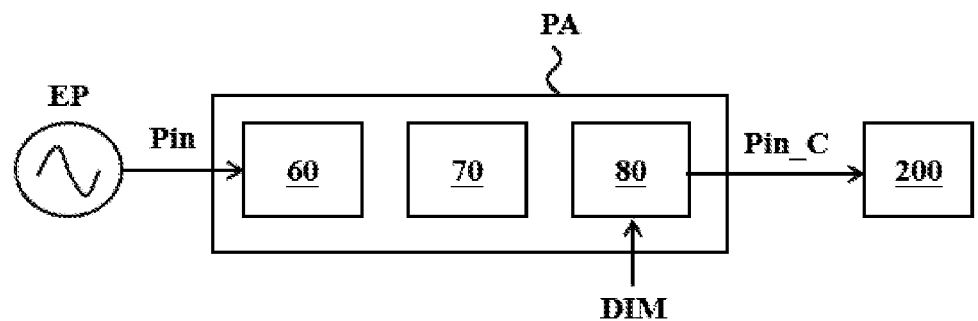
FIG. 2 is a schematic diagram of functional modules of a power adapter in accordance with some embodiments of the present disclosure.

FIG. 2 is schematic diagram of functional modules of a power adapter in accordance with some embodiments of the present disclosure. Please refer to FIG. 2, in some embodiments, the power adapter PA includes a signal adjusting module 60, a switching power supply module 70 and a dimmer 80.

The signal adjusting module 60 receives the input power Pin, and is configured to perform signal adjustment, such as rectification or filtering, to the AC input power Pin. The switching power supply module 70 is electrically connected to the signal adjustment module 60 and is configured to perform power conversion to the signal-adjusted input power Pin to generate and output a stable power supply signal. The dimmer 80 is electrically connected to the switching power supply module 70 and is configured to modulate the power supply signal output by the switching power supply module 70, so as to convert the dimming command DIM into a specific form/signal characteristic to be loaded onto the power supply signal output by the switching power supply module 70 and generate the modulated power Pin_C after the dimming process. More details regarding configurations of the modules in the power adapter PA are described in the embodiments below with reference to FIG. 3 to FIG. 5B respectively.

Figure 3:
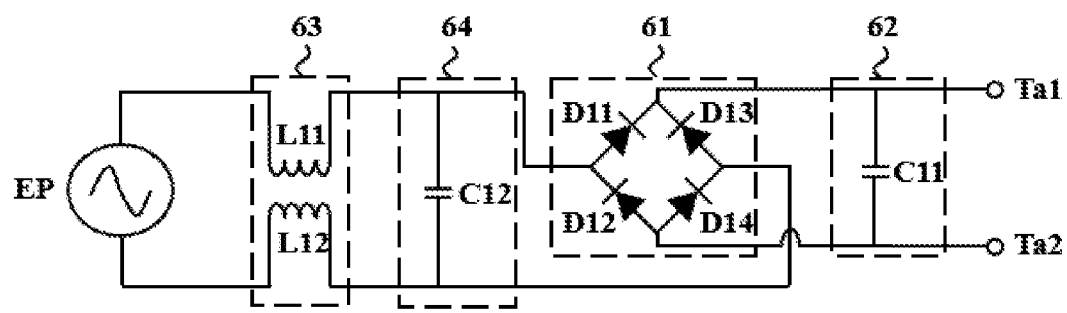
FIG. 3 is a schematic diagram of a circuit structure of a signal adjustment module in accordance with some embodiments of the present disclosure.

FIG. 3 is a schematic diagram of a circuit structure of a signal adjustment module in accordance with some embodiments of the present disclosure. Referring to FIG. 3, in some embodiments, the signal adjustment module 60 includes a rectifying circuit 61 and a first filtering circuit 62. The rectifying circuit 61 receives the input power Pin through the rectifying input end, rectifies the input power Pin, and then outputs the rectified signal from the rectifying output end. The rectifying circuit 61 can be a full-wave rectifying circuit, a half-wave rectifying circuit, a bridge rectifying circuit or other types of rectifying circuits, and the disclosure is not limited thereto. In FIG. 3, the rectifying circuit 61 is shown as an example of a full-wave rectifier bridge including four diodes D11-D14, wherein the anode of the diode D11 and the cathode of the diode D12 are electrically connected together as the first rectifying input end of the rectifying circuit 61, and the anode of the diode D13 and the cathode of the diode D14 are electrically connected together as the second rectifying input end of the rectifying circuit 61. In addition, the cathodes of the diodes D11 and D13 are electrically connected together as the first rectifying output end of the rectifying circuit 61, and the anodes of the diodes D12 and D14 are electrically connected together as the second rectifying output end of the rectifying circuit 61.

The input end of the first filtering circuit 62 is electrically connected to the rectifying output end of the rectifying circuit 61 to receive the rectified signal, filter the rectified signal to generate a filtered signal, and transmit the signal from the first filter output end Ta1 and the second filter output end Ta2 outputs. As described herein, the first rectifying output end can be regarded as the first filter input end of the first filtering circuit 62, and the second rectifying output end can be regarded as the second filter input end of the first filtering circuit 62. In some embodiments, the first filtering circuit 62 can filter out the ripple in the rectified signal, so that the waveform of the generated filtered signal is smoother than the waveform of the rectified signal. In addition, the first filtering circuit 62 can filter a specific frequency by disposing a selected circuit configuration, so as to filter out the response/energy of the external driving power at a specific frequency. In some embodiments, the first filtering circuit 62 can be a circuit including at least one of resistors, capacitors and inductors, such as a parallel capacitor filtering circuit or a π-type filtering circuit, and the present disclosure is not limited thereto. As an example illustrated in FIG. 3, the first filtering circuit 62 includes the capacitor C11, wherein the first end of the capacitor C11 (i.e., the first filter output end Ta1) is electrically connected to the cathodes of the diodes D11 and D13 through the first rectifying output end, and the second end of the capacitor C11 (i.e., the second filter output end Ta2) is electrically connected to the anodes of the diodes D12 and D14 through the second rectifying output end.

In some embodiments, the signal adjustment module 60 further includes a second filtering circuit 63 and/or a third filtering circuit 64, wherein the second filtering circuit 63 is a filtering circuit connected in series between the external power grid and the rectifying circuit 61, and the third filtering circuit 64 is electrically connected to the rectifying input end of the rectifying circuit 61 and are connected in parallel with the rectifying circuit 61. The configuration of the second filtering circuit 63 and the third filtering circuit 64 can enable the function of suppressing high frequency interference or current limiting to the input power supply Pin, so that the signal stability of the input power supply Pin can be better. Similar to the aforementioned first filtering circuit 62, the second filtering circuit 63 and the third filtering circuit 64 can also be circuits including at least one of a resistor, a capacitor, and an inductor, and the disclosure is not limited thereto. As an example illustrated in FIG. 3, the second filtering circuit 63 includes inductors L11 and L12, wherein the inductor L11 is connected in series between the live wire (or the neutral wire) of the external power grid EP and the first rectifying input end of the rectifying circuit 61, and the inductor L12 is connected in series between the neutral wire (or the live wire) of the external power grid EP and the second rectifying input end of the rectifying circuit 61. In some embodiments, the inductors L11 and L12 can be common mode inductors or differential mode inductors. As an example shown in FIG. 3, the third filtering circuit 64 includes the capacitor C12, wherein the first end of the capacitor C12 is electrically connected to the inductor L11 and the first rectifying input end (i.e., the connecting end of the anode of the diode D11 and the cathode of the diode D12), and the second end of the capacitor C12 is electrically connected to the inductor L12 and the second rectifying input end (i.e., the connecting end of the anode of the diode D13 and the cathode of the diode D14).

Figure 4A:
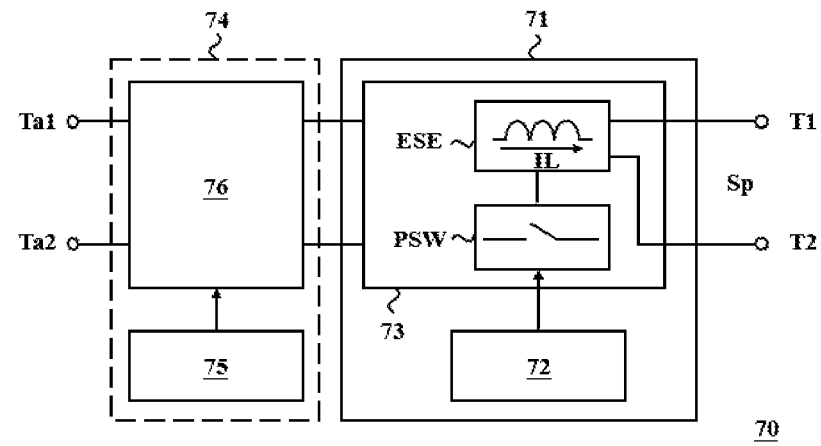
FIG. 4A is a schematic diagram of functional modules of a switching power supply module in accordance with some embodiments of the present disclosure.

FIG. 4A is a schematic diagram of functional modules of a switching power supply module in accordance with some embodiments of the present disclosure. Please refer to FIG. 4A, in some embodiments, the switching power supply module 70 can include a power converting circuit 71, wherein the input end of the power converting circuit 71 is electrically connected to the filter output ends Ta1 and Ta2 of the first filtering circuit (e.g., the first filtering circuit 62 in FIG. 3) to receive the filtered signal. In some embodiments, the power converting circuit 71 can perform power conversion on the filtered signal in a current source mode to generate a stable power supply signal Sp. The power converting circuit 71 includes a switching control circuit 72 and a converting circuit 73, wherein the converting circuit 73 includes a switching circuit PSW (also referred as a power switch) and a power converting circuit ESE. The converting circuit 73 receives the filtered signal, converts the filtered signal into the power supply signal Sp based on the control of the switching control circuit 72, and output the power supply signal SP from the first power supply end T1 and the second power supply end T2 to be supplied to the LED lamp.

Figure 4B:
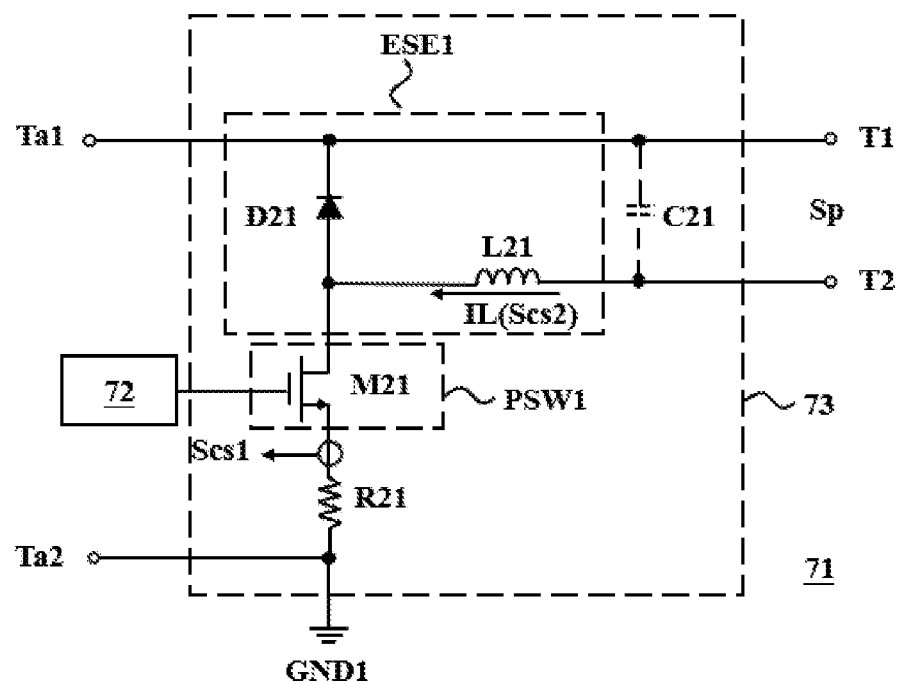
FIG. 4B is a schematic diagram of the circuit structure of the power converting circuit in accordance with some embodiments of the present disclosure.

FIG. 4B is a schematic diagram of the circuit structure of the power converting circuit in accordance with some embodiments of the present disclosure. Referring to FIG. 4B, illustrated as an example in this embodiment, the power converting circuit 71 is a step-down DC-to-DC converting circuit, which includes a switching control circuit 72 and a converting circuit 73, and the converting circuit 73 includes an inductor L21, a freewheeling diode D21, a capacitor C21 and the transistor M21, wherein the inductor L21 and the freewheeling diode D21 constitute the power converting circuit ESE1, and the transistor M21 is the switching circuit PSW1. The converting circuit 73 is coupled to the filter output ends Ta1 and Ta2 to convert the received filtered signal into the power supply signal Sp, which is output through the first power supply end T1 and the second power supply end T2.

In this embodiment, the transistor M21 is, for example, a metal oxide semiconductor field effect transistor, which has a control end, a first end and a second end. The first end of the transistor M21 is coupled to the anode of the freewheeling diode D21, the second end is coupled to the filter output end Ta2, and the control end is coupled to the switching control circuit 72 so as to receive the control of the switching control circuit 72 to make the connection between the first end and the second end to be connected or cut off. The first power supply end T1 is coupled to the filter output end Ta1, the second power supply end T2 is coupled to one end of the inductor L21, and the other end of the inductor L22 is coupled to the first end of the transistor M21. The capacitor C21 is coupled between the first power supply end T1 and the second power supply end T2 to stabilize the voltage fluctuation between the first power supply end T1 and the second power supply end T2. The cathode of the freewheeling diode D21 is coupled to the filter output end Ta1 and the first power supply end T1.

The operation of the power converting circuit 71 would be described as follows. The controller 72 determines the time interval of turn-on and turn-off of the switch 635 based on the current detection signal Scs1 and/or Scs2, that is, the controller 72 controls the duty cycle of the transistor M21 to adjust the magnitude of the power supply signal Sp. The current detection signal Scs1 represents the magnitude of the current flowing through the transistor M21, and the current detection signal Scs2 represents the magnitude of the inductor current IL, wherein the current detection signal Scs2 can be obtained by disposing an auxiliary winding coupled to the inductor L21. Based on the current detection signals Scs1 or Scs2, the switching control circuit 72 can obtain the information of the magnitude of the electric power converted by the converting circuit. When the transistor M21 is turned on, the current of the filtered signal flows in from the filter output end Ta1, passes through the capacitor C21 and the first power supply end T1 to the back-end load (e.g., the LED lamp), then passes through the inductor L21 and the transistor M21 from the back-end load, and flows out from the filter output end Ta2. At this time, the capacitor C21 and the inductor L21 store energy. When the transistor M21 is turned off, the inductor L21 and the capacitor C21 release the stored energy, and the current freewheels to the first power supply end T1 through the freewheel diode D21 so that the back-end load is still powered continuously. In addition, the capacitor C21 is an optional component and can be omitted, so the capacitor C21 is illustrated with dotted lines in the figure. In some application scenarios, the effect of stabilizing the current of the LED module can be achieved by virtue of the characteristic that the inductor can resist the change of the current, and therefore the capacitor C21 can be omitted.

In this embodiment, the power converting circuit 71 can be any one of a buck circuit, a boost circuit, and a boost-buck circuit based on practical applications.

Referring to FIG. 4A again, in some embodiments, the switching power supply module 70 may further include a power factor correction (PFC) circuit 74. The PFC circuit 74 is electrically connected between the filter output ends Ta1 and Ta2 of the first filtering circuit (e.g., the first filtering circuit 62 in FIG. 3) and the input end of the power converting circuit 71. In some embodiments, the PFC circuit 74 includes a switching control circuit 75 and a switching circuit 76, wherein the switching control circuit 75 controls the operation of the switching circuit 76 to perform PFC compensation on the filtered signal and generate a PFC signal. By this, the power factor of the filtered signal can be improved so that the active power of the filtered signal is improved, and the reactive power of the filtered signal is reduced.

Figure 4C:
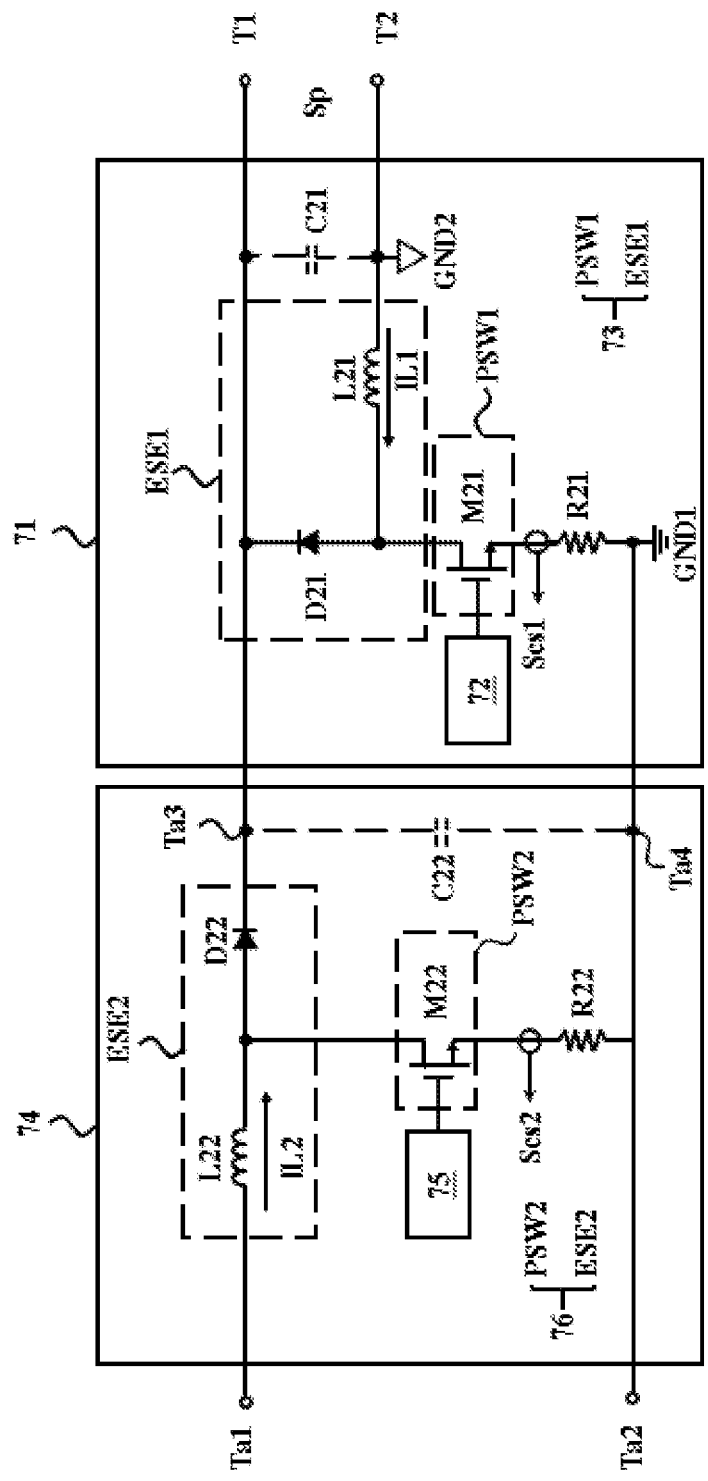
FIG. 4C is a schematic diagram of a circuit structure of a power factor circuit in accordance with some embodiments of the present disclosure.

The PFC circuit 74 can be, for example, a boost type converting circuit (or simply, boost circuit). As shown in FIG. 4C, which is a schematic diagram of a circuit structure of a power factor circuit in accordance with some embodiments of the present disclosure. Referring to FIG. 4C, the PFC circuit 74 includes a switching control circuit 75 and a converting circuit 76, and the converting circuit 76 includes a resistor R22, an inductor L22, a freewheeling diode D22, a capacitor C22, and a transistor M22, wherein the inductor L22 and the freewheeling diode D22 constitute a power converting circuit ESE2, and the transistor M22 is the switching circuit PSW2. The converting circuit 76 is coupled to the filter output ends Ta1 and Ta2 to convert the received filtered signal into the PFC signal, and output to the power converting circuit 71 through the PFC output ends Ta3 and Ta4. In addition, the capacitor C22 is an optional component and can be omitted, so the capacitor C22 is illustrated with dotted lines in the figure. In some application scenarios, the effect of stabilizing the current of the LED module can be achieved by virtue of the characteristic that the inductor can resist the change of the current, and therefore the capacitor C22 can be omitted. In some embodiments, the power factor correcting circuit can also be called as PFC module.

Figure 4D:
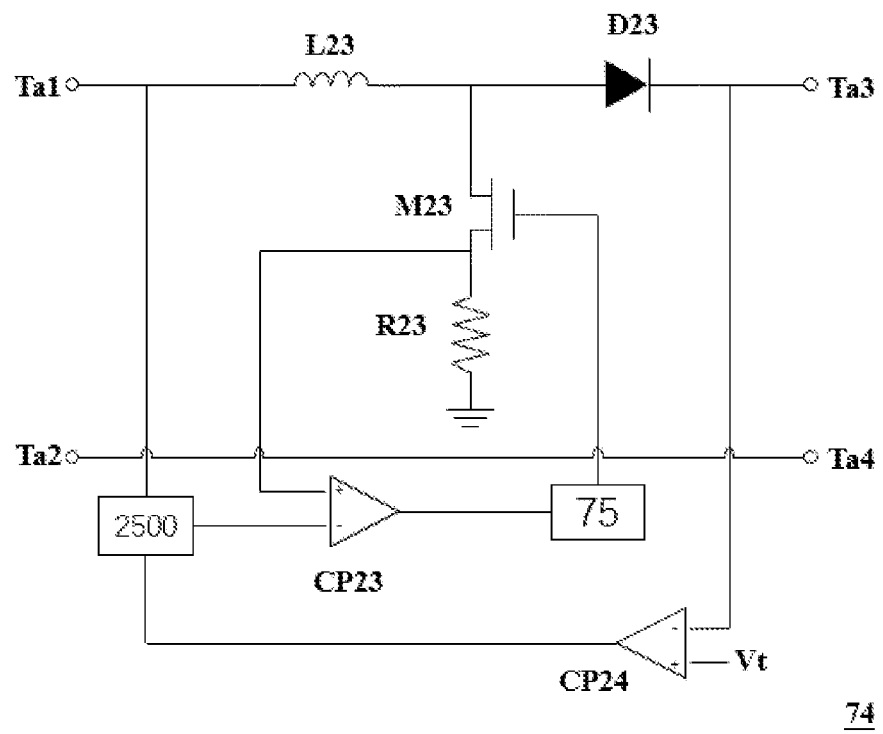
FIG. 4D is a schematic diagram of a circuit structure of a power factor correcting circuit in accordance with some embodiments of the present disclosure.

Please refer to FIG. 4D, which shows a schematic diagram of a circuit structure of a power factor correcting circuit in accordance with some embodiments of the present disclosure. As shown in the figure, the input of the power factor correcting circuit 74 is coupled to the first filter output end Ta1 and the second filter output end Ta2, and the output end of the power factor correcting circuit 74 is coupled to the PFC output ends Ta3 and Ta4. The power factor correcting circuit 74 includes a multiplier 2500, a switching control circuit 75, a first comparator CP24, a second comparator CP23, a transistor M23, a resistor R23, a diode D23, and an inductor L23. One end of the inductor L23 is coupled to the first filter output end Ta1, the other end is coupled to the anode of the diode D23, and the cathode of the diode D23 is coupled to the PFC output end Ta3. The first end of the transistor M23 is coupled to the connecting node of the inductor L23 and the diode D23, the second end is connected to the reference low potential (for example, the power ground GND, or the reference ground SGND) through the resistor R23, and the control end is coupled to the output of the switching control circuit 75. The first input end of the first comparator CP24 is coupled to the PFC output end Ta3, the second input end receives a reference voltage Vt, and the output end is coupled to the first input end of the multiplier 2500. The second input end of the multiplier 2500 is coupled to the first filter output end Ta1, the output end is coupled to the second input end of the second comparator CP23, and the first input end of the second comparator CP23 is coupled to the connecting node of the resistor R23 and the second end of the transistor M23, and the output end is coupled to the input end of the switching control circuit 75.

It should be noted that, at least part of the circuit components in the multiplier 2500, the switching control circuit 75, the first comparator CP24 and the second comparator CP23 can be integrated in a controller configured to controlling the on-off of the transistor M23. The controller can also be integrated with the transistor M23. The controller can be an integrated circuit, such as a control chip. The transistor M23 can be, for example, a metal-oxide-semiconductor field-effect transistor (MOSFET), a bipolar junction transistor (BJT), a triode, and the like.

Specifically, after the output voltage V0 of the power factor correcting circuit 74 at the PFC output end Ta3 is obtained by the first comparator CP24 and compared with the reference voltage Vt, the comparison result is sent to the first input end of the multiplier 2500, the second input end of the multiplier 2500 also obtains the voltage Vdc output by the first filter output end Ta1, and the multiplier 2500 outputs the reference signal Vi as the current feedback control based on the input of first input end and the second input end thereof. The comparator CP23 compares the voltage signal obtained from the resistor R23 reflecting the peak current of the inductor L23 with the reference signal Vi, and outputs the comparison result to the switching control circuit 75 to control the on-off of the transistor M23, such that waveforms of the current Ii and the voltage Vdc input to the power factor correcting circuit 74 are basically the same, and as a result, the current harmonics can be greatly reduced and the power factor can be improved thereby.

Figures 4E, 5A:
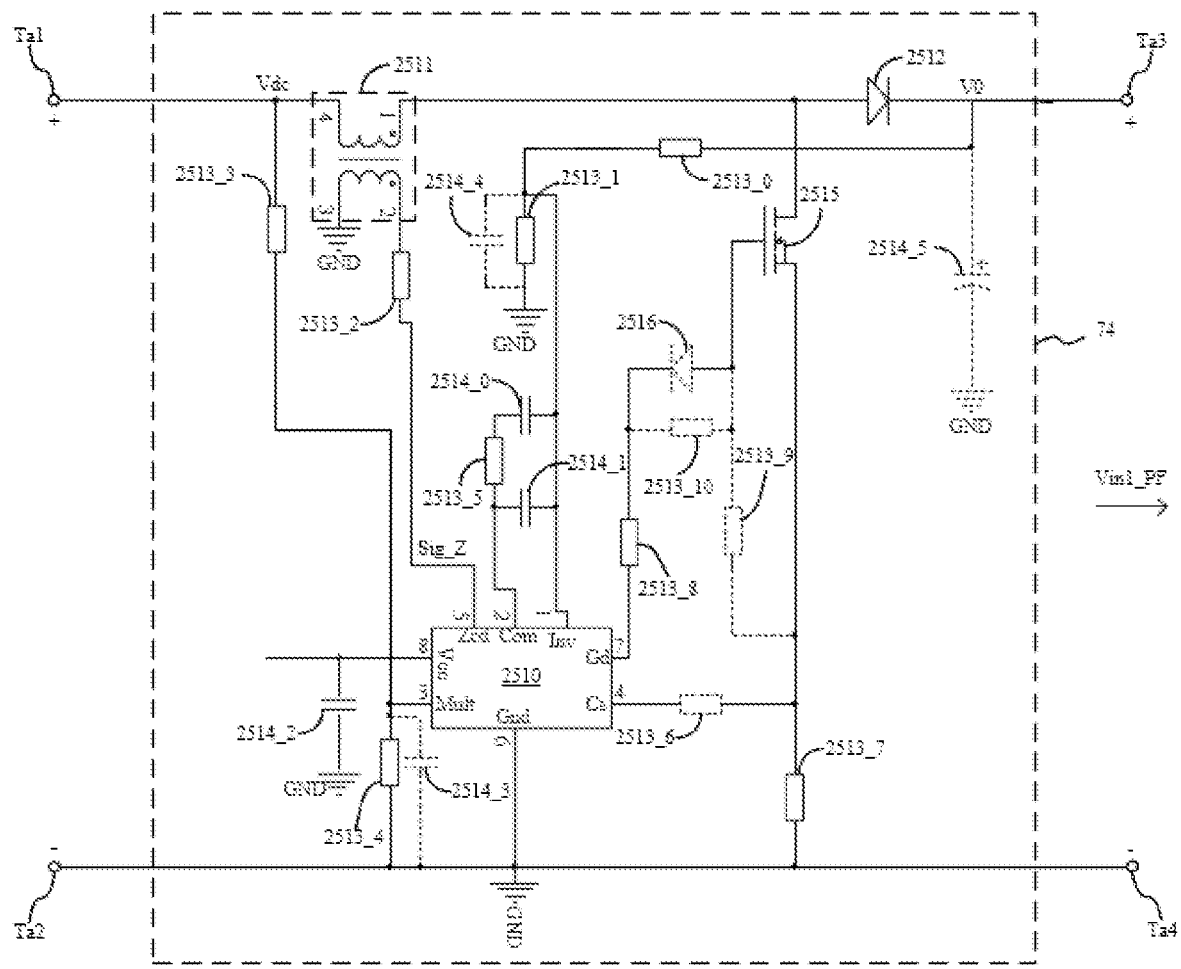
FIG. 4E is a schematic diagram of a circuit structure of a power factor correcting circuit in accordance with some embodiments of the present disclosure.
FIG. 5A is a schematic diagram of functional modules of a dimmer in accordance with some embodiments of the present disclosure.

Please refer to FIG. 4E, which shows a schematic diagram of a circuit structure of a power factor correcting circuit in accordance with some embodiments of the present disclosure. As shown in the figure, the power factor correcting circuit 74 in FIG. 4E includes a controller 2510, a transformer 2511, a diode 2512, a transistor 2515, a resistor 2513_0-2513_8, and capacitors 2514_0-2514_1. The controller 2510 has an inverting input end Inv, an error amplifying output end Com, a multiplier input end Mult, a sampling end Cs, an input end Zcd of a zero-crossing detection signal, a driving output end Gd, and a chip power supply end Vcc. One end of the transformer 2511 is coupled to the first filter output end Ta1, the other end is coupled to the anode of the diode 2512, and the cathode of the diode 2512 is coupled to the PFC output end Ta3. The first end of the transistor 2515 is coupled to the connecting node of the transformer 2511 and the diode 2512, the second end is coupled to the second filter output end Ta2 (or the power ground GND, or the second pin 211) through the resistor 25137, and the control end is coupled to the driving output end Gd of the controller 2510 through the resistor 2513_8. The sampling end Cs of the controller 2510 is coupled to the connecting node of the second end of the transistor 2515 and the resistor 2513_7 through the resistor 2513_6. The chip power supply end Vcc is electrically connected to a constant voltage to supply power to the controller 2510. The inverting input end Inv is coupled to a voltage divider circuit including serially-connected a resistor 2513_0 and a resistor 2513_1 to obtain the voltage V0 output from the PFC output end Ta3. An RC compensation network including a resistor 2513_5, a capacitor 2514_0 and a capacitor 2514_1 is coupled between the inverting input end Inv and the error amplifier output end Com. As described herein, one end of the capacitor 2514_0 and one end of the capacitor 2514_1 are coupled to the inverting input end Inv at the same time, and the other end of the capacitor 2514_0 is connected to the other end of the capacitor 2514_1 and further to the error amplifier output end Com through the resistor 2513_5. The multiplier input end Mult is coupled to the output of the voltage divider circuit in which resistors 2513_3 and 2513_4 are connected in series to the first filter output end Ta1 and the second filter output end Ta2 (or ground end). The input end Zcd of the zero-crossing detection signal is coupled to the transformer 2511 through a resistor 2513_2.

It should be noted that the PFC output end Ta3 connected to the output of the power factor correcting circuit 74 is also coupled to a capacitor 2514_1 to stabilize the electrical signal output by the active power factor correcting module 251 and filter out high-frequency interference signals. Since the capacitor 2514_1 can be added or omitted (optional-disposed components) depending on the actual application, the capacitor 2514_1 is illustrated by dotted lines in the figure. The same situation can also be applied to at least one of the following circuit structures: resistive capacitor 2514_3 connected in parallel to both ends of resistor 2513_4, capacitor 2514_4 connected in parallel to both ends of resistor 2513_1, the resistor 2513_9 coupled between the control end and the second end of the transistor 2515, the diode 2516 and the resistor 2513_10 coupled between the control end of the transistor 2515 and the resistor 2513_8, and the resistor 2513_6 coupled between the resistor 2513-7 and the sampling end Cs of the controller. The circuit structures shown by the dotted lines can also be replaced with more complicated or simpler circuit structures. For example, the sampling end Cs of the controller can be connected to the resistor 25137 through wires. As another example, the capacitor 2514_5 can include a tank circuit with at least two capacitors. Equivalent circuits or integrated circuits that are improved based on the above examples should be regarded as the specific examples of power factor correcting circuits.

The working process of the power factor correcting circuit 74 shown in FIG. 4E would be described as follows. The DC voltage signal V0 output by the power factor correcting circuit 74 is input to the inverting input end Inv of the controller 2510 through the voltage divider circuit including serially-connected the resistor 2513_3 and the resistor 2513_4 after being divided by the voltage divider circuit. After being divided by the voltage divider circuit, the voltage signal Vdc input to the power factor correcting circuit 74 is input to the input end Mult of the multiplier to determine the waveform and phase of the voltage signal Vdc. The high-frequency current induced by the primary inductor of the transformer 2511 (also known as the primary coil, the primary winding) passes through the secondary inductor (also known as the secondary coil, the secondary winding), which is mutual inducted with the primary inductor, and the resistor 25132 is input to the input end Zcd of the zero-crossing detection signal as the zero-crossing detection signal. When the transistor 2515 is turned on, the voltage signal Vdc is input to the reference low potential (such as the second filter output end Ta2, the power ground GND, or the second pin 221) through the primary inductor of the transformer 2511 and the transistor 2515. During this period, the transformer 2511 stores energy (or, "excitation"), and the electrical signal output by the transistor 2515 is acquired by the sampling end Cs to sample the inductive current in the transformer 2511. Simultaneously, the multiplier input end Mult of the controller 2510 receives the sampled signal Vdc through the resistor 2513_3 and generates an internal reference signal Vi based on the electrical signal of the sampled signal Vdc, so as to detect the sampling signal obtained by the sampling end Cs based on the internal reference signal Vi. When the level value of the sampling signal acquired by the sampling end Cs reaches the level value provided by the internal reference signal Vi, in other words, when the inductive current in the primary inductor of the transformer 2511 reaches a peak value, the controller 2510 controls transistor 2515 to turn off. At this time, the primary inductor of the transformer 2511 discharges energy (or, "demagnetization"), and the secondary inductor of the transformer 2511 discharge energy and output the zero-crossing detection signal. When the transformer 2511 discharges energy and the output current of the transformer 2511 is reduced to close to zero, the zero-crossing detection signal received by the controller 2510 is also close to zero, and the controller 2510 determines the end time of the discharge operation based on the zero-crossing detection signal received at the input end Zcd, and uses the control logic configured to detect the detection result of the zero-crossing detection signal to output the signal to turn on the driving transistor 2515 from the driving output end Gd to supply power to the back-stage circuits.

As described herein, the controller 2510 can be selected to be configured as a control chip integrated with a specialized circuit for optimizing harmonic distortion (or "THD optimization") or PFC, such that the crossover distortion and ripple distortion of the current input to the control chip can be effectively controlled, power factor can be improved, and harmonic distortion can be reduced. For example, the controller 2510 can be deployed as the L6562 chip, the L6561 chip, or the L6560 chip. The transistor 2515 is a three-end controllable power component, such as a metal-oxide-semiconductor field-effect transistor (MOSFET), a bipolar junction transistor (BJT), triodes, etc.

Moreover, the circuit structure of the power factor correcting circuit is not limited to the above-described. For example, power factor correcting circuit can also be the boost type power factor correcting circuit, the buck type power factor correcting circuit, the forward type power factor correcting circuit, or the flyback type power factor correcting circuit.

The power factor correcting module can also be implemented by, for example, a passive power factor correcting unit. The passive power factor correcting unit can be implemented by connecting a resonant filter on the AC side, such that the conducting angle of the current in the AC signal can be increased. In some examples, the skilled person can adjust the PFC circuit 74 as shown in FIG. 4A to be coupled between the input ends of the dimmer 20 and the rectifying circuit (e.g., rectifying circuit 61), so that the PFC circuit 74 can receive the AC signal output by the external AC power supply, perform PFC on the AC signal, and then output the corrected AC signal to the rectifying circuit 61.

In some examples, the power factor correcting circuit can also be implemented by adding a passive power factor correcting circuit including diodes and capacitors at the rear-end of the rectifying module in the circuit configuration of the rectifying module shown in FIG. 3, so that the passive power factor correcting circuit can further has the function of filtering. In some examples of the PFC circuit set with filtering function, the filtering modules 62 in the embodiment shown in FIG. 3 can be disposed optionally.

FIG. 5A is a schematic diagram of functional modules of a dimmer in accordance with some embodiments of the present disclosure. Please refer to FIG. 5A, the dimmer 80 includes a signal synthesis module 81 and a command converting module 82. The signal synthesis module 81 is configured to modulate the power supply signal Sp with the dimming signal Sdim to generate the modulated power supply Pin_C after dimming processing, or in other words, synthesize the power supply signal Sp and the dimming signal Sdim into a modulated power supply Pin_C. The command converting module 82 is configured to receive the above-mentioned dimming command DIM and convert the dimming command DIM into the dimming signal Sdim with a specific format. The specific format of the dimming signal Sdim can be, for example, a signal indicating the phase-cutting time period, a signal with varying frequency in response to the dimming information, or a digital code in response to the dimming information (such as a square wave with a specific sequence of high/low levels) etc. The above-mentioned signal formats can be presented in the form of pulse or square wave, and as a result, the dimming signal Sdim can be a signal including two signal states of high level and low level in appearance.

In some embodiments, the command converting module 82 can also be referred as dimming signal generating module. The signal synthesis module 81 can be referred as a signal synthesis processing module. The power converting circuit can be referred to as a power converting unit.

Figure 5B:
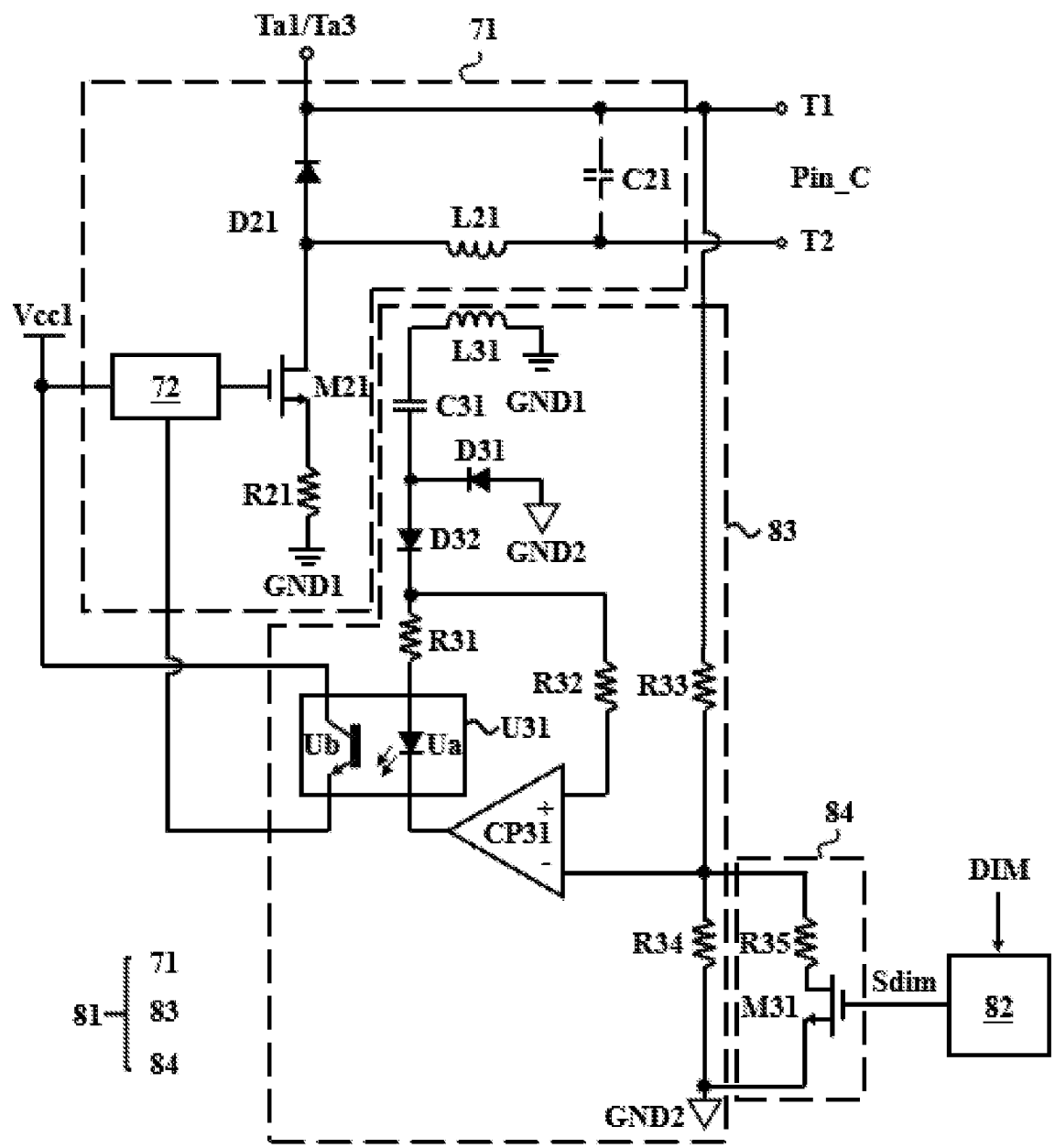
FIGS. 5B-5E are schematic diagrams of circuit structures of dimmers in accordance with some embodiments of the present disclosure.

The specific circuit configuration of the dimmer 80 in some embodiments is described below with reference to FIG. 5B, wherein FIG. 5B is a schematic diagram of circuit structures of a dimmer in accordance with some embodiments of the present disclosure. Referring to FIG. 5B, the signal synthesis module 81 may include, for example, a power converting circuit 71, a feedback adjusting circuit 83 and a signal generating circuit 84, wherein the power converting circuit 71 can be configured as the power converting circuit described in the embodiment of FIG. 4B, and the related configuration and operation can refer to the foregoing embodiments, which are omitted herein. In the present embodiment, the feedback adjusting circuit 83 is electrically connected to the power converting circuit 71, and is configured to generate a corresponding feedback signal based on the signal state on the power supply end and feed the feedback signal back to the switching control circuit 72 of the power converting circuit 71, such that the switching control circuit 72 can adjust the control to the transistor M21 based on the feedback signal, signal fluctuations on the power supply end can be compensated, and the output is stabilized thereby. The signal generating circuit 84 is electrically connected to the feedback adjusting circuit 83 and is configured to determine whether to adjust the voltage on the power supply ends T1/T2 based on the signal state of the dimming signal Sdim.

In some embodiments, the feedback adjusting circuit 83 and the signal generating circuit 84 can be collectively referred as a feedback adjusting unit. The feedback adjusting unit 2 adjusts the sampling signal obtained from the power supply end T1/T2 based on the dimming signal Sdim output by the command converting module 82, and outputs a feedback signal based on the adjusted sampling signal, and the feedback signal is transmitted to the power converting circuit 71. The power converting circuit 71 performs energy conversion on the power supply signal obtained from the pins ta1/ta3 based on the feedback signal, so as to output an output signal with the synthesized dimming signal at the power supply end T1/T2.

Specifically, when the dimming signal Sdim is at a low level, the signal generating circuit 84 would not adjust the voltage on the power supply ends T1/T2, so the feedback signal output by the feedback adjusting circuit 83 would not fluctuate greatly, and the voltage on the power supply ends T1/T2 can be maintained to be dynamically stable at a set voltage.

When the dimming signal Sdim switches from low level to high level, the signal generating circuit 84 would pull up the voltage on the power supply end T1/T2, and the momentary pull-up of the voltage would affect the operation of the feedback adjusting circuit 83, so that the feedback adjusting circuit 83 outputs a corresponding feedback signal to instruct the switching control circuit 72 to adjust the voltage on the power supply end T1/T2 back to the set voltage. Next, when the dimming signal Sdim returns from high level to low level again, the voltage adjusting effect from the signal generating circuit 84 on the power supply end T1/T2 disappears, and the power converting circuit 71 still tends to adjust the voltage at the power supply end T1/T2 downward to approach the set voltage, and at this time, the voltage on the power supply end T1/T2 would be quickly pulled back to the vicinity of the set voltage. To sum up, the voltage on the power supply end T1/T2 would be pulled up in response to the control of the signal generating circuit 84, and then decreases back to the set voltage in response to the control of the power converting circuit 71 and the feedback adjusting circuit 83. As a result, the voltage at the power supply end T1/T2 forms a pulse/square waveform superimposed on the set voltage, and this waveform would be roughly synchronized with the dimming signal Sdim. The signal with the pulse/square waveform superimposed on the set voltage is the modulated power supply Pin_C generated by the dimmer 80.

In some embodiments, the feedback adjusting circuit 83 includes an inductor L31, a capacitor C31, resistors R31-R34, diodes D31-D32, an operational amplifying unit CP31, and an opto-coupling unit U31, wherein the inductor L31, capacitor C21, resistors R31 and R32, and diodes D31 and D32 can form a feedback assisting module, and resistors R33 and R34 can form a resistance module.

Specifically, in the feedback assisting module, one end of the inductor L31 is electrically connected to the ground end GND1 and coupled with the inductor L21 to sense a signal on the inductor L21. One end of the capacitor C31 is electrically connected to the other end of the inductor L31. The anode of the diode D31 is electrically connected to the ground end GND2, and the cathode of the diode D31 is electrically connected to the other end of the capacitor C31. The anode of the diode D32 is electrically connected to the cathode of the diode D31 and the other end of the capacitor C31. One end of the resistors R31 and R32 is electrically connected to the cathode of the diode D32, and the other end of the resistor R31 is electrically connected to the opto-coupling unit U31. The operational amplifying unit CP31 has a first input end, a second input end and an output end, the first input end is electrically connected to the other end of the resistor R32, second input end is electrically connected to the resistance module and the signal generating circuit 84, and the output end is electrically connected to the opto-coupling unit U31. In some embodiments, the first input end of the operational amplifying unit CP31 can also be electrically connected with a Zener diode, but the present disclosure is not limited thereto. The opto-coupling unit U31 includes a light-emitting component Ua and a photosensitive component Ub, wherein the anode of the light-emitting component Ua is electrically connected to the other end of the resistor R31, and the cathode of the light-emitting component Ua is electrically connected to the output end of the operational amplifying unit CP31. One end of the photosensitive component Ub is electrically connected to the bias power supply Vcc1 (which can be generated by dividing the bus voltage, or be generated by an auxiliary winding), and the other end of the photosensitive component Ub is electrically connected to the feedback control end of the switching control circuit 72.

The resistance module is configured to divide the voltage on the power supply end T1 and provide the divided voltage signal to the operational amplifying unit CP31. In the resistance module, the resistors R33 and R34 are connected in series between the power supply end T1 and the ground end GND2, and the connecting end of the resistors R33 and R34 is electrically connected to the second input end of the operational amplifying unit CP31. In other words, the second input end of the operational amplifying unit CP31 can be regarded as being electrically connected to the voltage dividing point of the resistance module to receive the divided voltage signal, (which can also be called as, the sampling signal). The signal output by the operational amplifying unit CP31 is a feedback signal and is transmitted to the switching control circuit 72 through the opto-coupling unit U31.

The signal generating circuit 84 includes a resistor R35 and a transistor M31. One end of the resistor R35 is electrically connected to the second input end of the operational amplifying unit CP31 and the connecting ends of the resistors R33 and R34. The transistor M31 has a first end, a second end and a control end, the first end is electrically connected to the other end of the resistor R35, the second end is electrically connected to the ground end GND2, and the control end is electrically connected to the command converting circuit 82 for receiving the dimming signal Sdim.

In some embodiments, the signal generating circuit 84 can be referred to as a regulating circuit; the resistor R33 and the resistor R34 can be referred to as a sampling circuit; the operational amplifying unit CP31 can be referred to as a comparison circuit; the opto-coupling unit U31 can be referred to as a signal transmitting circuit; and, the inductor L31, the capacitor C31, the diodes D31 and D32 can be referred to as a reference signal generating circuit. The first input end of the operational amplifying unit can be a forward input end, and the second input end thereof can be a reverse input end.

Figure 8A:
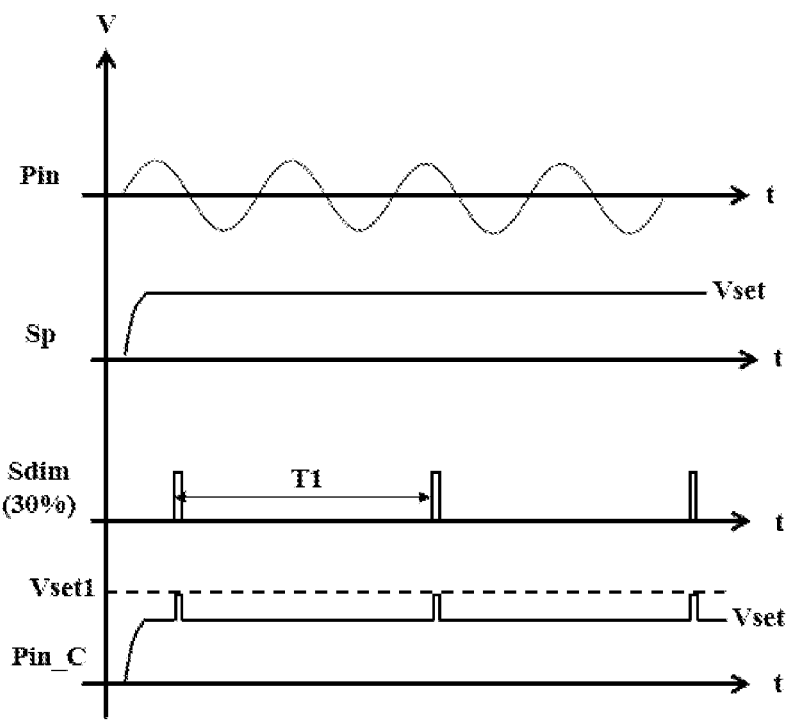
FIGS. 8A and 8B are schematic diagrams of signal waveforms of dimmers in accordance with some embodiments of the present disclosure.
Figure 8B:
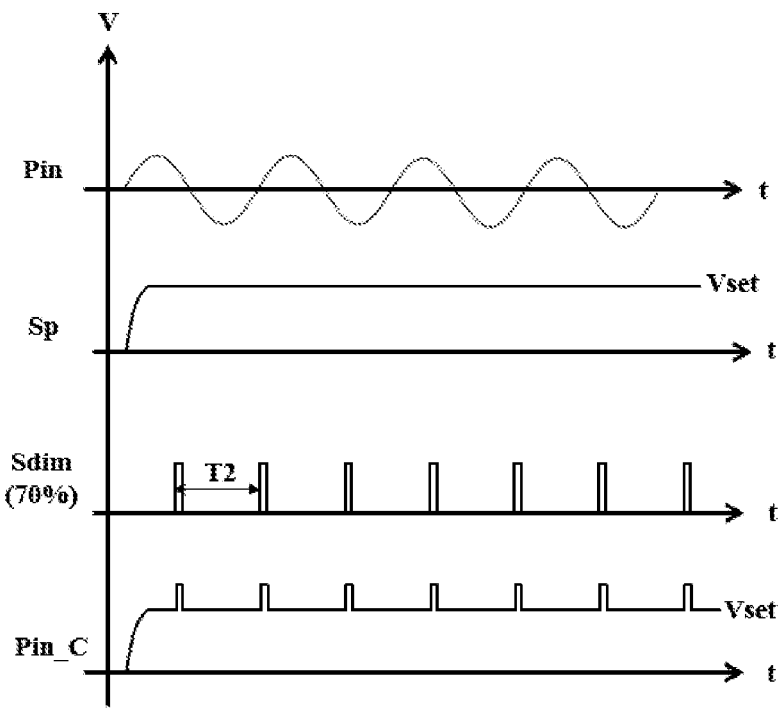

The detailed circuit operation of the dimmer 80 is illustrated below with reference to FIGS. 8A and 8B, wherein FIGS. 8A and 8B are schematic diagrams of signal waveforms of dimmers in accordance with some embodiments of the present disclosure. As an example illustrated in this embodiment, the dimming signal Sdim is a pulse signal and the frequency thereof is changed based on the luminance information indicated by the dimming command DIM, but the disclosure is not limited thereto.

Please refer to FIG. 5B and FIG. 8A together, when the command converting circuit 82 receives an instruction to adjust the luminance to 30% of the maximum luminance, the command converting circuit 82 would generate a dimming signal Sdim with a period of T1 and provide the dimming signal Sdim to the control end of the transistor M3. During the low-level period of the dimming signal Sdim, the transistor M31 is kept off, so that the resistor R35 can be regarded as a floating state, and the voltage of the power supply end T1 and the operation of the feedback adjusting circuit 83 are not affected. During the high-level period of the dimming signal Sdim, the transistor M31 is turned on, so that the resistor R35 is equivalently connected in parallel with the resistor R34. At this time, since the resistors R34 and R35 are connected in parallel, the impedance between the second input end of the operational amplifying unit CP31 and the ground end GND2 is decreased, and the voltage on the power supply end T1 would be correspondingly raised. On the other hand, since the operational amplifying unit CP31 would change the signal on the output end in response to the variation of the voltage on the second input end of the operational amplifying unit CP31, the change of the output end signal of the operational amplifying unit CP31 would affect the light-emitting amount of the light-emitting component Ua, such that the degree of conduction of the photosensitive component Ub would be changed accordingly. Changes in the degree of conduction of the photosensitive component Ub would affect the magnitude of the voltage fed back to the feedback control end of the switching control circuit 72, so that the switching control circuit 72 tends to reduce the duty cycle of the transistor M21 during the high level of the dimming signal Sdim to quickly pulled back the sudden-raised voltage on the power supply end T1 to the set voltage Vset.

Therefore, when the dimming signal Sdim returns from a high level to a low level again, the voltage on the power supply end T1 would also quickly return to the set voltage Vset, so that the modulated power supply Pin_C is formed and adjusted on the basis of the set voltage Vset and the dimming signal Sdim is a roughly synchronized pulse with a period of T1. Overall, it can be viewed as the dimming signal Sdim is superimposed on the power supply signal Sp to form the modulated power supply Pin_C.

From another perspective, when the dimming signal Sdim is switched from a low level to a high level, the transistor R35 is turned on, and the resistors R35 and R34 are connected in parallel, so that the impedance between the second input end of the operational amplifying unit CP31 and the ground end GND2 is decreased, the divided voltage at the second input end of the operational amplifying unit CP31 is decreased, while the voltage at the first input end of the operational amplifying unit CP31 remains unchanged. At this time, in order to keep the voltage at the second input end of the operational amplifying unit CP31 to be the same with the voltage at the first input end of the operational amplifying unit CP31, the operational amplifying unit CP31 outputs a signal to the switching control circuit 72 through the signal transmitting circuit U31, so that the switching control circuit 72 would adjust the output voltage of the power converting circuit (i.e., the voltage of the power supply end T1) to be increased. When the voltage of the power supply end T1 rises, the divided voltage at the second input end of the operational amplifying unit CP31 is able to rise to the same level as the first input end. On the whole, during the low-level period of the dimming signal Sdim, the transistor M31 is turned off, and the voltage of the power supply end T1 is the set voltage Vset; and when the dimming signal Sdim is at a high level, the transistor M31 is turned on, and the voltage at the power supply end T1 rises. The magnitude of the voltage raised at the power supply end T1 is related to the resistors R33, R34 and R35.

In some embodiments, the resistance value of the resistor in the sampling circuit can also be changed, so that when the dimming signal is low, the voltage of the power supply end T1 is the set voltage Vset; and when the dimming signal Sdim is at high level, the voltage at the power supply end T1 is decreased.

In this embodiment, the first input end of the operational amplifying unit CP31 is coupled to a constant voltage source or a reference signal generating circuit to receive the reference signal Vref.

Please refer to FIG. 5B and FIG. 8B together, when the command converting circuit 82 receives an instruction to adjust the luminance to 80% of the maximum luminance, the command converting circuit 82 would generate a dimming signal Sdim with a period of T2 and provide the dimming signal Sdim to the control end of the transistor M31, wherein the period T2 is smaller than the period T1. That is, the frequency of the dimming signal Sdim corresponding to 30% of the maximum luminance is lower than the frequency of the dimming signal Sdim corresponding to 70% of the maximum luminance. During the low-level and high-level periods of the dimming signal Sdim, the feedback adjusting module 83 and the signal generating module 84 operate similarly to the above-mentioned embodiments, so that the modulated power supply Pin_C can be formed on the basis of the set voltage Vset, which is a roughly synchronized pulse with period T2. Overall, it can be considered that the dimming signal Sdim is superimposed on the power supply signal Sp to form the modulated power supply Pin_C.

In the above-mentioned embodiments, the signal synthesis module 81 can be regarded as utilizing the configuration of the existing power converting circuit 71 to realize part of the signal synthesis function, so the power converting circuit 71 can be regarded as a part of the signal synthesis module 81 as described herein. However, in the division of functional modules in some embodiments, the signal synthesis module 81 can also be regarded as not including the power converting circuit 71 (that is, only including the feedback adjusting circuit 83 and the signal generating circuit 84). As described herein, the signal synthesis module 81 cooperates with the power converting circuit 71 to generate the modulated power supply Pin_C. In addition, in the division of functional modules in other embodiments, the feedback adjusting circuit 83 can also be regarded as a part of the power converting circuit 71. For the specific configuration of the power converting circuit 71, reference can be made to the foregoing descriptions of the embodiments, and details are omitted herein.

Figure 5C:
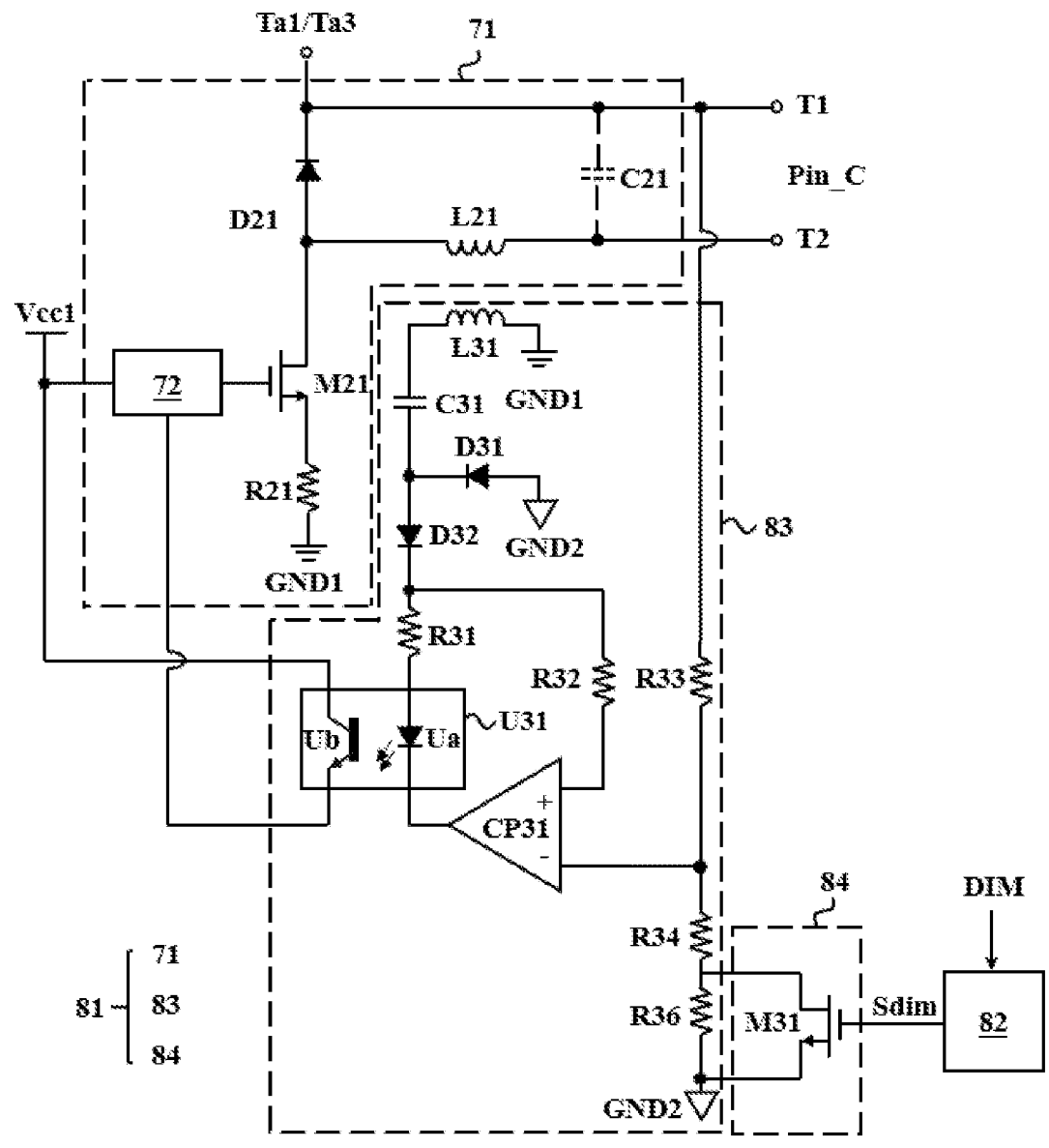

FIG. 5C is a schematic diagram of circuit structure of a dimmer in accordance with some embodiments of the present disclosure. The circuit structure of the dimmer in this embodiment is similar to the embodiment shown in FIG. 5B. The difference is that, in this embodiment, the signal generating circuit 84 includes a transistor M31, which is connected in parallel with the resistor R36. The sampling circuit includes resistors R33, R34 and R36, and the three resistors are connected in series to the power supply end T1 and the ground end GND2. The signal generating circuit 84 adjusts the impedance between the second input end of the operational amplifying unit CP31 and the ground end GND2 by bypassing the resistor R36 in the sampling circuit, and the voltage on the power supply end T1 can be affected thereby. The operation of other parts of the circuits are the same with those of the foregoing embodiments and are not repeated herein. In some embodiments, the impedance between the second input end of the operational amplifying unit CP31 and the ground end GND2 can also be adjusted in other manners. For example, a controllable variable resistor can be configured, such as a power tube with a linear region corresponding to voltage change interval of the dimming signal. The controllable variable resistor can be connected in series or in parallel with the voltage dividing resistors in the sampling circuit, and the control end of the variable resistor can be configured to receive the dimming signal Sdim to change the resistance value based on the change of the amplitude of the dimming signal Sdim, such that the sampling signal output by the sampling circuit can be adjusted. The signal amplitude of the sampled signal reflects the luminance information of the dimming signal.

Figure 5D:
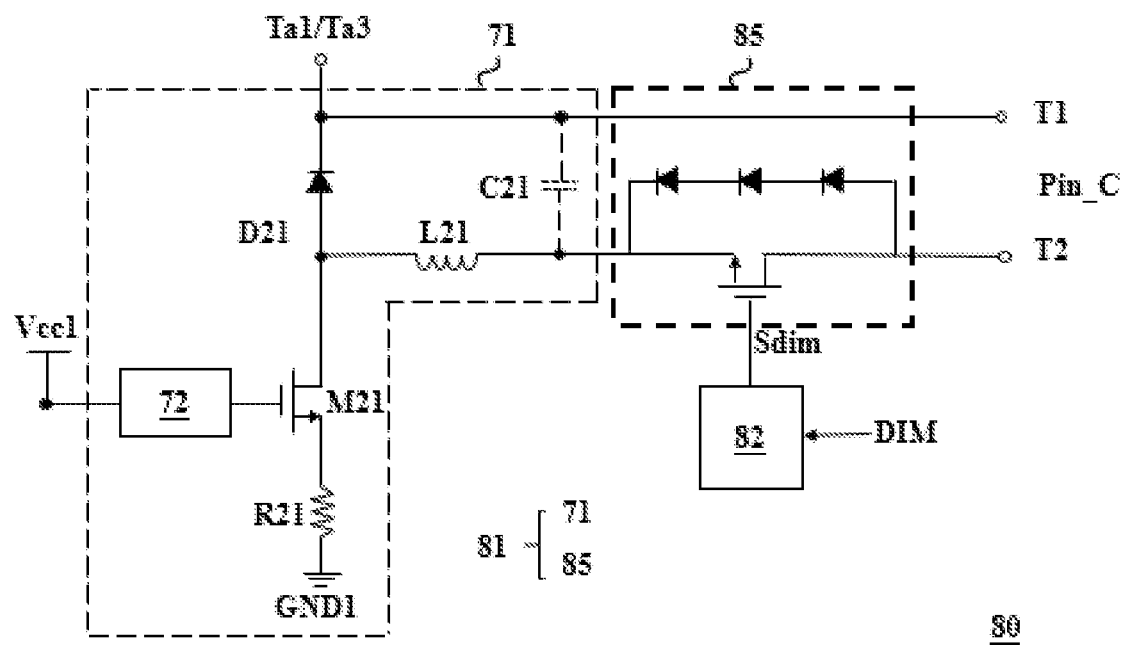

Referring to FIG. 5D, which is a schematic diagram of a circuit structure of a dimmer in accordance with some embodiments of the present disclosure. In this embodiment, the signal synthesis module 81 includes a power converting circuit 71 and a signal synthesis processing module 85. The signal synthesis processing module 85 is electrically connected to the power converting circuit 71 to adjust the voltage of the power supply end T1 based on the dimming signal Sdim. Similar to the above-mentioned embodiments, the output voltage of the power converting circuit 71 (i.e., the voltage of the power supply end T1) is adjusted based on the dimming signal Sdim, however, the Z technical configuration in this embodiment are different from those of the above-mentioned embodiments.

The signal synthesis processing module 85 includes a transistor M32, diodes D33, D34 and D35. The first pin of the transistor M32 is electrically connected to one end of the inductor L21, the second pin of the transistor M32 is electrically connected to the second power supply end T2, and the third pin of the transistor M32 is electrically connected to the command converting module 82. The diodes D33, D34 and D35 are connected in series and connected in parallel with the first pin and the second pin of the transistor M32.

Referring to FIG. 8A additionally, the transistor M32 is turned on/off under the control of the dimming signal Sdim. When the dimming signal Sdim is at a low level, the transistor M32 is turned off, and the power supply signal output by the power converting circuit 71 is supplied to the LED lighting device through the first transmission path formed by the diodes D33, D34 and D35, and the voltage of the modulated power supply Pin_C is Vset; and when the dimming signal Sdim is at high level, the transistor M32 is turned on, the transistors D33, D34 and D35 are bypassed, the power supply signal output by the power converting circuit 71 is supplied to the LED lighting device through the second transmission path formed by the transistor M32, and the voltage of the modulated power supply Pin_C is V set1.

Since the second transmission path has a smaller impedance than the first transmission path, compared to the first transmission path, the voltage Vset1 of the modulated power supply Pin_C formed when the second path is turned on is bigger than the voltage Vset. Correspondingly, a pulse signal with the same frequency and pulse width as the dimming signal Sdim is formed on the modulated power supply Pin_C.

In some embodiments, the diodes D33, D34 and D35 can be collectively referred as a voltage dividing unit, and the transistor M32 can be referred as a control unit.

Figure 5E:
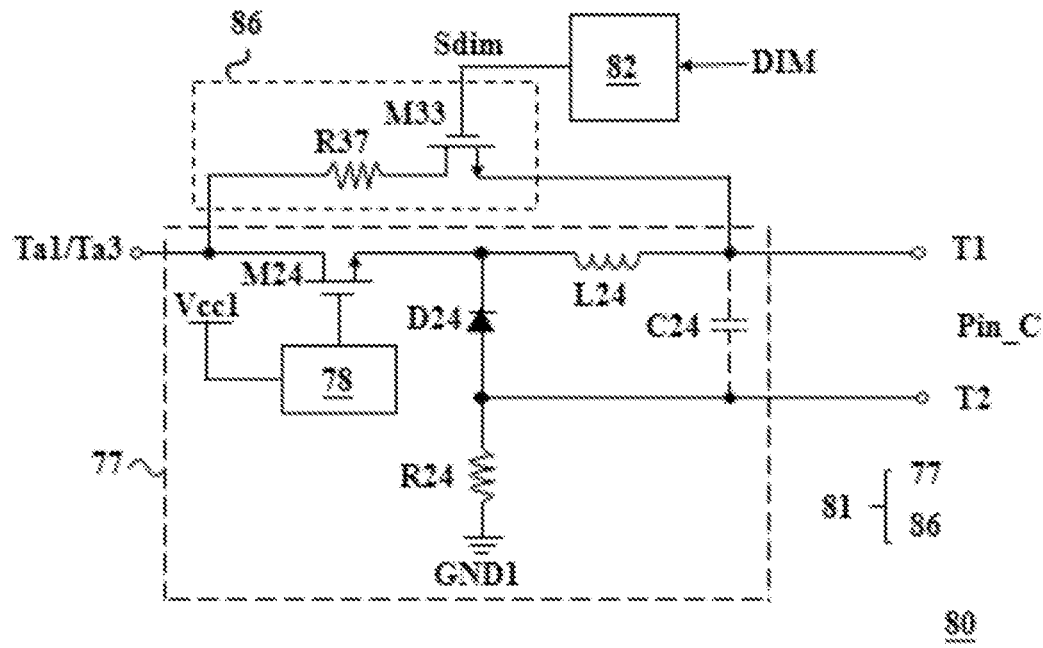

FIG. 5E is a schematic diagram of a circuit structure of a dimmer in accordance with some embodiments of the present disclosure. In this embodiment, the signal synthesis module 81 includes a power converting circuit 77 and a signal synthesis processing module 86. The signal synthesis processing module 86 is electrically connected to the power converting circuit 77 and is configured to adjust the voltage between the power supply ends T1 and T2 based on the dimming signal Sdim. This embodiment is similar to the embodiment shown in FIG. 5C and FIG. 5D, in that the output voltage (i.e., the voltage of the power supply end T1) is adjusted by the signal synthesis processing module, however, the technical configuration in this embodiment is different from the above-mentioned embodiments.

The circuit structure of the power converting circuit 77 is similar to that of the power converting circuit 71, which is also a Buck type power converting circuit. The difference is that the connection mode of the components in the power converting circuit 77 is different from that of the power converting circuit 71. The power converting circuit 77 includes a switching control circuit 78, a resistor R24, an inductor L24, a diode D24, a capacitor C24 and a transistor M24. The resistor R24, the inductor L24, the diode D24, the capacitor C24 and the transistor M24 form a converting circuit 79. The first pin of the transistor M24 is electrically connected to the filter output end Ta1/Ta3, the second pin is electrically connected to the cathode of the diode D24 and the first pin of the inductor L24, and the third pin is electrically connected to the switching control circuit 78. The second pin of the inductor L24 is electrically connected to the first power supply end T1. The anode of the diode D24 is electrically connected to the first pin of the resistor R24 and the second power supply end T2. Two ends of the capacitor C24 are electrically connected to the power supply ends T1 and T2 respectively. The second pin of the resistor R24 is electrically connected to the ground end GND1. The working principle of the power converting circuit 71 is similar to that of the embodiment described in FIG. 4B and is omitted herein.

The signal synthesis processing module 86 includes a transistor M33 and a resistor R37. The first pin of the transistor M33 is electrically connected to the first pin of the resistor R37, the second pin thereof is electrically connected to the first power supply end T1, and the third pin thereof is electrically connected to the command converting module 82. The second pin of the resistor R37 is electrically connected to the filter output end Ta1/Ta3.

The operation principle of the dimmer of this embodiment would be described below with reference to FIG. 8A. The transistor M33 is turned on/off under the control of the dimming signal Sdim. When the dimming signal Sdim is at a low level, the transistor M33 is turned off, and the waveform of the power supply signal Sp output by the power supply output ends T1 and T2 (i.e., the modulated power supply Pin_C with voltage Vset) is shown in FIG. 8A, which is the output signal after the power converting circuit 77 performs the power conversion. When the dimming signal Sdim is at a high level, the transistor M 33 is turned on, and the filtered signal is directly output to the power supply ends T1 and T2 through the path formed by the resistor R37 and the transistor M 33, and the voltage of the modulated power supply Pin_C is Vset1. In this embodiment, the power converting circuit 77 is a step-down power converting circuit, so Vset1>Vset. Correspondingly, if the dimming signal is a pulse signal, the modulated signal Pin_C can be obtained from the power supply ends T1 and T2 after modulated by the signal synthesis module 86, and waveform of modulated signal Pin_C is shown in FIGS. 8A-8B.

In some embodiments, the resistor R37 can be omitted without affecting the intended function of the embodiments.

Through the description of the above embodiments, those skilled in the art can understand how to make the dimmer to output the modulated power supply Pin_C with dimming information. The following would further explain how the LED lighting device lights up and emits light through the modulated power supply Pin_C and at the same time demodulates the dimming information from the modulated power supply Pin_C, and then adjusts the LED control based on the dimming information. Through the dimmer of the above embodiments, those skilled in the art is able to understand how to load the dimming signal to the modulated power supply Pin_C and use the modulated power supply Pin_C to dim the load.

Figure 1C:
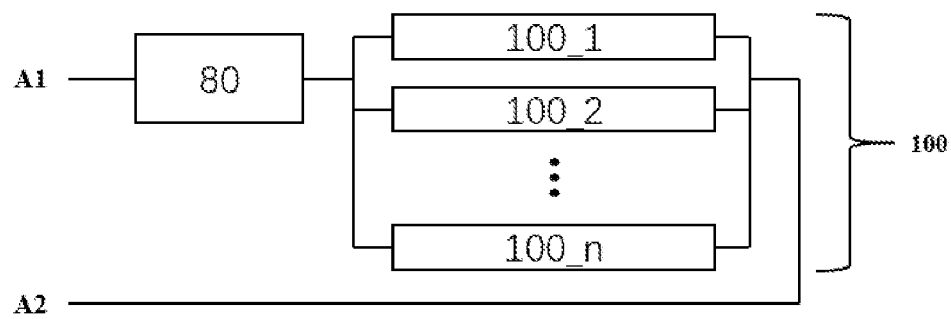

Referring to FIG. 1C, which is schematic diagrams of functional modules of an LED lighting system in accordance with some embodiments of the present disclosure. The LED lighting system 10 includes a dimmer 80 and an LED lamp 100. The dimmer 80 is connected between the power input end A1 and the LED lamp 100 and is configured to convert the set dimming information into a dimming signal and load the dimming signal onto the power signal to generate a dimming power signal. The LED lamp 100 includes multiple lamps such as LED lamp 100_1 and LED lamp 1002. The LED lamp 100 receives the dimming power signal output by the dimmer 80, demodulates the dimming signal included in the dimming power signal, and adjusts the luminance or color of the LED lamp 100 based on the dimming signal. The LED lamps 100_1, 100_2 . . . 100_n (n is a positive integer greater than or equal to 1) can receive the dimming power signal output by the dimmer 80 at the same time, and the luminance or color of the LED lamps can be adjusted, so that one dimmer can achieve the purpose of simultaneously adjusting multiple lamps. In this embodiment, the LED lamps 100_1, 100_2 . . . 100_n are LED lamps with the same or similar configuration. In some embodiments, the dimming power signal can also be referred as a modulated power supply.

In this embodiment, one end of the dimmer 80 is electrically connected to the power input end A1, and the other end is connected to the LED lamp 100. Through this configuration, the purpose of dimming can be achieved by using a single power line (also known as, the single live wire dimming). Basically, since the traditional wall switch is connected in series between the power input end A1 and the LED lamp, the traditional wall switch can directly be replaced by the dimmer 80 and the existing lighting system can be upgraded without re-arranging the power lines. Consequently, the configuration of this embodiment can be easily configured to upgrade the lighting system and the installation cost can be reduced.

In this embodiment, the LED lamp 100 can be any LED lamp powered by external power, such as LED straight tube lamp, LED downlight, LED ceiling lamp and the like.

Figure 8C:
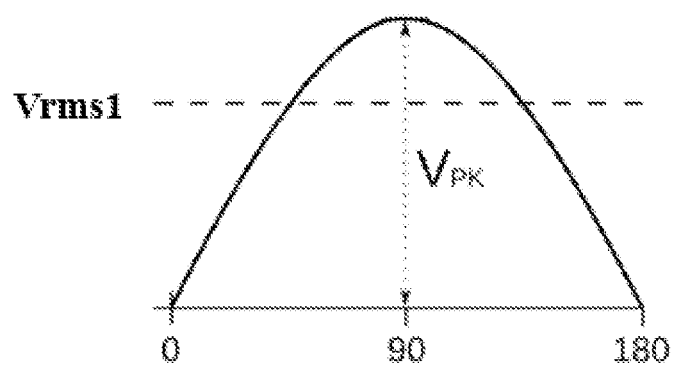
FIG. 8C is a schematic diagram of a dimming waveform of an LED lighting system in accordance with some embodiments of the present disclosure.
Figure 8C:
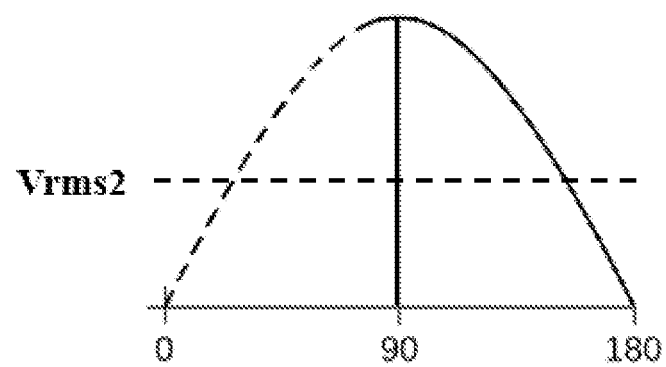
Figure 8C:
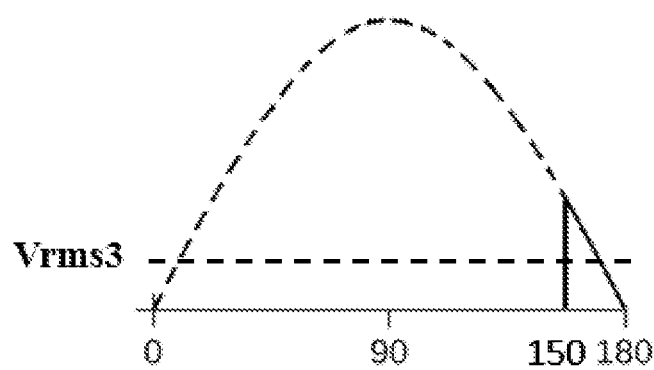
Figure 8D:
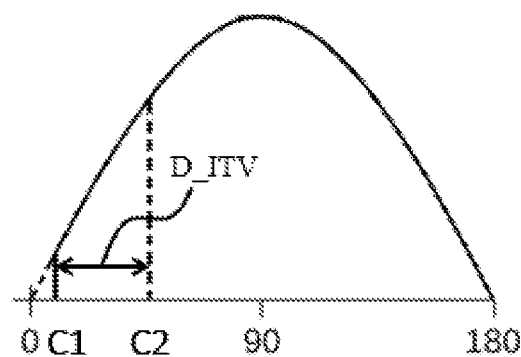
FIGS. 8D and 8E are schematic diagrams of dimming waveforms in accordance with some embodiments of the present disclosure.
Figure 8D:
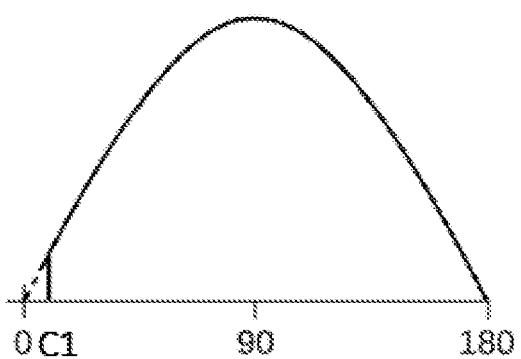
Figure 8D:
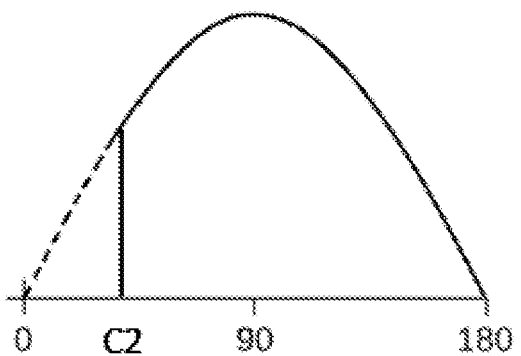
Figure 8E:
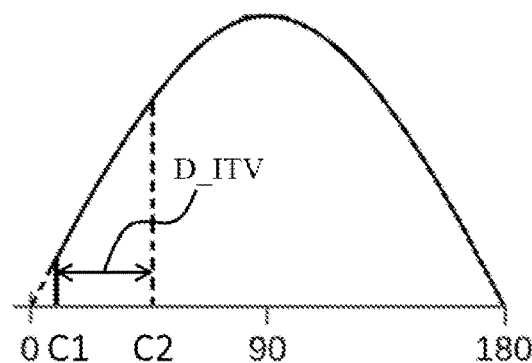
Figure 8E:
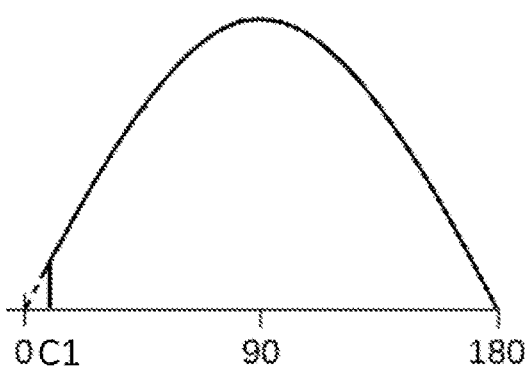
Figure 8E:
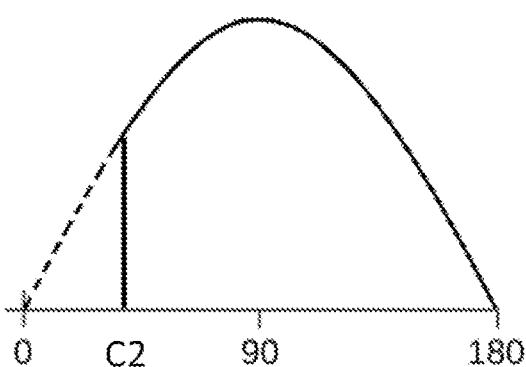
Figure 8F:
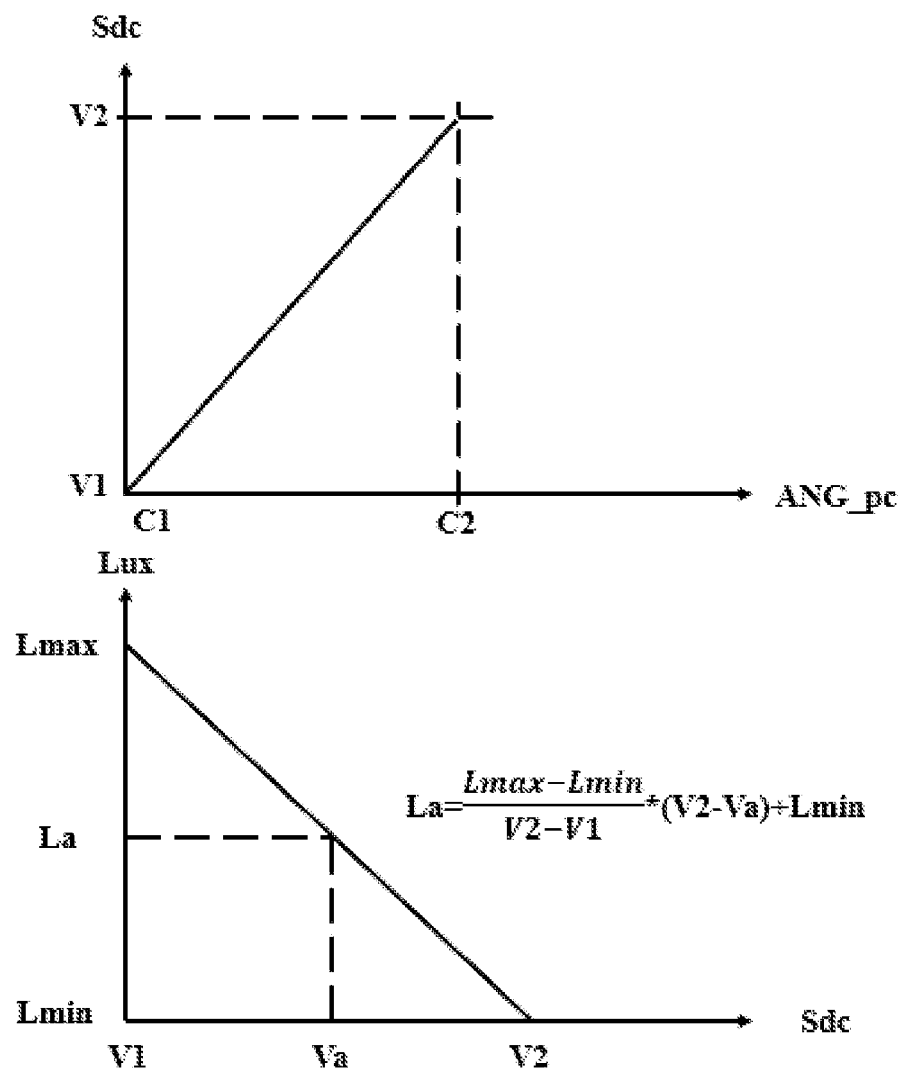
FIGS. 8F and 8G are schematic diagrams of the corresponding relationship between the phase cutting angle, the demodulation signal and the luminance of the LED module in accordance with some embodiments of the present disclosure.
Figure 8G:
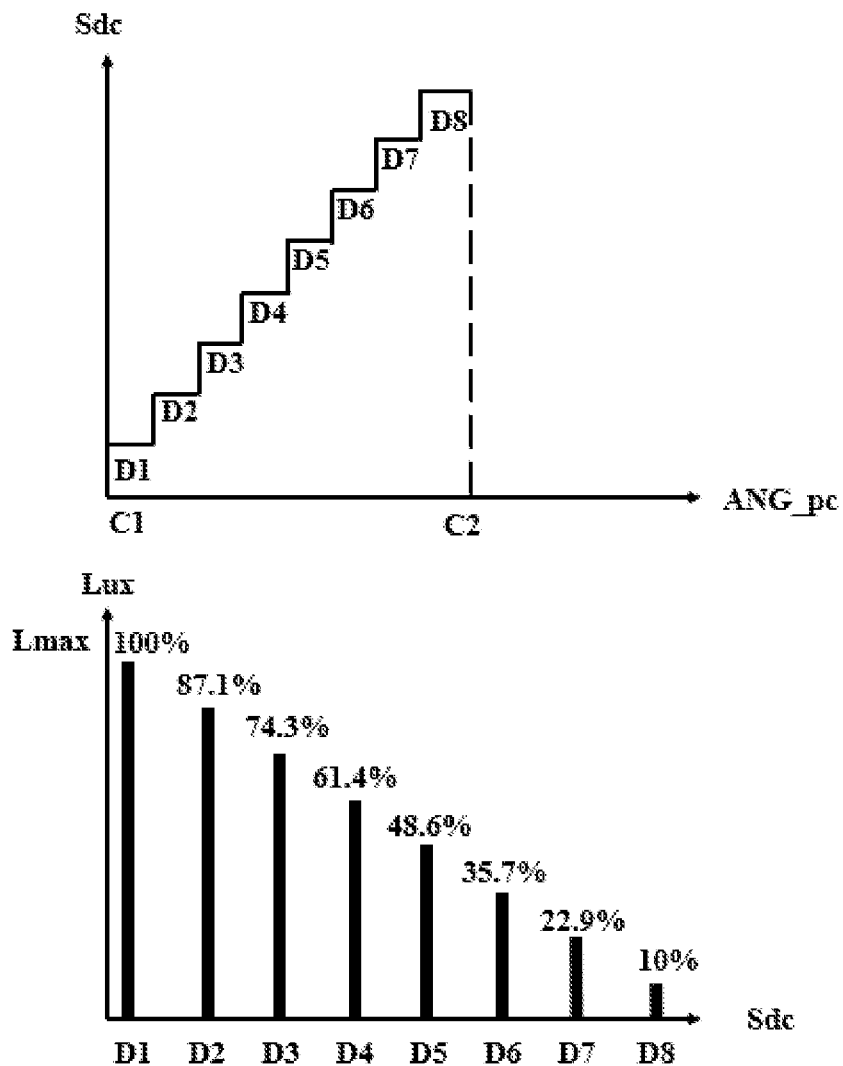
Figure 8H:
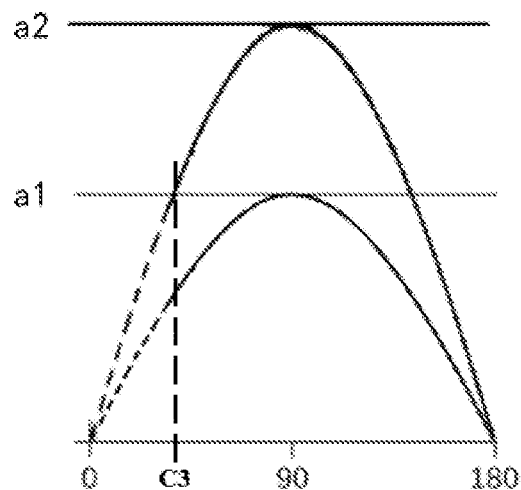
FIG. 8H is a schematic diagram of input power waveforms of LED lighting devices under different power grid voltages in accordance with some embodiments of the present disclosure.
Figure 8I:
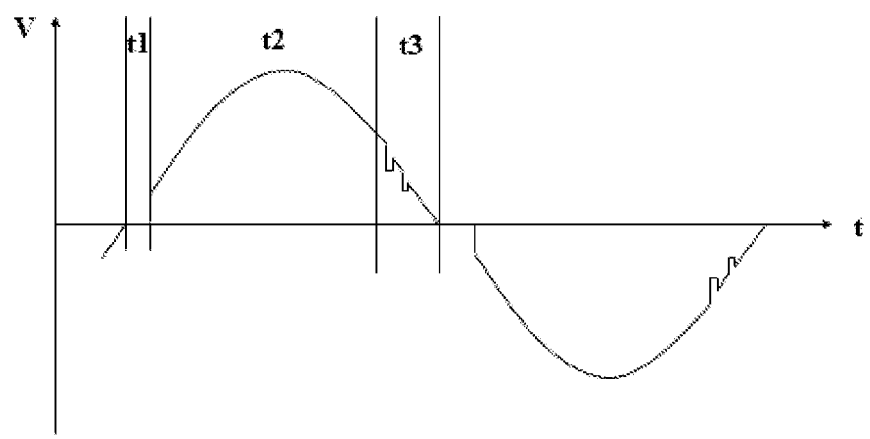
FIG. 8I is a schematic waveform diagram of a dimming power signal of an LED lighting system in accordance with some embodiments of the present disclosure.

Referring to FIG. 8I, which is a schematic waveform diagram of a dimming power signal of an LED lighting system in accordance with some embodiments of the present disclosure. The AC half-wave can be divided into 3 phases. The power supply stage t1 can be configured to power the control unit. The power stage t2 can be configured to provide power to the LED lamp so the LED lamp can be lighted up. The data stage t3 can be configured to load the dimming signal onto the power signal to generate the dimming power signal.

Figure 5F:
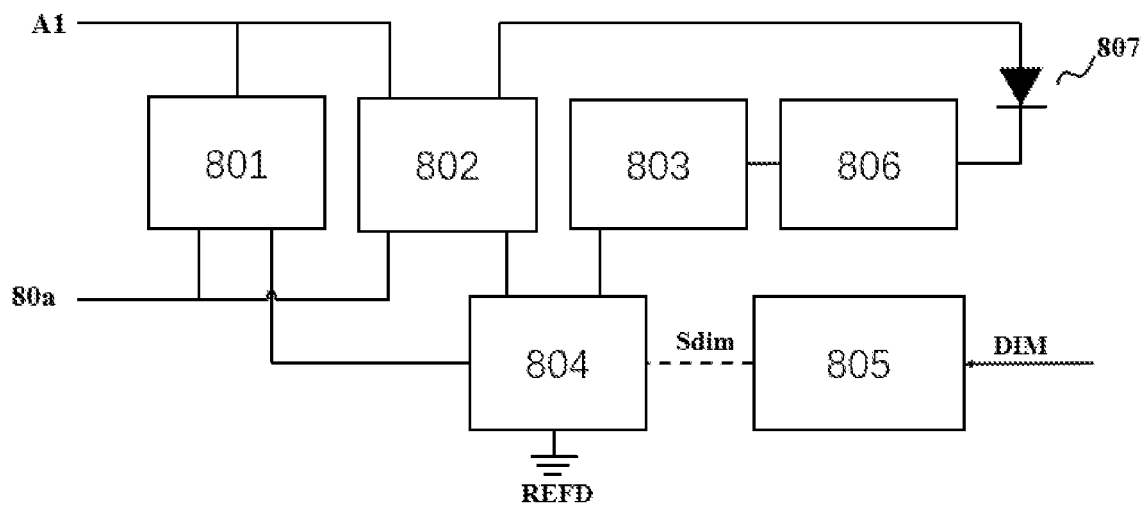
FIG. 5F is a schematic circuit block diagram of a dimmer in accordance with some embodiments of the present disclosure.

Referring to FIG. 5F, which is a schematic circuit block diagram of a dimmer in accordance with some embodiments of the present disclosure. The dimmer 80 includes a zero-crossing detecting module 801, a data modulating module 802, a power supply module 803, a control module 804, a dimming signal generating module 805, a filtering circuit 806 and a diode 807. The zero-crossing detecting module 801 is electrically connected to the power input end A1, the dimmer output end 80a and the control module 804, respectively. The zero-crossing detecting module 801 collects the power signal of the power input end A1 and the dimmer output end 80a, and when the waveform is converted from a positive half cycle to a negative half cycle or from a negative half cycle to a positive half cycle, and passes through zero potential, a zero-crossing signal would be generated, and the zero-crossing signal is sent to the control module 804. The data modulating module 802 is electrically connected to the power input end A1, the dimmer output end 80a, the control module 804 and the anode of the diode 807, respectively. The data modulating module 802 is controlled by the control module 804 to load the dimming signal Sdim onto the power signal, generate the dimming power signal, and transmit dimming power signal to subsequent loads through the dimmer output end 80a. The power supply module 803 is connected to the filtering circuit 806 and the control module 804 respectively. The power supply module 803 is configured to perform a power conversion on the received power signal to generate a power supply signal for use by the dimmer 80. The dimming signal generating module 805 is electrically connected to the control module 804. The dimming signal generating module 805 is configured to convert the set dimming command DIM into a dimming signal Sdim and send dimming signal Sdim to the control module 804. The control module 804 receives the dimming signal Sdim from the dimming signal generating module 805 and loads the dimming signal Sdim onto the power signal through the data modulating module 802 to generate the dimming power signal. The control module 804 receives the zero-crossing signal from the zero-crossing detecting module 801 and starts data modulation at a specific time after receiving the zero-crossing signal. The filtering circuit 806 is electrically connected to the data modulating module 802 through the diode 807, receives and filters the power signal processed by the data demodulating module 802, generates a filtered signal, and transmits the filtered signal to the power supply module 803. The cathode of the diode 807 is electrically connected to the filtering circuit 806 to prevent the current of the filtering circuit 806 from flowing into the data modulating module 802 and causing interference to the data modulating module 802.

The control module 804 is electrically connected to the circuit node REFD, and the circuit node REFD can be served as a reference potential node in the circuit.

In some embodiments, the dimming signal generating module 805 may include a wireless remote controller and a signal receiving module. The wireless remote control module is configured to convert the dimming command DIM set by the user into a wireless dimming signal and send wireless dimming signal to the signal receiving module. The signal receiving module receives the wireless dimming signal and converts the wireless dimming signal into the dimming signal Sdim. The dimming signal Sdim includes the set dimming information. In some embodiments, the dimming signal generating module can also be referred as a command converting module.

In some embodiments, the dimming signal generating module 805 may further include a light sensing module (not shown in the figure). The light sensing module is configured to receive ambient light and generate the dimming signal Sdim based on the intensity of the ambient light, so as to realize the function of automatically adjusting the luminance of the LED lamp based on the ambient light.

Figure 11A:
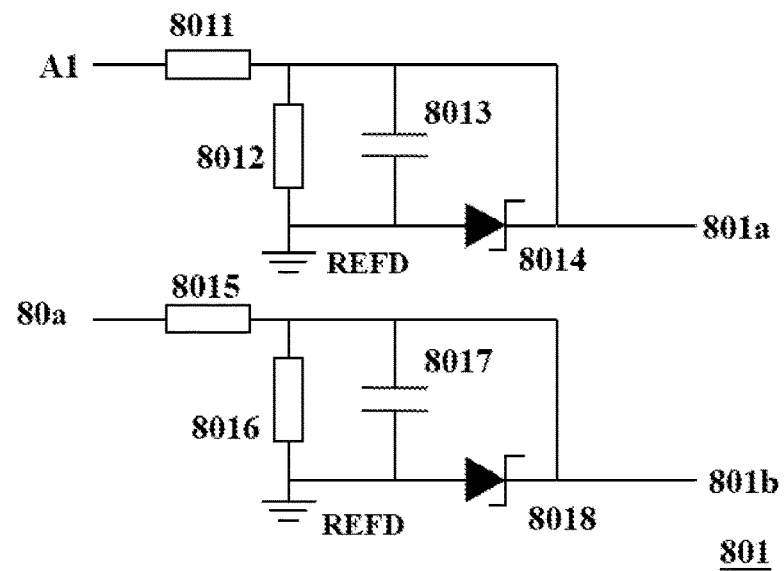
FIG. 11A is a schematic circuit diagram of a zero-crossing detecting module in accordance with some embodiments of the present disclosure.

Referring to FIG. 11A, which is a schematic circuit diagram of a zero-crossing detecting module in accordance with some embodiments of the present disclosure. The zero-crossing detecting module 801 includes resistors 8011, 8012, 8015 and 8016, capacitors 8013 and 8017, and Zener diodes 8014 and 8018. The first pin of the resistor 8011 is electrically connected to the power input end A1, and the second pin of the resistor 8011 is electrically connected to the first pin of the resistor 8012. The second pin of the resistor 8012 is electrically connected to the circuit node REFD. The capacitor 8013 and the resistor 8012 are connected in parallel. The anode of the Zener diode 8014 is electrically connected to the circuit node REFD, the cathode thereof is electrically connected to the output end 801a of the zero-crossing detecting module 801, and the output end 801a of the zero-crossing detecting module 801 is electrically connected to the control module 804. The component configuration of the zero-crossing detecting module 801 between the dimmer output end 80a and the output end 801b of the zero-crossing detecting module 801 is similar to that between the power input end A1 and the output end 801a of the zero-crossing detecting module 801. The first pin of the resistor 8015 is electrically connected to the dimmer output end 80a, and the second pin of the resistor 8015 is electrically connected to the first pin of the resistor 8016. The second pin of the resistor 8016 is electrically connected to the circuit node REFD. The capacitor 8017 is connected in parallel with the resistor 8016. The anode of the Zener diode 8018 is electrically connected to the circuit node REFD, the cathode thereof is electrically connected to the output end 801b of the zero-crossing detecting module 801, and the output end 801b of the zero-crossing detecting module 801 is electrically connected to the control module 804.

The operating principle of the zero-crossing detecting module 801 will be described below in reference to FIG. 11A. Due to divided voltages respectively on the resistors 8011 and 8012, the voltage across the resistor 8012 is proportional to the voltage between the power input end A1 and the circuit node REFD (or, reference potential point REFD). The capacitor 8013 is configured to stabilize the voltage across the resistor 8012. The Zener diode 8014 is configured to limit the maximum voltage across the resistor 8012 to a preset value. The output end 801a of the zero-crossing detecting module 801 is configured to transmit the voltage signal on the resistor 8012 to the control module 804. Similar to the arrangement between the power input end A1 and the output end 801a of the zero-crossing detection module 801, the output end 801b of the zero-crossing detecting module 801 also transmits the voltage on the resistor 8016 to the control module 804. Inside the control module 804, the output end 801a of the zero-crossing detecting module 801 is electrically connected to a positive input end of a comparator, and the output end 801b of the zero-crossing detecting module 801 is electrically connected to a negative input end of the comparator. In some embodiments, the comparator can also be disposed outside the control module 804. When the waveform at the power input end A1 changes from a negative half cycle to a positive half cycle, the voltage at the output end 801a of the zero-crossing detection module 801 is higher than the voltage at the output end 801b of the zero-crossing detection module 801, and the comparator outputs a high-level signal. When the waveform at the power input end A1 changes from a positive half cycle to a negative half cycle, the voltage at the output end 801a of the zero-crossing detection module 801 is lower than the voltage at the output end 801b of the zero-crossing detection module 801, and the comparator outputs a low-level signal. The control module 804 can determine the zero-crossing point by detecting the level change at the output end of the comparator.

Figure 11B:
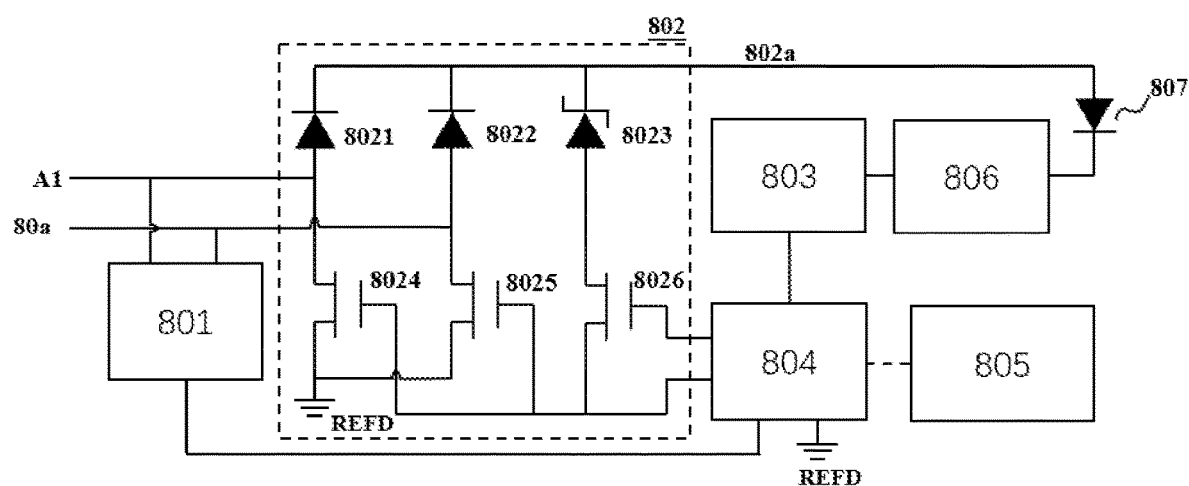
FIG. 11B is a schematic circuit diagram of a data modulating module in accordance with embodiment of the present disclosure.

Referring to FIG. 11B is a schematic circuit diagram of a data modulating module in accordance with embodiment of the present disclosure The data modulating module 802 includes diodes 8021, 8022 and 807, a Zener diode 8023, and MOSFETs 8024, 8025 and 8026. The anode of the diode 8021 is electrically connected to the power input end A1 and the first pin of the MOSFET 8024. The cathode of the diode 8021, the cathode of the diode 8022 and the cathode of the Zener diode 8023 are electrically connected to the anode of the diode 807. The cathode of the diode 807 is electrically connected to the filtering circuit. The anode of the diode 8022 is electrically connected to the first pin of the MOSFET 8025. The anode of the Zener diode 8023 is electrically connected to the first pin of the MOSFET 8026. The second pin of the MOSFET 8024 is electrically connected to the second pin of the MOSFET 8025 and is electrically connected to the circuit node REFD. The third pin of the MOSFET 8024, the third pin of the MOSFET 8025 and the second pin of the MOSFET 8026 are electrically connected to the control module 804.

The operation of the data modulating module 802 at various circuit stages are described below in reference to FIG. 8I.

In the power supply stage t1, the data modulating module 802 can be configured as a rectifying circuit to rectify the received external power signal to generate a rectified signal, and the filtering circuit 806 filters the rectified signal after receiving the rectified signal. The operation principle of the data modulating module 802 as a rectifying circuit would be described below. In the power supply stage t1, the MOSFET 8024 and the MOSFET 8025 have not received the enable signal and are in a disconnected state. The body diodes of the MOSFET 8024 and the MOSFET 8025 together with the diode 8021 and the diode 8022 form a full-bridge rectifying circuit and can be configured to rectify the received power signal is rectified to obtain the rectified signal. The anode of the body diode of the MOSFET 8024 is electrically connected to the circuit node REFD, and the cathode thereof is electrically connected to the anode of the diode 8021. Similarly, the anode of the body diode of the MOSFET 8025 is electrically connected to the circuit node REFD, and cathode thereof is electrically connected to the anode of the diode 8022.

In the power stage t2, the third pin of MOSFET 8024 and the third pin of MOSFET 8025 receive the enable signal from the control module 804, and the MOSFET 8024 and MOSFET 8025 are closed and turned on, and the external power signal can pass through the power a loop formed by the signal input end A1, the MOSFET 8024, the MOSFET 8025 and the dimmer output end 80a to be directly transmitted to the LED lamp 100.

In the data stage t3, the data modulating module 802 acts as a modulating circuit to load the dimming signal Sdim onto the power line. The control module 804 controls the MOSFET 8026 to be intermittently turned on, and the dimming signal can be loaded onto the power signal to generate the dimming power signal in coordination with the actions of the MOSFET 8024 and the MOSFET 8025. Referring to the signal waveform at the data stage t3 shown in the FIG. 8I, in this embodiment, each half-wave carries a set of data, and the set of data includes at least one digital signal. One pulse at data stage t3 on the waveform diagram can be corresponding to one digital signal. The dimming data can be formed by combining a plurality of digital signals. The dimming data is a digital signal, which can carry luminance and color information, or other dimming information at the same time.

Using the circuit characteristics of the MOSFETs in the data modulating module 802, the data modulating module 802 can implement different circuit functions in different circuit stages. In the power supply stage t1, the MOSFETs 8024 and 8025 in the data modulating module 802 are in a cut-off/disconnected state, and the body diodes of the MOSFETs 8024 and 8025 together with the diodes 8021 and 8022 form a full-bridge rectifying circuit to rectify the received power signal, to generate a rectified signal. In the power stage t2, the MOSFETs 8024 and 8025 in the data modulating module 802 are in a conducting state, and the external power signal can directly pass through the power supply path formed by the power input end A1, the MOSFETs 8024 and 8025 and the dimming output end 80a to be supplied to the LED lamp 100. In the data stage t3, the MOSFETs 8024 and 8025 in the data modulating module 802 work in the amplification area, and the MOSFET 8026 is driven to be intermittently turned on, so that the pulse signal can be generated on the power signal (refer to FIG. 8I). The pulse width of the pulse signal corresponds to the conduction/turned-on time of the MOSFET 8026. Using the characteristics of the pulse signal to characterize the 1s and 0s of the digital signal, the digital signal can be loaded onto the power signal. The characteristics of the pulse signal include, but are not limited to, the width of the pulse signal, the amplitude of the pulse signal, and the like.

Through this configuration, the data modulating module 802 can operate in the power supply stage t1, the power stage t2 and the data stage t3 respectively, so as to realize multiple circuit functions through one circuit configuration, greatly simplify the circuit structure and save costs.

In some embodiments, the data modulating module 802 may only operate in one or both of the power stage t1, the power stage t2 and the data stage t3.

Figure 12A:
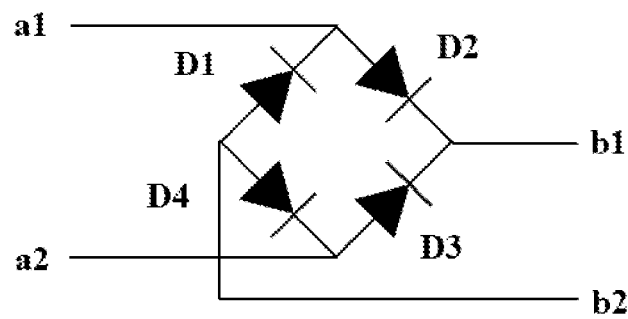
FIGS. 12A-12B are schematic diagrams of circuit structures of rectifying circuits in accordance with some embodiments of the present disclosure.
Figure 12B:
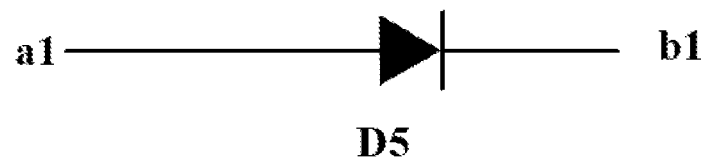
Figure 12C:
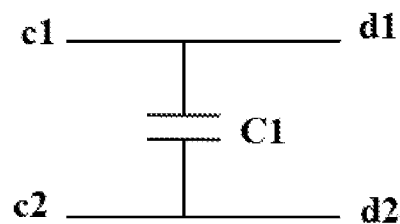
FIGS. 12C-12D are schematic diagrams of circuit structures of filtering circuits in accordance with some embodiments of the present disclosure.

FIG. 12C is a schematic diagram of a circuit structure of a rectifying circuit in accordance with some embodiments of the present disclosure. In this embodiment, the filtering circuit FC1 includes a capacitor C1. The first pin of the capacitor C1 is electrically connected to the connecting ends c1 and d1, and the second pin of the capacitor C1 is electrically connected to the connecting ends c2 and d1.

Figure 12D:
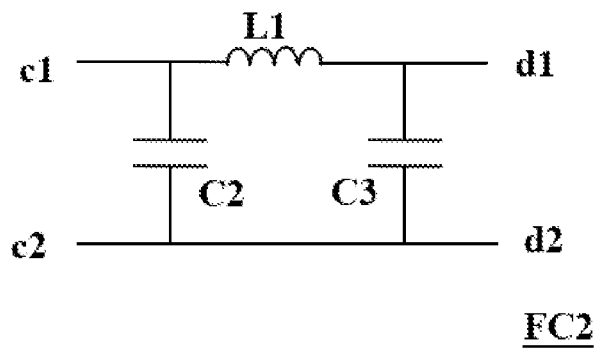

FIG. 12D is a schematic diagram of a circuit structure of a rectifying circuit in accordance with some embodiments of the present disclosure. In this embodiment, the filtering circuit FC2 includes capacitors C2 and C3 and an inductor L1. The first pin of the inductor L1 is electrically connected to the connecting end c1, and the second pin of the inductor L1 is electrically connected to the connecting end d1. The capacitor C2 is electrically connected to the connecting ends c1 and c2, respectively. The capacitor C3 is electrically connected to the connecting ends d1 and d2, respectively. The filtering circuit FC2 is a π-type filtering circuit, which filters the received circuit signal to generate a filtered signal.

The filtering circuit 806 in the dimmer 80 can be implemented by the filtering circuit FC1 or FC2 in FIG. 12C or 12D. Further, the connecting end c1 is electrically connected to the cathode of the diode 807, the connecting end c2 is electrically connected to the circuit node REFD, and the connecting ends d1 and d2 are respectively electrically connected to the power supply module 803.

In this embodiment, the filtering circuit FC1 or FC2 filters the received power signal and generates a filtered signal to be used by the power supply module 803.

In some embodiments, the filtering circuit 806 may be implemented by other forms of filtering circuit structures, and the present disclosure is not limited thereto.

The power supply module 803 of the dimmer 80 can be implemented by the circuit structure of the power converting circuit 71 shown in FIG. 4A. Further, the input end of the power converting circuit 71 is electrically connected to the filter circuit 806 and is configured to receive the filtered signal, perform a power conversion to the filtered signal, and convert the received filtered signal into a stable output signal of the power supply module 803.

In this embodiment, the power supply module 803 can include the step-down DC-to-DC converting circuit described in FIG. 4B to perform step-down conversion on the received filtered signal. For the working principle of the step-down DC-to-DC converting circuit, please refer to the relevant description in FIG. 4B, which is omitted herein. In this embodiment, the power supply module 803 can be any one of a buck circuit, a boost circuit, and a boost-buck circuit based on practical applications.

Figure 12E:
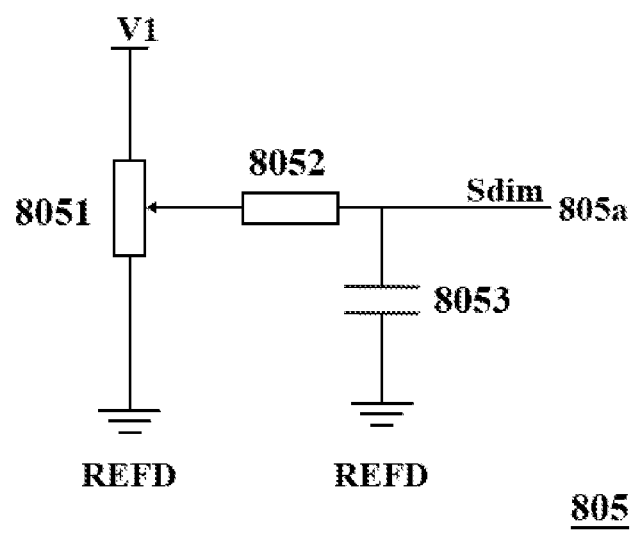
FIG. 12E is a schematic circuit diagram of a dimming signal generating module in accordance with some embodiments of the present disclosure.

FIG. 12E is a schematic circuit diagram of a dimming signal generating module in accordance with some embodiments of the present disclosure. The dimming signal generating module 805 includes a variable resistor 8051, a resistor 8052 and a capacitor 8053. The first pin of the variable resistor 8051 is electrically connected to the voltage source V1, the second pin of the variable resistor 8051 is connected to the circuit node REFD, and the third pin of the variable resistor 8051 is connected to the first pin of the resistor 8052. The first pin of the capacitor 8053 is electrically connected to the second pin of the resistor 8052, and the second pin of the capacitor 8053 is electrically connected to the circuit node REFD. The output end 805 $a$ of the dimming signal generating module 805 is electrically connected to the second pin of the resistor 8052. The voltage source V1 is configured to provide a constant voltage. In this embodiment, the variable resistor 8051 can be a sliding rheostat. By changing the position of the third pin of the variable resistor 8051, the voltage of the third pin relative to the circuit node REFD can vary between 0 and V1, and the voltage change from 0 to V1 may correspond to different luminance of the LED lamp. The voltage signal corresponding to the third pin of the variable resistor 8051 can be referred as the dimming signal Sdim. The output end 805$a$ of the dimming signal generating module 805 is electrically connected to the control module 804, and the dimming signal Sdim can be transmitted to the control module 804 through the output end 805$a$ of the dimming signal generating module 805.

In some embodiments, the dimming signal generating module 805 may include a wireless remote control and a signal receiving module. The wireless remote control module is configured to convert the dimming information set by the user into a wireless dimming signal and send the wireless dimming signal to the signal receiver module. The signal receiving module receives the wireless dimming signal and converts the wireless dimming signal into the dimming signal Sdim. The dimming signal Sdim includes the set luminance or color information.

In some embodiments, the dimming signal generating module 805 may further include a light sensing module. The light sensing module is configured to receive ambient light and generating the dimming signal Sdim based on the intensity of the ambient light. Thus, the function of the LED lamp to automatically adjust the luminance or color based on the ambient light is realized.

In the present disclosure, the LED lamp 100 can be referred to as an LED lighting device in some embodiments. The LED lamp 100 can be implemented by the circuit structure of FIGS. 6A-6B. The difference is that, in this embodiment, the LED lamp 100 is electrically connected to the dimmer output end 80$a$ and the power input end A2, that is, the first connecting end 101 is electrically connected to the dimmer output end 80$a$, the second connecting end 102 is electrically connected to the power input end A2 to receive the dimming power signal output by the dimmer and demodulating the dimming information therein for dimming.

Figure 1D:
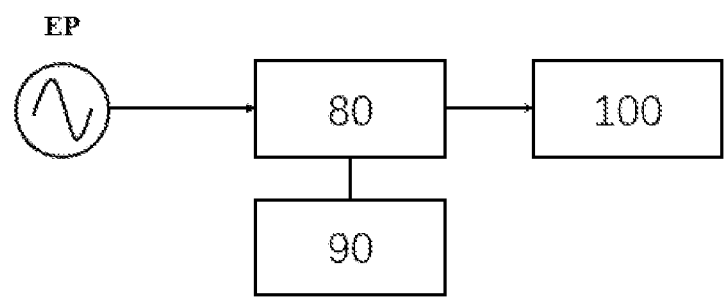
FIG. 1D is a circuit block diagram of a fault detecting module in accordance with some embodiments of the disclosure.
Figure 1E:
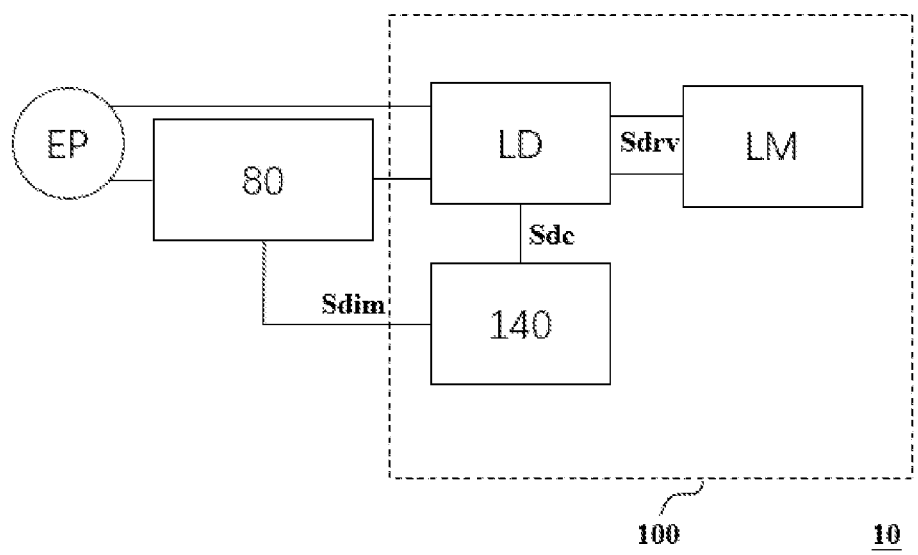
FIG. 1E is a schematic diagram of functional modules of an LED lighting system in accordance with some embodiments of the disclosure.
Figure 1F:
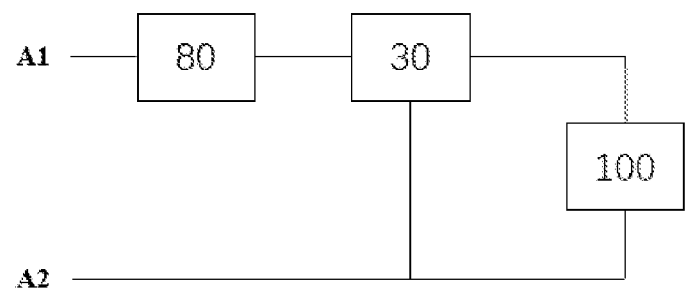
FIG. 1F is a schematic diagram of functional modules of an LED lighting system in accordance with some embodiments of the disclosure.

Referring to FIG. 1F, which is a schematic diagram of functional modules of an LED lighting system in accordance with some embodiments of the disclosure. The LED lighting system 10 further includes a sensor 30. The sensor 30 is electrically connected to the dimmer 80 and the LED lamp 100 and is configured to switch on and off a power supply loop based on environmental variables. The power supply loop is a current path formed by the external power signal through the power input end A1, the dimmer 80, the LED lamp 100 and the power input end A2. In this embodiment, the environment variable can be a determination on whether human activity is detected, the intensity of ambient light, and the like. For example, when human activity is detected, the sensor 30 turns on the power supply loop to turn on the LED lamp; when no human activity is detected, the sensor 30 cut off the power supply circuit to turn off the LED lamp 100. Through this arrangement, the LED lighting system 10 can determine whether to turn on the LED lamp 100 by detecting human activity, and only turn on the LED lamps when there are human activities around, thereby resources can be saved, and waste can be reduced.

Figure 22A:
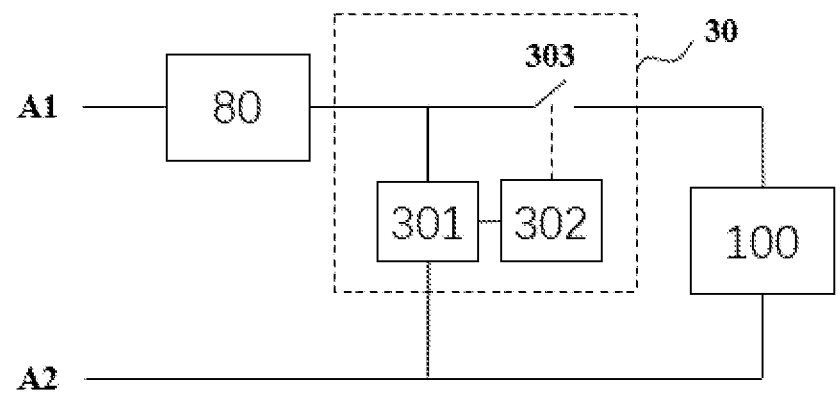
FIG. 22A is a schematic diagram of a circuit structure of a sensor in accordance with some embodiments of the present disclosure.

FIG. 22A is a schematic diagram of a circuit structure of a sensor in accordance with some embodiments of the present disclosure. The sensor 30 includes a sensor power supply module 301, a sensor control module 302 and a switch component 303. The sensor power supply module 301 is electrically connected to the dimmer 80 and the power input end A2. The switching component 303 is electrically connected to the dimmer 80 and the LED lamp 100, that is, connected to the power supply loop. The sensor control module 302 is electrically connected to the sensor power supply module 301 and the switching component 303. The sensor power supply module 301 is configured to receive the dimming power signal output by the dimmer 80 and perform power conversion to generate a low-voltage DC power signal that can be supplied to the sensor control module 302. The sensor control module 302 is configured to process environmental variables and generate control signals to control the on-off of the switching component 303.

Figure 22B:
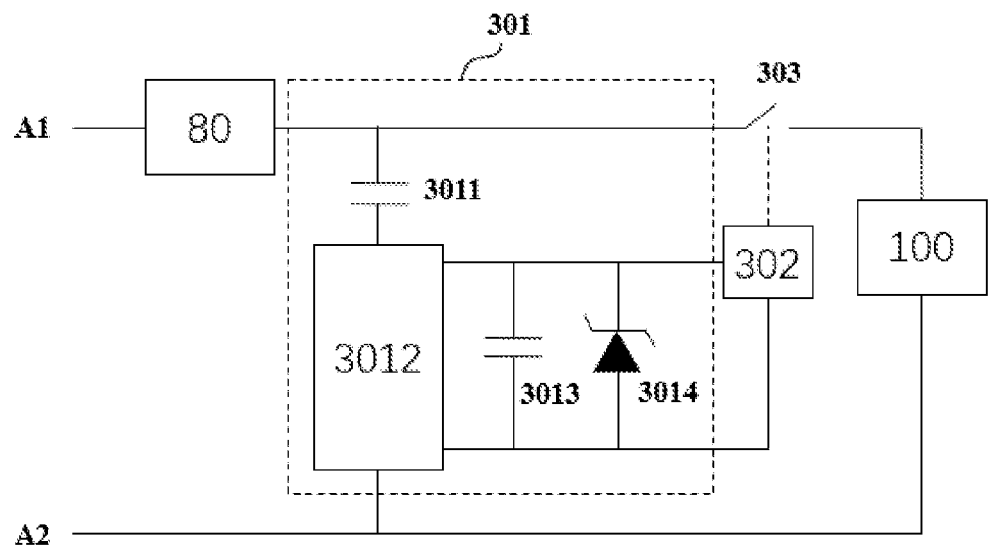
FIG. 22B is a schematic diagram of a circuit structure of a power supply module of a sensor in accordance with some embodiments of the present disclosure.

FIG. 22B is a schematic diagram of a circuit structure of a power supply module of a sensor in accordance with some embodiments of the present disclosure. The sensor power supply module 301 includes capacitors 3011 and 3013, a full-bridge rectifying circuit 3012, and a Zener diode 3014. The first pin of the capacitor 3011 is electrically connected to the output end of the dimmer 80, and the second pin thereof is electrically connected to the input end of the full-bridge rectifying circuit 3012. The power input end A2 is electrically connected to the input end of the full-bridge rectifying circuit 3012. The capacitor 3013 and the Zener diode 3014 are connected in parallel and electrically connected to the output end of the full-bridge rectifying circuit 3012. The sensor control module 302 is electrically connected to both ends of the Zener diode 3014. In this embodiment, the sensor power supply circuit 131 is a resistance-capacitance step-down circuit, which is configured to supply the received dimming power signal to the sensor control module 302 after step-down operation. In some embodiments, both ends of the capacitor 3011 are connected in parallel with a resistor (not shown) for discharging the energy of the capacitor 3011 to increase the stability of the system.

Figure 22C:
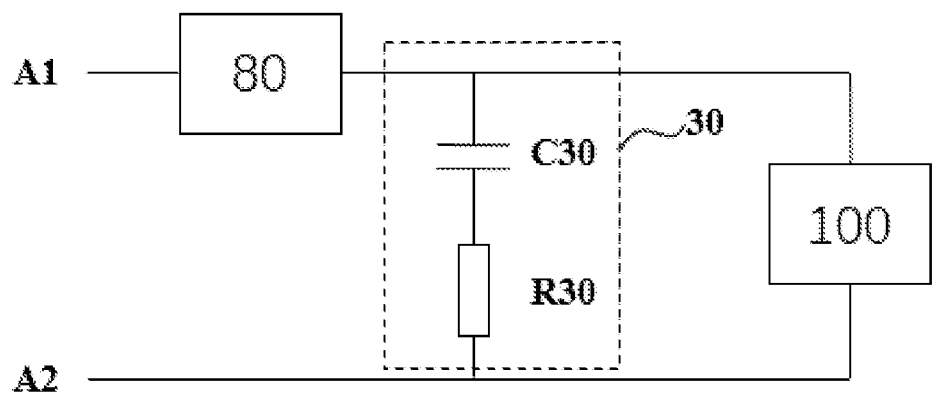
FIG. 22C is a schematic equivalent circuit diagram of the circuit structure shown in FIG. 22B of the present disclosure.

In this embodiment, when the switching component 303 is closed, the circuit structure of FIG. 22B can be equivalent to the circuit structure described in FIG. 22C. Referring to FIG. 22C, the sensor 30 includes a capacitor C30 and a resistor R30. The capacitor C30 and the resistor R30 are connected in series and connected with the LED lamp 100 in parallel.

Referring to FIG. 22C and FIG. 8I together, the dimming power signal is the signal output by the dimmer 80. The sensor 30 and the LED lamp 100 are connected in parallel and electrically connected to the dimmer 80. The circuit characteristics of the sensor 30 may have influence on the dimming power signal. The sensor 30 includes a capacitor C30, and the capacitor C30 would filter the received signal. The waveform of the dimming power signal under the data stage t3, which includes the dimming information, may change after being filtered by the capacitor C30. The dimming information may not be identified from the dimming power signal if the waveform is critically distorted, which may result in the failure of dimming and the failure of the entire dimming system.

Figure 22D:
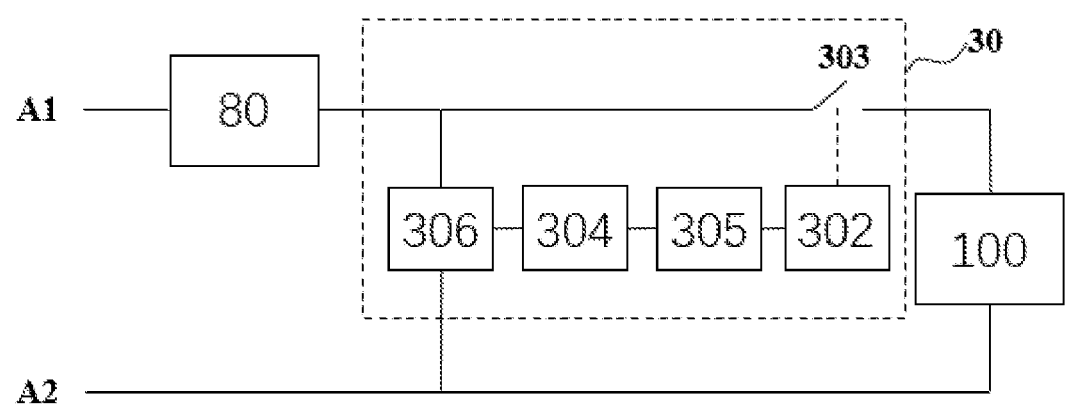
FIG. 22D is a schematic diagram of a circuit structure of a sensor in accordance with some embodiments of the present disclosure.

FIG. 22D is a schematic diagram of a circuit structure of a sensor in accordance with some embodiments of the present disclosure. The sensor 30 includes a rectifying circuit 306, a filtering circuit 304, a power converting circuit 305, a sensor control module 302 and a switching component 303. The rectifying circuit 306 is electrically connected to the dimmer 80 and the power input end A2. The filtering circuit 304 is electrically connected to the rectifying circuit 306. The power converting circuit 305 is electrically connected to the filtering circuit 304. The sensor control module 302 is electrically connected to the power converting circuit 305 and the control pins of the switching component 303. The first pin of the switching component 303 is electrically connected to the output end of the dimmer 80, and the second pin thereof is electrically connected to the LED lamp. The rectifying circuit 306 is configured to rectify the received dimming power signal to generate a DC signal. The filtering circuit 304 is configured to receive and filter the rectified DC signal to generate a smooth DC signal. The power converting circuit 305 is configured to execute a power conversion of the smooth DC signal to generate a low voltage DC signal to supplied to the sensor control module 302. The sensor control module 302 is configured to process environmental variables and generate control signals to control the on-off of the switching component 303.

The rectifying circuit 306 in this embodiment can be implemented by the circuit structure of FIG. 12A or 12B, which would be omitted herein. The filtering circuit 304 in this embodiment can be implemented by the circuit structure of the filtering circuit shown in FIG. 12C or 12D, and the present disclosure is not limited thereto. For the specific configuration of the power converting circuit 305 in this embodiment, reference may be made to the circuit structures of FIG. 4A and FIG. 4B, which would be omitted herein.

The circuit architecture of the sensor 30 in this embodiment is similar to the circuit architecture of the sensor 30 in the embodiment shown in FIG. 22A. The difference is that the sensor power supply module 301 in the embodiment shown in FIG. 22A supplies power to the sensor 30 by the RC buck conversion circuit structure, but in this embodiment, the sensor power supply module 301 supplies power to the sensor 30 by the circuit structure of rectification, filtering and power conversion. As mentioned in the above-mentioned embodiments, the RC buck conversion circuit structure would affect the dimming power signal so that the dimming system may not be configured normally. In this embodiment, the rectifying circuit 306 is configured to isolate the circuit. The capacitive devices included in the circuit behind the rectifying circuit 306 (including the filtering circuit 304, the power converting circuit 305 and the sensor control module 302) would not interfere the dimming power signal, and it can be ensured that the dimming power signal can be normally recognized by the LED lamp for dimming.

Specifically, there are many possible implementation manners for realizing dimming control by adjusting the signal characteristics of the input power Pin. A general conventional implementation is to adjust the effective value (RMS) of the input power Pin by adjusting the conducting angle of the input power Pin, and then adjust the magnitude of the driving power Sdrv.

The above-mentioned conventional dimming control method and corresponding circuit operation would be described with reference to FIGS. 1A and 8C, wherein FIG. 8C is a schematic diagram of a dimming waveform of an LED lighting system in accordance with some embodiments of the present disclosure. Please refer to FIG. 1A and FIG. 8C together, in this embodiment, the external power grid EP is an example of providing an AC power supply as the input power supply Pin, and in FIG. 8C, the half-period voltage waveform of the input power supply Pin whose amplitude is VPK is set an example to illustrate. In FIG. 8C, from top to bottom, there are three different dimming control modes, namely, the voltage waveforms WF1, WF2 and WF3, which respectively are waveforms under luminance Lux set with the highest luminance Lmax, the luminance Lux is 50% of the maximum luminance Lmax, and the luminance Lux is 17% of the highest luminance Lmax. As described herein, the dimmer 80 can adjust the phase cutting/conducting angle of the input power Pin by controlling the on-off state of the controllable electronic components connected in series on the bus. For example, to modulate the input power Pin at a phase cutting angle of 90 degrees, the dimmer 80 can turn off the controllable electronic components during ¼ cycle of the input power Pin and turn on the controllable electronic components and keep conducting during the remaining period of the half cycle. In this way, the voltage waveform of the input power Pin can be zero during the period of phase 0 to 90 degrees, and the waveform of the sine wave can be re-formed during the period of phase 90 degrees to 180 degrees (this is by taking the leading-edge phase cutting as an example, but is not limited to this). Here, the input power Pin after being phase-cutting is the input power Pin_C with a conducting angle of 90 degrees. The principle of using other phase cutting angle to modulate the input power is similar to the above.

First, regarding the voltage waveform WF1, when the dimmer 80 modulates the input power Pin with a phase cutting angle of 0 degrees in response to the dimming signal Sdim (that is, the conducting angle of the input power Pin is 180 degrees), at this time, the dimmer 80 directly provides the input power Pin to the LED lighting device 100, which means, the input power Pin is equal to the input power Pin_C at this time. In this case, the effective value of the input power Pin_C is Vrms1, and the power module PM would generate the corresponding driving power Sdrv based on the input power Pin_C with an effective value of Vrms1 to drive the LED module LM, so that the luminance Lux of the LED module LM is the highest luminance Lmax.

Regarding the voltage waveform WF2, when the dimmer 80 modulates the input power Pin with a phase cutting angle of 90 degrees in response to the dimming signal Sdim (that is, the conducting angle of the input power Pin is 90 degrees), the dimmer 80 disconnects the bus during the phase of the input power Pin of 0 degrees to 90 degrees and conducts the bus during the phase of 90 degrees to 180 degrees. In this case, the effective value of the input power Pin_C is Vrms2, where Vrms2 is smaller than Vrms1, and makes the luminance Lux equal to 50% of the maximum luminance Lmax.

Regarding the voltage waveform WF3, when the dimmer 80 modulates the input power Pin with a phase cutting angle of 90 degrees in response to the dimming signal Sdim (that is, the conducting angle of the input power Pin is 30 degrees). At this time, the dimmer 80 disconnects the bus during the phase of the input power Pin from 0 degrees to 150 degrees and turns on the bus during the phase of 150 degrees to 180 degrees. In this case, the effective value of the input power Pin_C is Vrms3, where Vrms3 is smaller than Vrms2, and makes the luminance Lux equal to 17% of the maximum luminance Lmax.

Based on the above-mentioned dimming control method, the dimmer 80 can change the effective value of the input power Pin_C (such as Vrms1, Vrms2, Vrms3) by adjusting the phase cutting angle/conducting angle of the input power Pin, wherein the variation of the effective value of the input power Pin_C is basically positively correlated with the variation of the conducting angle of the input power Pin_C. That is, the larger the conducting angle of the input power Pin_C is, the larger the effective value of the input power Pin_C is. In other words, the variation of the effective value of the input power Pin_C is basically negatively correlated with the phase cutting angle of the input power Pin_C. Generally speaking, the conventional dimming control method described above actually realizes the dimming function by modulating the effective value of the input power supply. The advantage of this dimming method is that the driving power Sdrv would directly reflect the effective value of the input power Pin_C and there would be a corresponding change, so the LED lighting device 100 does not need to change the hardware configuration, the dimming function can be realized by adding the dimmer 80 in the system only.

More specifically, in this dimming mode, in order to allow the effective value of the input power Pin to have a sufficient range of change, so that the luminance can be changed by a corresponding range, when the dimmer adjust the RMS value of the input power Pin through controlling the phase cutting angle/conducting angle, it is necessary to have a large phase adjustment range. For example, dimming is usually performed between phase 0° and 180°. However, when the conducting angle of the modulated power supply Pin_C is small enough, the harmonic distortion (e.g., total harmonic distortion, THD) and power factor (PF) characteristics of the power module PM would be significantly affected, so that the power conversion efficiency would be greatly reduced, and the problem of light flickering of the LED module LM may also be caused. In other words, under this dimming method, the efficiency of the power module PM is limited by the dimmer 80 and is difficult to improve.

On the other hand, since the effective value of the modulated power supply Pin_C is directly affected by the magnitude of the amplitude VPK, the dimmer 80 applying the above dimming method may not be able to be compatible with various power grid voltage specifications (such as AC voltages of 120V, 230V or 277V). The designer needs to adjust the parameters or hardware design of the dimmer 80 based on the application environment of the LED lighting system 10, which would increase the overall production cost of the product.

In response to the above problems, this disclosure proposes a new dimming control method, LED lighting system and LED lighting device thereof, which can use the change of the phase cutting angle/conducting angle of the input power Pin as the modulated signal, obtain the actual dimming information through demodulating the modulated signal, and control the circuit operation of the power module PM to generate the driving power Sdrv accordingly. Since the change of the phase cutting angle/conducting angle is only for carrying the dimming information corresponding to the dimming signal DIM, rather than directly adjusting the effective value of the modulated power supply Pin_C, the dimmer 80 can be configured to adjust the phase cutting angle/conducting angle of the input power Pin at a smaller phase interval, so that the effective value of the processed modulated power Pin_C would not have a large difference from the input power Pin provided by the external power grid EP. With this dimming control method, the conducting angle of the modulated power supply Pin_C is similar to that of the input power supply Pin no matter what the luminance state is, so that the THD and PF characteristics can be maintained. Which means, the conversion efficiency of the power module PM would not be inhibited by the dimmer 80. The structure and operation of the dimming control method and the corresponding LED lighting device would be further described below.

Please refer to FIGS. 6A, and 8D to 8G together, in this embodiment, the dimmer may, for example, modulate the phase cutting angle of the input power Pin within the dimming phase interval D_ITV. In FIG. 8D, from top to bottom are the voltage waveform WF4 of the dimming phase interval D_ITV, the voltage waveform WF5 when the light-emitting luminance Lux is at the highest luminance Lmax, and the voltage waveform WF6 when the light-emitting luminance Lux is at the minimum luminance Lmin.

Regarding the voltage waveform WF4, the dimming phase interval D_ITV is formed by the phase interval between the lower limit phase cutting angle C1 and the upper limit phase cutting angle C2, and the lower limit phase cutting angle C1 can be, for example, any value within the interval of 0 degrees to 15 degrees (such as 1, 2, 3 degrees etc.), but the present disclosure is not limited thereto. In addition, the upper limit phase cutting angle C2 can be, for example, any value in the range of 20 degrees to 45 degrees (e.g., 21, 22, 23 degrees etc.), but the present disclosure is not limited thereto. In other words, the dimming phase interval D_ITV can be, for example, a phase interval of 0 degrees to 45 degrees, a phase interval of 5 degrees to 45 degrees, a phase interval of 5 degrees to 20 degrees, a phase interval of 15 degrees to 20 degrees, or a phase interval of 15 degrees. The phase interval to degrees, etc., and can be selected based on the design requirements. In the present disclosure, the selection of the upper limit phase cutting angle C2 is mainly based on two principles: first, the width of the dimming phase interval D_ITV can have sufficient resolution during mapping; and second, when the dimmer adjusts the modulated power supply Pin_C to the upper limit phase cutting angle C2, the THD and PF characteristics of the power module PM can still be maintained, for example, not lower than 80% of the THD and PF when dimming at the lower limit phase cutting angle C1, preferably, making THD less than 25% and/or PF greater than 0.9.

Regarding the voltage waveform WF5, when the dimmer 80 modulates the input power Pin with the phase cutting angle C1 in response to the dimming signal Sdim (that is, the conducting angle of the input power Pin is 180-C1 degrees), at this time, the dimmer 80 cuts off the bus during the phase of the input power Pin from 0 degrees to C1, and turns on the bus during the phase from C1 to 180 degrees. In this case, the demodulating module 240 generates a dimming control signal Sdc indicating to adjust the light-emitting luminance Lux to the highest luminance Lmax based on the modulated power supply Pin_C with phase cutting angle C1. The switching control circuit 331 is capable of taking the dimming control signal Sdc as a reference for controlling the switching of the power switch PSW, and then causing the converting circuit 132 to generate a corresponding driving power Sdrv to drive the LED module LM and maintaining the luminance Lux of the LED module LM at the highest luminance Lmax.

Regarding the voltage waveform WF6, when the dimmer 80 modulates the input power Pin with the phase cutting angle C2 in response to the dimming signal (that is, the conducting angle of the input power Pin is 180-C2 degrees), at this time, the dimmer 80 would cut off the bus during the phase of the input power Pin from 0 degrees to C2, and turn on the bus during the phase from 150 degrees to 180 degrees. In this case, the demodulating module 140 generates a dimming control signal Sdc indicating to adjust the light-emitting luminance Lux to the minimum luminance Lmin based on the modulated power supply Pin_C with phase cutting angle C2. The switching control circuit 331 would take the dimming control signal Sdc as a reference for controlling the switching of the power switch PSW, and then cause the converting circuit 132 to generate a corresponding driving power Sdrv to drive the LED module LM and minimize the luminance Lux of the LED module to the minimum luminance Lmin. In this embodiment, the minimum luminance Lmin can be, for example, 10% of the maximum luminance Lmax.

Although in this embodiment, the method of modulating the phase cutting angle/conducting angle is also used to realize dimming control, since this embodiment only uses the change of the phase cutting angle/conducting angle of the modulated power supply Pin_C as a reference signal indicating the dimming information, which does not make the change of the effective value of the modulated power supply Pin_C to be directly reflected in the change of the luminance. Therefore, under the dimming control method of this embodiment, the selected dimming phase interval D_ITV would be significantly smaller than the dimming phase intervals under the dimming control method depicted in FIG. 8C. From another point of view, under the dimming control method of this embodiment, regardless of any phase angle in the dimming phase interval that the dimmer 80 used to modulate the input power supply Pin, the effective values of the generated modulated power supply Pin_C would not change too much. For example, in some embodiments, the effective value of the modulated power supply Pin_C (such as the effective value under the voltage waveform WF6) generated by being modulating based on the upper limit phase cutting angle C2 would not be lower than 50% of the effective value of the modulated power supply Pin_C generated by being modulating based on the lower limit phase cutting angle C1 (for example, the effective value under the voltage waveform WF5).

From another point of view, in the aforementioned general implementations, since the luminance of the LED module is directly related to the effective value of the modulated power supply Pin_C, in general implementations, the effective value range ratio of the modulated power supply Pin_C is substantially the same as the luminance range ratio of the LED module. As described herein, the definition of the effective value range ratio is the ratio of the maximum value to the minimum value of the effective value of the modulated power supply Pin_C, and the definition of the luminance range ratio is the ratio of the maximum value to the minimum value of the luminance of the LED module. Relatively, based on the present disclosure, as mentioned above, the effective value range ratio of the modulated power supply Pin_C may not be related to the luminance range ratio of the LED module. In some embodiments, the effective value range ratio of the modulated power supply Pin_C can be smaller than the luminance range of the LED module. In some embodiments, the effective value range ratio of the modulated power supply Pin_C is less than or equal to 2, and the luminance range ratio of the LED module is greater than or equal to 10.

It should be noted that the above-mentioned correlation between the luminance Lux of the LED module LM and the change of the phase cutting angle is only an example and is not limited thereto. For example, in other embodiments, the luminance of the LED module can be negatively correlated with the phase cutting angle of the modulated power supply Pin_C.

Referring to FIG. 8E, in the present embodiment, regarding the voltage waveform WF7, when the dimmer 80 modulates the input power Pin by the phase cutting angle C1 in response to the dimming signal Sdim (that is, the conducting angle of the input power Pin is 180-C1 degrees), at this time, the dimmer 80 would disconnect the bus during the phase of the input power Pin from 0 degrees to C1, and turn on the bus during the phase from C1 to 180 degrees. In this case, the demodulating module 140 generates a dimming control signal Sdc indicating to adjust the luminance Lux to the minimum luminance Lmin based on the modulated power supply Pin_C with phase cutting angle C1. The switching control circuit 131 would take the dimming control signal Sdc as a reference to control the switching of the power switch PSW, then cause the converting circuit 132 to generate the corresponding driving power Sdrv to drive the LED module LM, and maintain the luminance Lux of the LED module at the minimum luminance L min.

From the voltage waveform WF8, when the dimmer 80 modulates the input power Pin with the phase cutting angle C2 in response to the dimming signal Sdim (that is, the conducting angle of the input power Pin is 180-C2 degrees), at this time, the dimmer 80 would disconnect the bus during the phase of the input power Pin from 0 degrees to C2, and turn on the bus during the phase of 150 to 180 degrees. In this case, the demodulating module 140 generates a dimming control signal Sdc indicating to adjust the luminance Lux to the highest luminance Lmax based on the modulated power supply Pin_C with phase cutting angle C2. The switching control circuit 131 would take the dimming control signal Sdc as a reference to control the switching of the power switch PSW, then cause the converting circuit 132 to generate a corresponding driving power Sdrv to drive the LED module LM and increase the luminance Lux of the LED module LM to the maximum luminance Lmax. In addition, in the embodiments of FIG. 8D and FIG. 8E, the phase cutting angle C2 is greater than the phase cutting angle C1.

Specific circuit operations and signal generation mechanism of the demodulating module 240 in different embodiments are further described below with reference to FIGS. 8F and 8G. Here, FIGS. 8F and 8G are schematic diagrams of the corresponding relationship between the phase cutting angle, the demodulation signal and the luminance of the LED module in accordance with two embodiments of the present disclosure, respectively.

Figure 6A:
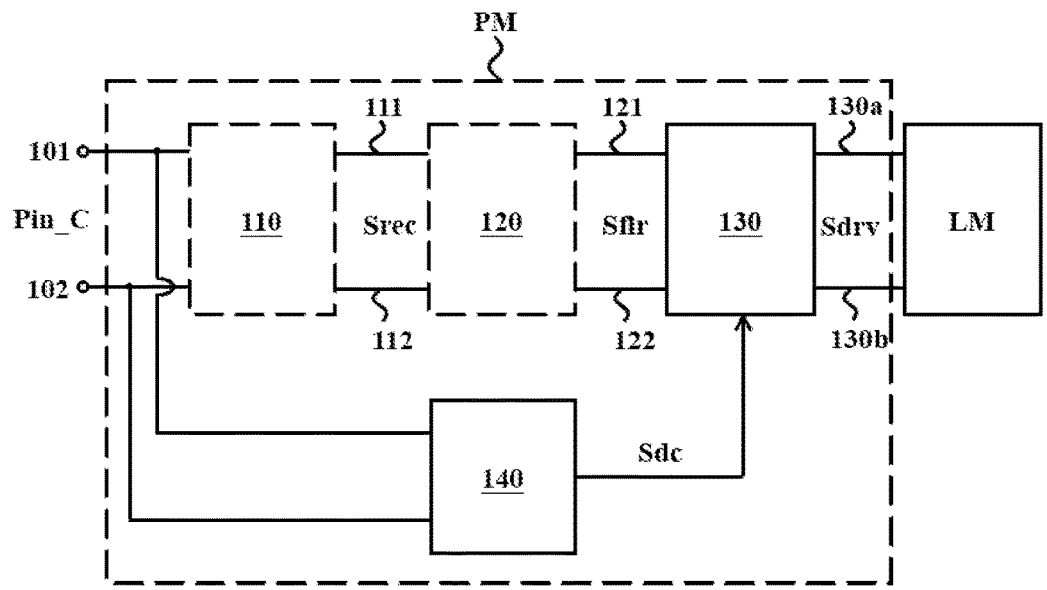
FIGS. 6A and 6B are schematic diagrams of functional modules of an LED lighting device in accordance with some embodiments of the present disclosure.

Please refer to FIGS. 6A, 8F and 8G. The demodulating circuit 140 of this embodiment is implemented by a signal processing method similar to an analog circuit to realize the collection and conversion of the dimming information. It can be seen from FIG. 8F that when the phase cutting angle ANG_pc of the modulated power supply Pin_C is adjusted in the interval between C1 and C2, the voltage level of the dimming control signal Sdc would correspondingly change in the interval between V1 and V2. In other words, the phase cutting angle ANG_pc of the modulated power supply Pin_C in the dimming phase interval would have a linear relationship that is positively correlated with the voltage level of the dimming control signal Sdc. From the perspective of the operation of the demodulating module 140, when the demodulating module 140 determines that the phase cutting angle of the modulated power supply Pin_C is C1, the demodulating module 140 would correspondingly generate a dimming control signal Sdc with the voltage level of V1. Similarly, when the demodulating module 140 determines that the phase cutting angle of the modulated power supply Pin_C is C2, the demodulating module 140 would correspondingly generate a dimming control signal Sdc with the voltage level of V2.

Next, the dimming control signal Sdc that is positively correlated with the phase cutting angle ANG_pc is transmitted to the switching control circuit 131, so that the switching circuit 132 generates the corresponding driving power Sdrv to drive the LED module LM, and make the LED module LM emit with corresponding luminance Lux. In some embodiments, the luminance Lux of the LED module LM may have a linear relationship with a negative correlation with the voltage level of the dimming control signal Sdc. As shown in FIG. 8F, when the dimming control signal Sdc received by the switching control circuit 131 is at a voltage level Va between the voltage level V1 and the voltage level V2, the switching control circuit 131 would adjust the lighting control signal Slc accordingly so the LED module LM may emit with the luminance La after being driven by the driving power Sdrv. As described herein, the luminance La is inversely proportional to the voltage level Va and can be represented by La=(Lmax−Lmin)/(V2−V1)*(V2−Va)+Lmin, but the present disclosure is not limited thereto.

It is noted that the above-mentioned mechanism of generating the dimming control signal Sdc and the luminance Lux is only to illustrate that the demodulating module 140 of the present disclosure extracts and converts/maps the signal characteristics (such as phase cutting angle) of the modulated power supply Pin_C to the dimming control signal Sdc, so that the driving circuit 130 can adjust the luminance Lux of the LED module LM based on the dimming control signal Sdc. This implementation is similar to signal conversion made by analog circuits, but the present disclosure is not limited thereto. In some embodiments, the corresponding relationship between the phase cutting angle ANG_pc and the dimming control signal Sdc shown in FIG. 8F can also be a non-linear relationship. For example, the phase cutting angle ANG_pc can be corresponding to the dimming control signal Sdc exponentially. Similarly, the corresponding relationship between the dimming control signal Sdc and the luminance Lux shown in FIG. 8F can also be a non-linear relationship, and the present disclosure is not limited thereto. In addition, in some embodiments, the phase cutting angle ANG_pc and the voltage level of the dimming control signal Sdc can also be negatively correlated. In some embodiments, the luminance La and the voltage level Va may also be positively correlated.

Please refer to FIGS. 6A and 8G together, the demodulating module 140 of the present embodiment is implemented by a signal processing method similar to a digital circuit to realize the collection and conversion of the dimming information. Specifically, when the phase cutting angle of the modulated power supply Pin_C is adjusted within the default interval, the dimming control signal Sdc would have a default number of different signal states corresponding to the change of the phase cutting angle, so as to control the LED module to adjust the dimming to the default number of dimming levels. Further, for example, it can be seen from FIG. 8G that when the phase cutting angle ANG_pc of the modulated power supply Pin_C is adjusted in the interval between C1 and C2, the dimming control signal Sdc would have 8 different signal states from D1 to D8 corresponding to the change of the phase cutting angle ANG_pc. In other words, the phase cutting angle ANG_pc of the modulated power supply Pin_C would be divided into 8 sub-intervals in the dimming phase interval, and each sub-interval would correspond to one of the signal states D1-D8 of the dimming control signal Sdc. In some embodiments, the signal state can be indicated by a voltage level; for example, the dimming control signal Sdc in the state D1 may correspond to the voltage level of 1V, and the dimming control signal Sdc in the state D8 corresponds to the voltage level of 5V. In some embodiments, the signal state can be indicated by a multi-bit logic level; for example, the dimming control signal Sdc in state D1 may correspond to the logic level of "000", and the dimming control signal Sdc in state D8 may correspond to the logic level of "111".

Next, the dimming control signal Sdc with the signal states D1-D8 is transmitted to the switching control circuit 131, so that the switching circuit 132 can generate the corresponding driving power Sdrv to drive the LED module LM, and make the LED module LM to emit with corresponding luminance Lux. In some embodiments, the signal states D1-D8 may correspond one-to-one with different luminance Lux of the LED module LM. As shown in FIG. 8F, the signal states D1-D8 may correspond to 100%, 87.5%, 75%, 62.5%, 50%, 37.5%, 25%, and 10% of the maximum luminance Lmax, respectively. It should be mentioned here that the present embodiment takes an example of designing the demodulating module 140 with a resolution of 3 bits (i.e., 8-segment dimming), but the present disclosure is not limited thereto.

FIG. 8H is a schematic diagram of input power waveforms of LED lighting devices under different power grid voltages in accordance with some embodiments of the present disclosure. Please refer to FIGS. 1A, 6A and 8H together, it can be seen from the diagrams that no matter the peak voltage of the input power Pin is a1 or a2, if the dimmer 80 modulates the input power Pin with the phase cutting angle C3, the modulated power supply Pin_C generated by the dimmer 80 would still have the same zero-level period (i.e., the period from phase 0 to C3). Therefore, no matter what the peak voltage of the input power Pin is, the demodulating module 140 can still demodulate the modulated power supply Pin_C with the same phase cutting angle to generate the same dimming control signal Sdc. In other words, no matter which external grid EP specification the LED lighting system 10 is applied to, the LED lighting system can make the LED lighting device 100 have the same luminance or color temperature when receiving the same dimming signal Sdim, Therefore, the LED lighting system 10 can be compatible with applications of various power grid voltage specifications. From another perspective, in the present disclosure, the dimming of the LED module (e.g., luminous intensity or color temperature) is responsive to the phase cutting angle of the modulated power Pin_C, but not substantially responsive to the peak voltage of the external power grid.

It should be noted that due to the parasitic effect of the circuit components or the mutual matching between the components that are not necessarily ideal, therefore, although it is designed that the dimming of the LED module would not be responded to the peak voltage of the external power grid, however, the dimming effect on the LED module may still be slightly responsive to the peak voltage of the external grid in reality. That is, based on the present disclosure, it is acceptable that the dimming of the LED module is slightly responsive to the external grid due to circuit imperfections. In some embodiments, the term "slightly" used as herein, can be directed to the situation that the dimming of the LED module is only affected by, for example, less than 5% when the peak voltage of the external power grid is twice as large. This can also apply to the situation when mentioning "substantially" in rest of the present disclosure.

Referring to FIG. 1E, which is a schematic diagram of functional modules of an LED lighting system in accordance with some embodiments of the disclosure. The LED lamp lighting system 10 includes a dimmer 80 and an LED lamp 100. The dimmer 80 is electrically connected to the external power EP and the LED lamp 100. The dimmer 80 is configured to generate a dimming signal Sdim based on the dimming operation and transmit the dimming signal Sdim to the LED lamp. The LED lamp 100 is electrically connected to the external power EP and the dimmer 80 and is configured to receive an external power signal to light up, and execute dimming based on the received dimming signal Sdim. In this embodiment, the LED lamp 100 can realize a complete dimming function only through three wires.

In this embodiment, the LED lamp 100 includes a demodulating module 140, an LED driving module LD and an LED module LM. The demodulating module 140 is electrically connected to the dimmer 80 and is configured to receive the dimming signal Sdim generated by the dimmer 80 and convert the dimming signal Sdim into a dimming control signal Sdc. The LED driver module LD is electrically connected to the demodulating module 140 and the external power EP to receive the external power signal for power conversion to generate the driving power Sdrv, at the same time receive the dimming control signal Sdc from the demodulating module 140 and adjust the driving power Sdrv to dim the LED lamp based on the dimming control signal Sdc. The LED module LM is electrically connected to the LED driving module LD and is configured to receive the driving power Sdrv of the LED driving module LD to light up.

Figure 6B:
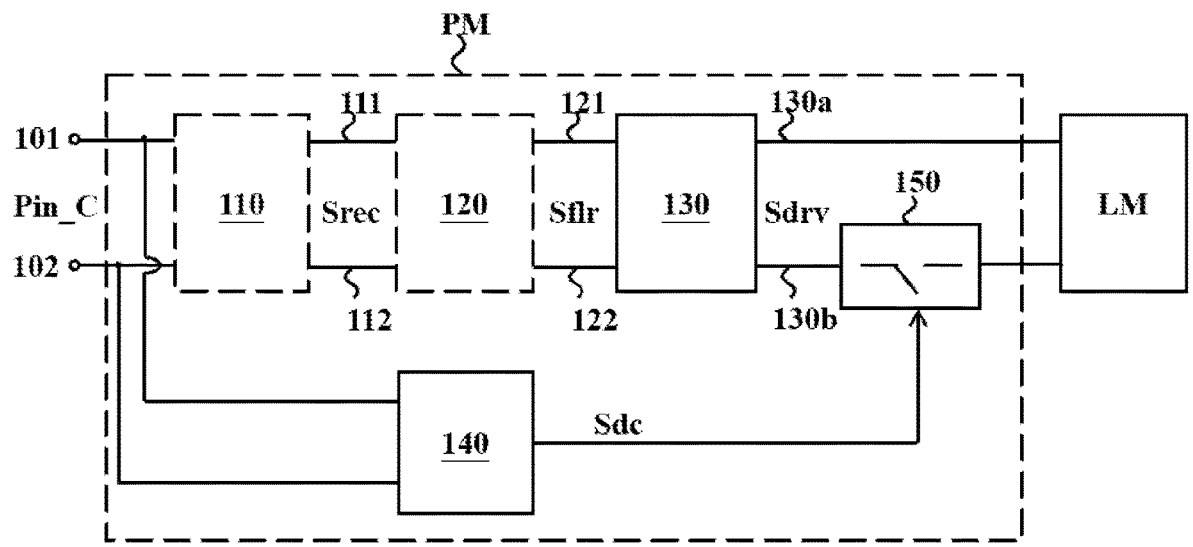

In this embodiment, the LED lamp 100 can be implemented by the circuit structure shown in FIGS. 6A-6B. The LED driving module LD can include a rectifying circuit 110, a filtering circuit 120 and a driving circuit 130, and the action principles thereof can refer to the related descriptions in FIGS. 6A-6B, which would be omitted herein.

Figure 15A:
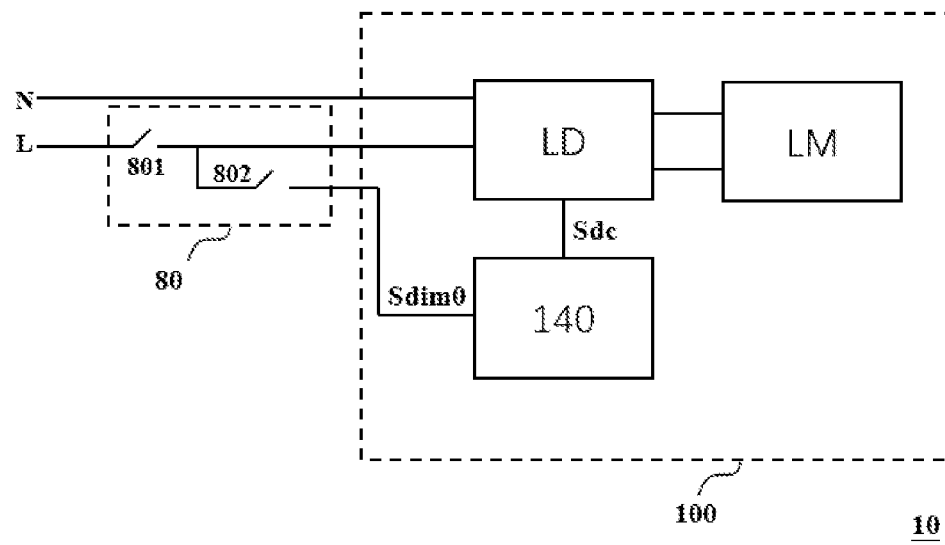
FIGS. 15A-15B are schematic circuit diagrams of dimmers in accordance with some embodiments of the present disclosure.

Referring to FIG. 15A, which is a schematic circuit diagram of a dimmer in accordance with some embodiments of the present disclosure. The dimmer 80 includes a switch 801 and a switch 802. One end of the switch 801 is electrically connected to the power signal input end L, and the other end is electrically connected to the LED driving module LD and the switch 802. The other end of the switch 802 is electrically connected to the demodulating module 140. In this embodiment, the switch 801 is disposed in the entire power circuit (i.e., the circuit in which the external power EP supplies power to the LED lamp) and is configured as a switch of the entire LED lamp lighting system 10. The switch 801 is set to normally open. When the switch 801 is disconnected, the external power signal cannot be provided to the dimmer 80 and the LED lamp 100, and the LED lamp 100 and the dimmer 80 would not work or operate. When the switch 801 is closed, the LED lamp lighting system 10 works normally, and the dimmer 80 can dim the LED lamp 100. The switch 802 is configured to generate the dimming signal Sdim0 based on the dimming operation. In this embodiment, the switch 802 is a jog switch, and is set to be normally open, that is, the switch 802 is in a cut-off state under normal conditions and is closed when pressed. When the press is canceled, the switch 802 automatically returns to the cut-off state (i.e., the open state).

Figure 16A:
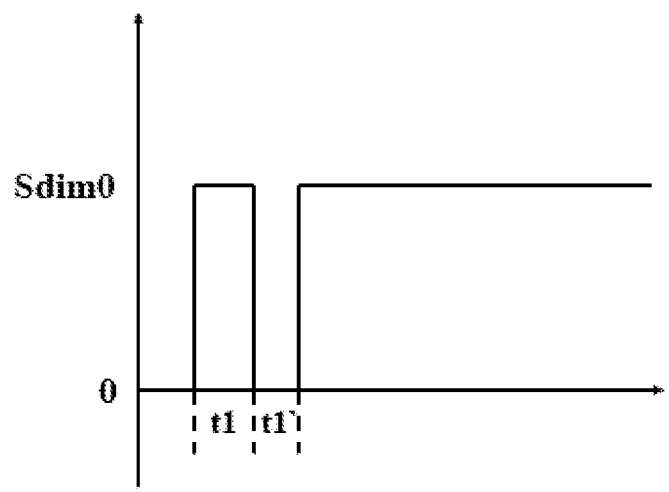
FIGS. 16A-16C are schematic waveform diagrams of dimming signals in accordance with some embodiments of the present disclosure

The operation principle of the dimmer would be described below with reference to FIG. 16A.

When the switch 801 closed, the LED lighting system 10 works normally. The dimming operation can be performed by closing and opening the switch 802. As described above, the switch 802 is set to be normally open. When the switch 802 is closed, the dimming signal Sdim0 is in a high-level state; and when the switch 802 is opened, the dimming signal Sdim0 is in a low level state. The dimmer 80 would convert the switching state of the switch 802 into the dimming signal Sdim0. The demodulating module 140 can receive the dimming signal Sdim0 and demodulate out the dimming information therein, and converts the dimming information into a dimming control signal Sdc that can be utilized by the LED driver module LD.

When the switch 802 is continuously closed, the LED lamp 100 can gradually become brighter from the current luminance, and the speed of the luminance change can be set by the internal component parameters of the LED lamp 100. When the switch 802 is closed for a short time t1, then disconnected, and continues to be closed again after the time t1', the LED lamp would gradually dim from the current luminance. The time t1, t1' and the speed of changing the luminance of the LED lamp can be set by the parameters of the internal components of the LED lamp 100. In some embodiments, the switch 802 can be set as a normally closed switch or an active-off switch, and the switching action of the switch 802 can also be configured to realize the dimming operation, which the present disclosure is not limited thereto.

In some embodiments, the switch 802 is a jog switch and is set to normally closed. When the switch 802 is not pressed, the switch 802 is in a closed state. When the dimming operation is performed, the switch 802 is pressed and the switch 802 is turned off. When the pressing is canceled, the switch 802 automatically returns to the closed state, that is, when the switch 802 is not pressed, the switch 802 is in the closed state, and when the switch 802 is pressed, the switch 802 is in the open state.

Figure 15B:
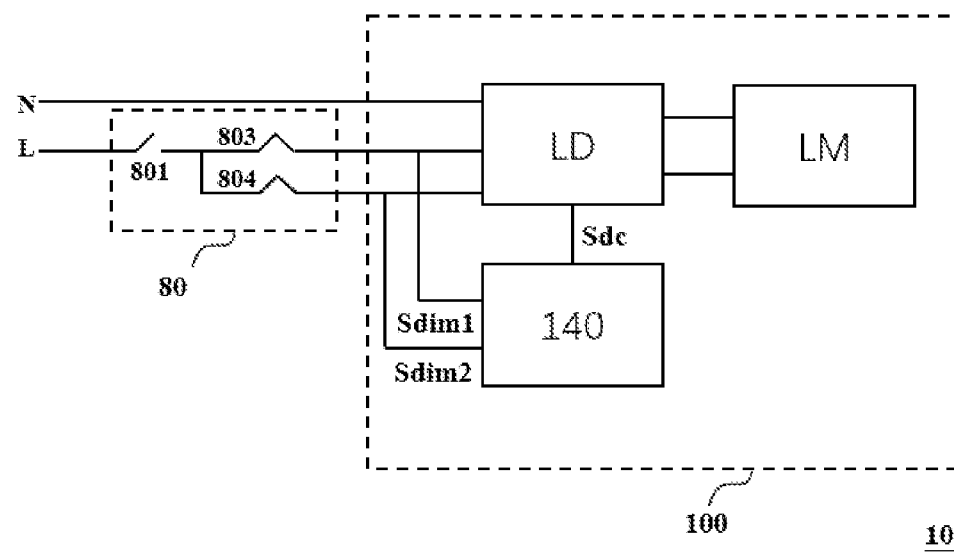

FIG. 15B is a schematic circuit diagrams of a dimmer in accordance with some embodiments of the present disclosure. The dimmer 80 includes switches 801, 803 and 804. The switch 803 and the switch 804 are connected in parallel and are connected the switch 801 in series. That is, the first pin of the switch 801 is electrically connected to the external power signal input end L, the first pin of the switch 803 and the first pin of the switch 804 are electrically connected to the second pin of the switch 801, the second pin of the switch 803 is electrically connected to the LED driving module LD, and the second pin of the switch 804 is electrically connected to the LED driving module LD. The switch 801 is configured as a switch of the entire system 10, which is the same as the embodiment described in FIG. 15A and would be omitted herein. The switch 803 and the switch 804 are configured to execute the dimming operation. In this embodiment, the switch 803 and the switch 804 are jog switches and are set to be normally closed, that is, the switch 803 and the switch 804 are in the closed state during normal conditions, in other words, the switch is turned off when pressed, and when the pressing is canceled, the switch automatically returns to the closed state.

Figure 16B:
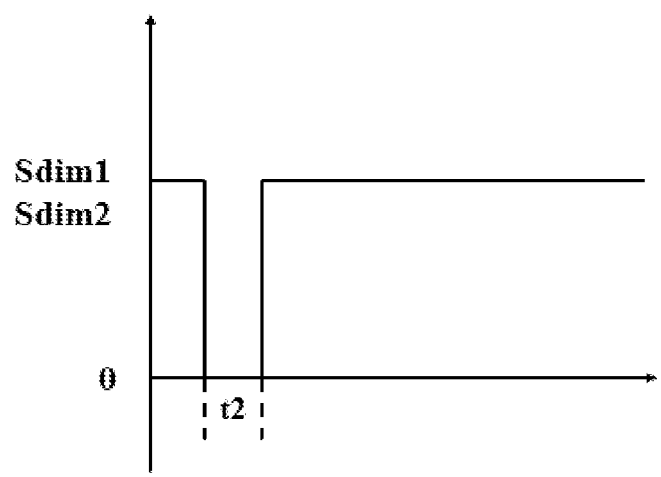

The operation principle of the dimmer 80 in this embodiment would be described below with reference to FIG. 16B.

The switch 801 is closed, and the LED lighting system 10 works normally. When the dimming operation is not performed, since the switch 803 and the switch 804 are in the closed state, the external power signal can be supplied to the LED lamp 100 through the power supply loop formed by the switches 801 and 803, or the LED lamp can be powered by the power supply loop formed by the switches 801 and 804. At this time, the dimming signals Sdim1 and Sdim2 are both at high level. When the dimming operation is performed and the switch 803 or the switch 804 is pressed, the dimming signal Sdim1 or Sdim2 is at a low level. It should be noted here that when the dimming operation is performed, the switch 803 and the switch 804 cannot be pressed simultaneously. When the switch 803 and the switch 804 are pressed at the same time, the power supply circuit of the external power signal is disconnected, and the power supply to the LED lamp 100 cannot be continued. In this embodiment, the switch 803 and the switch 804 are provided with a linked mechanical structure to prevent the switch 803 and the switch 804 from being turned off at the same time. Among the switches 803 and 804, when only the switch 803 is actuated, the external power signal can be supplied to the LED lamps through the power supply loop formed by the switch 801 and the switch 804; and when only the switch 804 is actuated, the external power signal can pass through the power supply loop formed by switches 801 and 803 and be supplied to the LED lamp 100.

The dimmer 80 dims the LED lamps through the dimming signals Sdim1 and Sdim2 generated by the switch 803 and the switch 804. When the switch 803 is continuously pressed, the luminance of the LED lamp 100 is adjusted to gradually become brighter from the current luminance. When the pressed state of the switch 803 is canceled, the dimming of the LED lamp 100 ends, and the LED lamp 100 remains in the current luminance value. On the other hand, when the switch 804 is continuously pressed, the luminance of the LED lamp 100 is adjusted to become darker from the current luminance. When the pressed state of the switch 804 is canceled, the LED lamp 100 is remains in the current luminance value. The speed of the LED lamp 100 becoming brighter or darker is set by the internal component parameters of the LED lamp 100.

Figure 16C:
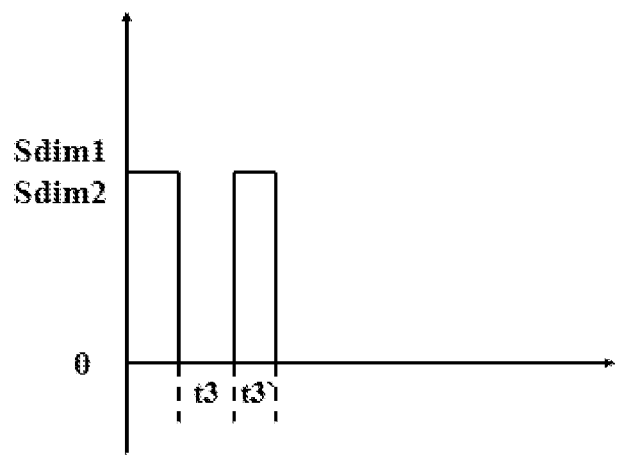

Furthermore, the dimmer 80 can generate a color tone signal through the switch 803 and the switch 804 to color the LED lamp 100. Please refer to schematic diagram of the color tone signal depicted in FIG. 16C, when the switch 803 is pressed briefly for a time t3, and then pressed again after the time t3', the color temperature of the LED lamp 100 gradually becomes warm from the current color temperature, and when the press of the switch 803 is canceled, the color toning of the LED lamp 100 is over, and the LED lamp is maintained to the current color temperature. When the switch 804 is briefly pressed for a time t3 and lifted up and is continuously pressed again after the time t3', the color temperature of the LED lamp 100 gradually becomes warm from the current color temperature. When the press of the switch 804 is canceled, the color toning of the LED lamp 100 is over and the LED lamp 100 is maintained to the current color temperature. The time t2, t3, t3' and the speed of changing the color temperature of the LED lamp 100 can be set by internal component parameters of the LED lamp 100. In this embodiment, the dimming parameters of the switch 803 and the dimming parameters of the switch 804 can be the same. In some embodiments, the switch 803 and the switch 804 can set different dimming parameters, but the present disclosure is not limited thereto.

Figure 7A:
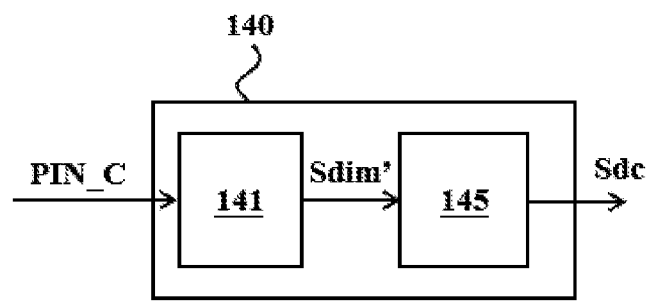
FIG. 7A is a schematic diagram of functional modules of a demodulating module in accordance with some embodiments of the present disclosure.
Figure 7B:
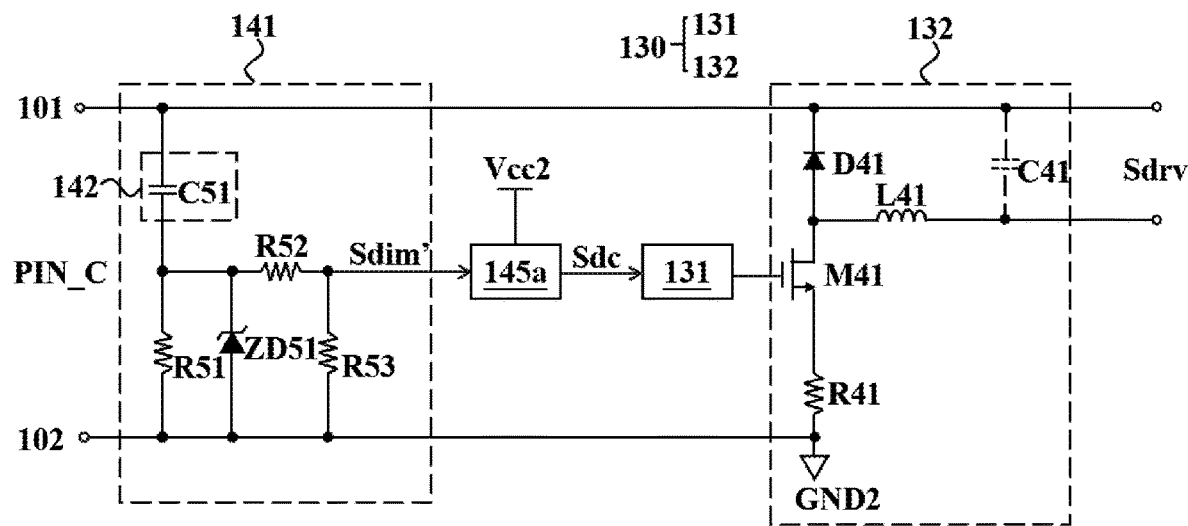
FIGS. 7B and 7C are schematic circuit diagrams of LED lighting devices in accordance with some embodiments of the present disclosure.
Figure 7C:
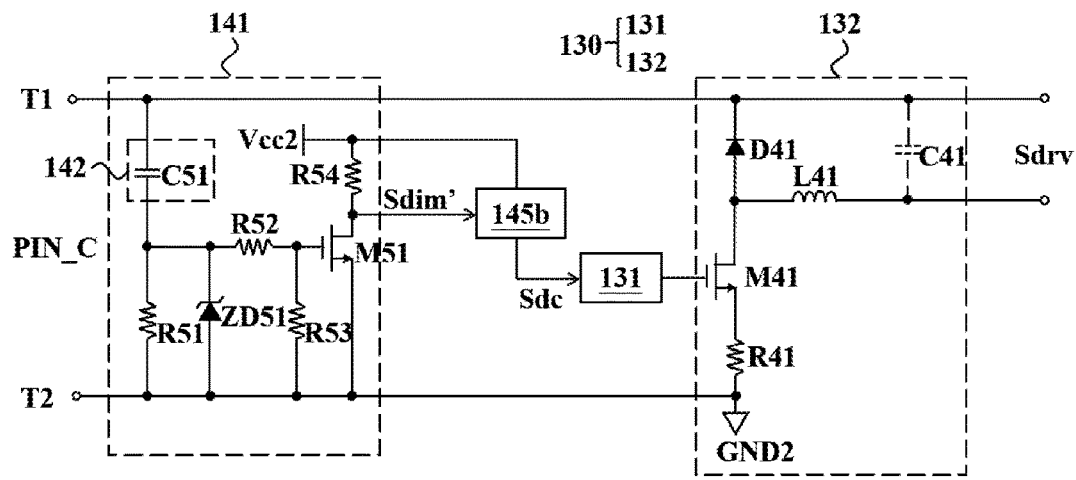
Figure 7D:
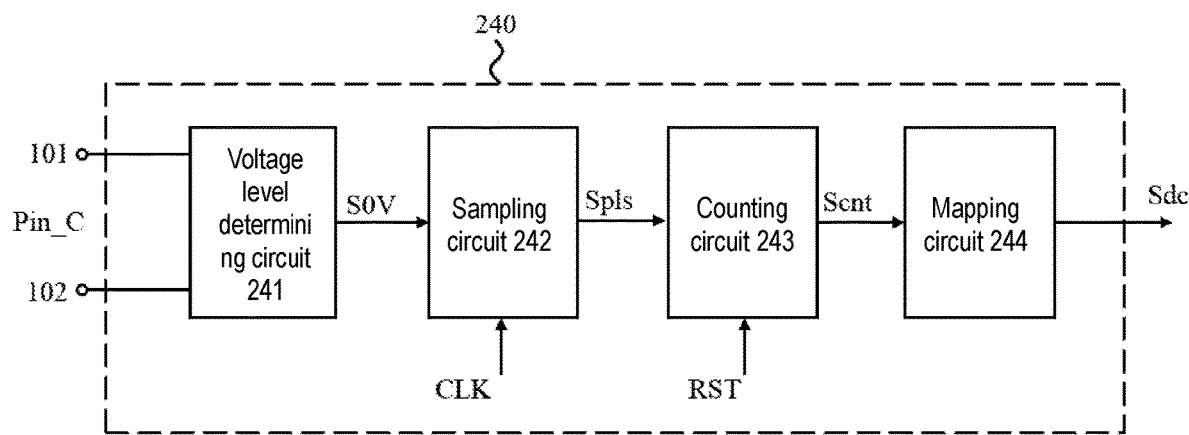
FIG. 7D is a schematic diagram of functional modules of a demodulating module in accordance with some embodiments of the present disclosure.
Figure 7E:
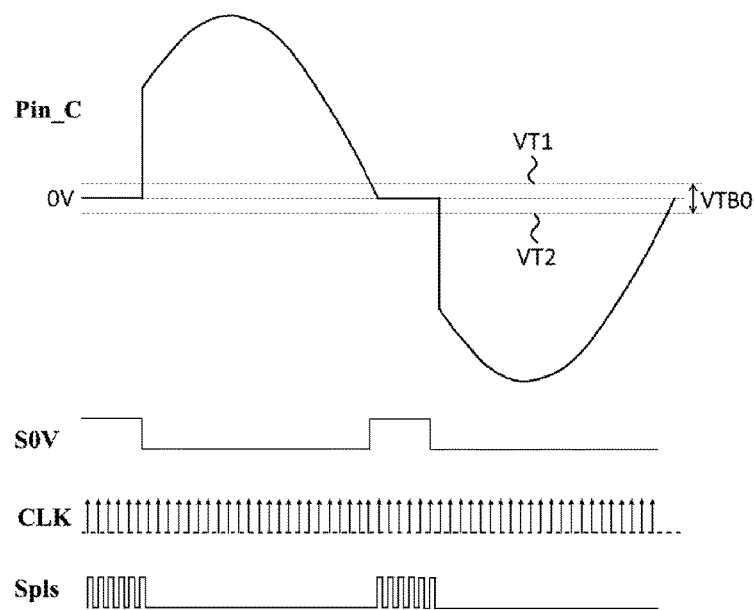
FIG. 7E is a schematic waveform diagram of a demodulating module in accordance with some embodiments of the present disclosure.
Figure 7F:
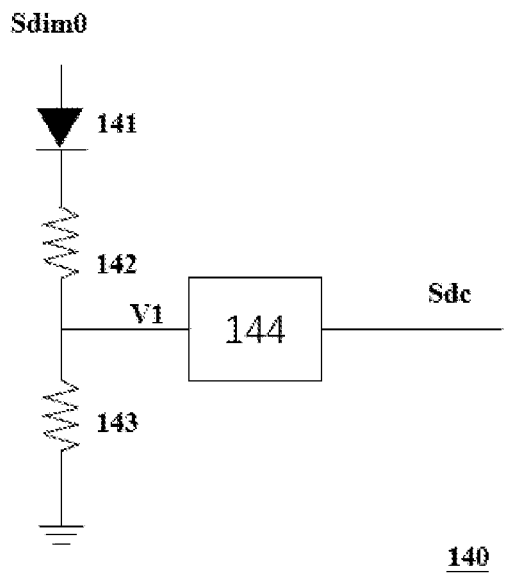
FIG. 7F is a schematic circuit diagram of a demodulating module in accordance with some embodiments of the present disclosure.

Referring to FIG. 7F, which is a schematic circuit diagram of a demodulating module in accordance with some embodiments of the present disclosure. The demodulating module 140 includes a diode 141, resistors 142, 143 and a logic circuit 144. The demodulating module 140 in this embodiment can be applied to the embodiment shown in FIG. 15A, and the circuit principle of the demodulating module 140 would be described with reference to FIG. 15A below. The anode of the diode 141 is electrically connected to the second pin of the switch 802, and the cathode thereof is electrically connected to the first pin of the resistor 142. The first pin of the resistor 143 is electrically connected to the second pin of the resistor 142, and the second pin thereof is electrically connected to a common ground. The logic circuit 144 is electrically connected to the second pin of the resistor 142, and output end thereof is electrically connected to the LED driving module LD.

When the switch 802 is in the closed state, the external power signal can flow through the path formed by the power line L, the switches 801 and 802, the diode 141 and the resistors 142 and 143. When the external power signal is the alternating current of the mains electricity, the diode 141 only allows the positive half cycle of the external power signal to pass through. The resistor 142 and the resistor 143 form a voltage dividing circuit, and the electrical signal passing through the diode 141 is divided to form a signal V1, and the logic circuit 144 receives the signal V1 and performs a logical operation to the signal V1 to generate the dimming control signal Sdc, The dimming control signal Sdc is transmitted to the LED driving module LD, and the LED driving module LD performs dimming based on the received dimming control signal Sdc. In this embodiment, the dimming control signal Sdc can be, for example, a PWM dimming signal. In some embodiments, the dimming control signal Sdc can also be a dimming signal with voltage level of 0-10V, but the present disclosure is not limited thereto.

In other embodiments, the logic circuit can also be referred to as a signal converting circuit. Further, the diode 141, the resistor 142 and the resistor 143 can be collectively referred as a sampling circuit.

Figure 7G:
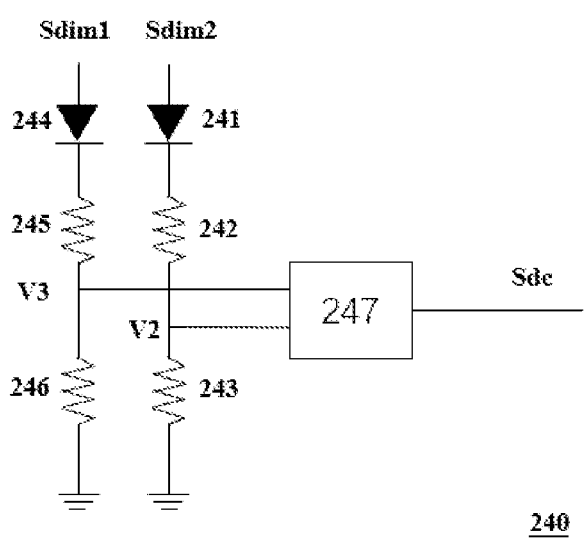
FIG. 7G is a schematic circuit diagram of a demodulating module in accordance with some embodiments of the present disclosure.

Referring to FIG. 7G, which is a schematic circuit diagram of a demodulating module in accordance with some embodiments of the present disclosure. The demodulating module 240 includes diodes 241, 244, resistors 242, 243, 245 and 246 and a logic circuit 247. The configuration of the demodulating module 240 in this embodiment is similar to that of the demodulating module 140 in the embodiment shown in FIG. 7F. The difference is that the demodulating module 240 in this embodiment can be applied to the embodiment shown in FIG. 15B. The working principle of the demodulating module 240 would be described below with reference to FIG. 15B. The anode of the diode 241 is electrically connected to the second pin of the switch 803, the cathode thereof is electrically connected to the first pin of the resistor 242. The first pin of the resistor 243 is electrically connected to the second pin of the resistor 242, and the second pin thereof is electrically connected to a common ground end. The anode of the diode 244 is electrically connected to the second pin of the switch 804, the cathode thereof is electrically connected to the first pin of the resistor 245. The first pin of the resistor 246 is electrically connected to the second pin of the resistor 245, and the second pin thereof is electrically connected to a common ground end.

When the switch 803 is in the closed state, the external power signal can flow through the path formed by the power input end L, the switch 803, the diode 241, and the resistors 242 and 243. When the external power signal is an AC power from mains electricity, the diode 241 only allows the positive half cycle of the power signal to pass through. The resistor 242 and the resistor 243 form a voltage dividing circuit, the power signal passing through the diode 241 is divided by the resistor 242 and the resistor 243 to form a signal V2, and the logic circuit 247 receives the signal V2. Similarly, when the switch 804 is in the closed state, the signal V3 is formed at the common end of the resistor 245 and the resistor 246, and the logic circuit 247 receives the signal V3. The logic circuit 247 performs a logic operation after receiving the signals V2 and V3, and outputs the dimming control signal Sdc to the LED driving module LD. The LED driving module LD performs dimming based on the received dimming control signal Sdc. In this embodiment, the dimming signal Sd can be, for example, a PWM dimming signal. In some embodiments, the dimming signal Sd can also be a dimming signal with voltage level of 0-10V, but the present disclosure is not limited thereto.

In some embodiments, the logic circuit can also be referred as a signal converting circuit. Further, the diodes 241, 244, the resistors 242, 243, 345 and 246 can be collectively referred as a sampling circuit.

FIGS. 6A and 6B are schematic diagrams of functional modules of an LED lighting device in accordance with some embodiments of the present disclosure. Referring to FIG. 6A first, the LED lighting device 100 of the present embodiment can be applied to the LED lighting system 10 or 20 as shown in FIG. 1A or FIG. 1B. The LED lighting device 100 includes a power module PM and an LED module LM, wherein the power module PM further includes a rectifying circuit 110, a filtering circuit 120, a driving circuit 130 and a demodulating module 140.

FIG. 12A is a schematic circuit structure diagram of a rectifying circuit in accordance with some embodiments of the present disclosure. The rectifying circuit RC1 is a full-bridge rectifying circuit, including diodes D1-D4. The anode of diode D1 is connected to the anode of diode D4 and connected to the connecting end b2. The cathode of diode D2 and the cathode of diode D3 are connected and are connected to the connecting end b1. The cathode of diode D1 and the anode of diode D2 are connected and are connected to the connecting end a1. The anode of diode D3 and the cathode of diode D4 are connected and are connected to the connecting end a2. The connecting ends a1 and a2 are the input ends of the rectifying circuit RC1, and the connecting ends b1 and b2 are the output ends of the rectifying circuit RC1.

When the signal input to the input end of the rectifying circuit RC1 is an AC signal, DC signal can be output after being rectified by the rectifying circuit RC1. When the voltage level of the input end a1 is greater than the voltage level of the input end a2, the signal would flow in through the input end a1, the diode D2 and the rectifying circuit output end b1, and the flow out through the rectifying circuit output end b2, the diode D4, and the input end a2. When the voltage level of the input end a2 is greater than the voltage level of the input end a1, the signal would flow in through the input end a2, the diode D3, the rectifying circuit output end b1, and flow out through the rectifying circuit output end b2, the diode D1, and the dimmer output end 80a. Therefore, the voltage level of the rectifying circuit output end b1 would be always higher than the voltage level of the rectifying circuit output end b2, and the rectifying circuit can output the DC signal.

FIG. 12B is a schematic circuit structure diagram of a rectifying circuit in accordance with some embodiments of the present disclosure. The rectifying circuit RC2 includes a diode D5. The diode D5 is connected in series between the input end a1 and the output end b1. The input end a2 is electrically connected to the output end b2. When the voltage level of input end a1 is higher than the voltage level of input end a2, the power signal flows in through the input end a1, the diode D5, and the output end b1, and flows out through the output end b2, and the input end a2. When the voltage level of the input end a2 is higher than the voltage level of the input end a1, no current path can be formed. Therefore, when the signals input from the input ends a1 and a2 are alternating current, the rectifying circuit RC2 only allows the positive half cycle of the power signal to pass through, and a half-wave rectified signal is obtained.

The rectifying circuit 110 is electrically connected to the first power supply end T1 and the second power supply end T2 of the dimmer 80 through the first connecting end 101 and the second connecting end 102, respectively, so as to receive the modulated power supply Pin_C, and perform rectification to the modulated power supply Pin_C. After rectification, the rectified signal Srec is output from the first rectifying output end 111 and the second rectifying output end 112. Here, the modulated power supply Pin_C can be an AC signal or a DC signal, which does not affect the operation of the LED lighting device 200. When the LED lighting device 200 is designed to be lit based on a DC signal, the rectifying circuit 110 in the power module PM can be omitted. In the configuration where the rectifying circuit 110 is omitted, the first connecting end 101 and the second connecting end 102 are directly electrically connected to the input ends 111 and 112 of the filtering circuit 120.

In this embodiment, the rectifying circuit 110 can be implemented by the circuit structure of FIG. 12A or 12B. Further, the connecting end a1 is electrically connected to the first connecting end 101, and the connecting end a2 is electrically connected to the second connecting end 102 and are configured to receive and rectify the signals of the connecting ends a1 and a2 to generate rectified signals. For the operation principle of the rectifying circuit 110, please refer to the description of FIGS. 12A and 12B, which would be omitted herein.

In some embodiments, the rectifying circuit 110 can be a full-wave rectifying circuit, a half-wave rectifying circuit, a bridge rectifying circuit or other types of rectifying circuits, and the present disclosure is not limited thereto.

The filtering circuit 120 is electrically connected to the rectifying circuit 110 and is configured to filter the rectified signal Srec. That is, the input end of the filtering circuit 220 is coupled to the first rectifying output end 111 and the second rectifying output end 112 to receive the rectified signal Srec, and the filtering circuit 220 performs filtering to the rectified signal Srec. The filtered signal Sflr is output from the first filtered output end 121 and the second filtered output end 122. The first rectifying output end 111 can be regarded as the first filter input end of the filtering circuit 120, and the second rectifying output end 112 can be regarded as the second filter input end of the filtering circuit 120. In this embodiment, the filtering circuit 120 can filter out the ripple in the rectified signal Srec, so that the generated waveform of the filtered signal Sflr is smoother than that of the rectified signal Srec. In addition, the filtering circuit 120 can filter the specific frequencies by selecting the circuit configuration, so as to filter the response/energy of the external driving power supply at the specific frequencies. In some embodiments, the filtering circuit 120 can be a circuit including at least one of a resistor, a capacitor, and an inductor, such as a parallel capacitor filtering circuit or a π-type filtering circuit, but the present disclosure is not limited thereto. When the LED lighting device 100 is designed to be lit based on a DC signal, the filtering circuit 120 in the power module PM can also be omitted. In the configuration where the rectifying circuit 110 and the filtering circuit 120 are omitted, the first connecting end 101 and the second connecting end 102 are directly electrically connected to the input ends 121 and 122 of the driving circuit 130.

The filtering circuit 120 in this embodiment can be implemented by the filtering circuit FC1 or FC2 shown in FIG. 12C or 12D. Further, the connecting end c1 is electrically connected to the first rectifying output end 111, the connecting end c2 is electrically connected to the second rectifying output end 112, and the connecting ends d1 and d2 are respectively electrically connected to the driving circuit 130.

The driving circuit 130 is electrically connected to the filtering circuit 120 to receive the filtered signal Sflr and perform a power conversion on the filtered signal Sflr to generate the drive power Sdrv. That is, the input end of the driving circuit 130 is coupled to the first filter output end 121 and the second filter output end 122 and is configured to receive the filtered signal Sflr, and then generate the driving power Sdrv to drive the LED module LM to emit light. As described herein, the first filter output end 121 can be regarded as the first driving input end of the driving circuit 130, and the second filter output end 122 can be regarded as the second driving input end of the driving circuit 130. The driving power Sdrv generated by the driving circuit 130 is provided to the LED module LM through the first driving output end 130a and the second driving output end 130b, so that the LED module LM can light up in response to the received driving power Sdrv. The driving circuit 130 in this embodiment can also be a power converting circuit including a switching control circuit and a converting circuit. For a specific configuration example, reference can be made to the description of the embodiment in FIGS. 4A and 4B, and details would be omitted herein.

The input end of the demodulating module 140 is electrically connected to the first connecting end 101 and the second connecting end 102 to receive the modulated power supply Pin_C, and the output end of the demodulating module 140 is electrically connected to the driving circuit 130 to provide the dimming control signal Sdc. The demodulating module 140 would analyze/demodulate the luminance information from the modulated power supply Pin_C and generate a corresponding dimming control signal Sdc based on the luminance information, wherein the driving circuit 130 would adjust the magnitude of output driving power Sdrv based on the dimming control signal Sdc. For example, in the driving circuit 130, the switching control circuit (e.g., the switching control circuit 72) can adjust the duty ratio of the power switch PSW based on the dimming control signal Sdc, so that the driving power Sdrv would be increased or decreased in response to the luminance information indicated by the dimming control signal Sdc. When the dimming control signal Sdc indicates a higher luminance or color temperature, the switching control circuit can increase the duty cycle based on the dimming control signal Sdc, so that the power converting circuit ESE outputs a higher driving power Sdrv to the LED module LM. Conversely, when the dimming control signal Sdc indicates a lower luminance or color temperature, the switching control circuit can lower the duty cycle based on the dimming control signal Sdc, so that the power converting circuit ESE outputs a lower driving power Sdrv to the LED module LM. In this way, the effect of dimming control can be realized.

In some embodiments, the dimming control of the LED module LM can also be performed by controlling circuits other than the driving circuit 130. For example, please refer to FIG. 6B, in the power module 200 of FIG. 6B, the operation of generating the driving power based on the modulated power supply and the operation of demodulating the dimming information out from the modulated power supply Pin_C are similar to those described in the embodiment of FIG. 6A. The difference is that, in the embodiment of FIG. 6B, the power module PM further includes a dimming switch 150. The dimming switch 150 turns on or off the driving power Sdrv based on the dimming control signal Sdc to generate intermittent dimming power Sdrv to be supplied to the LED module LM, so as to perform dimming to the LED module LM. In some embodiments, the dimming control signal Sdc generated by the demodulating module 140 can be a signal in the form of pulse width modulation (PWM), so as to control the dimming switch 150 to be turned on intermittently and realizing the PWM dimming thereby.

Figure 6C:
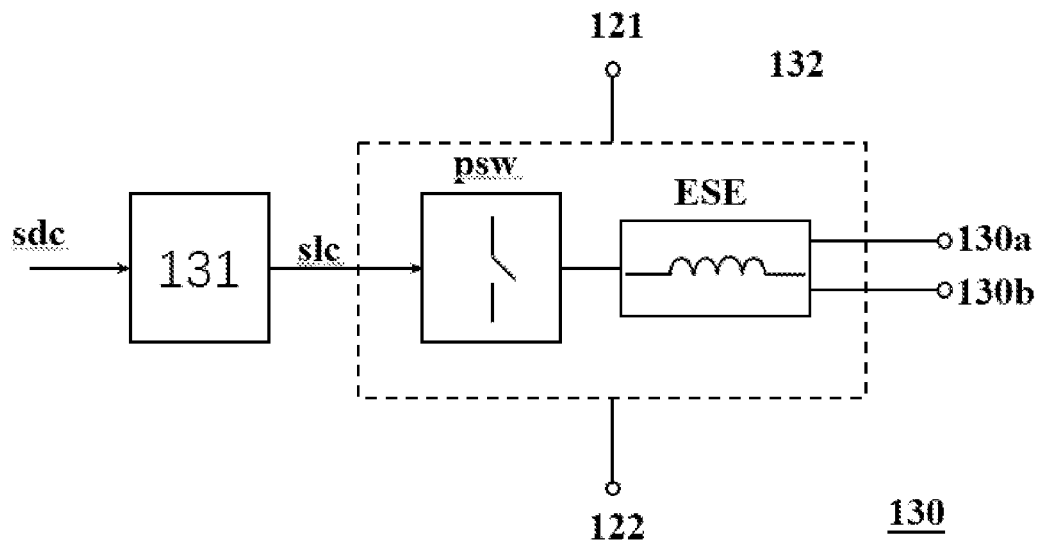
FIG. 6C is a schematic diagram of functional modules of a driving circuit in accordance with some embodiments of the present disclosure.

FIG. 6C is a schematic diagram of functional modules of a driving circuit in accordance with some embodiments of the present disclosure. Please refer to FIG. 6A and FIG. 6C together, the driving circuit 130 is an embodiment of the driving circuit 130 of the aforementioned FIG. 6A, which includes a switching control circuit 131 and a converting circuit 132, and performs power conversion in a current source mode, to drive the LED module LM to emit light. The converting circuit 132 includes a switching circuit PSW (also referred to as a power switch) and an energy storage circuit ESE. The converting circuit 132 is coupled to the first filter output end 121 and the second filter output end 122, receives the filtered signal Sflr, converts the filtered signal Sflr into a driving power Sdrv based on the control of the switching control circuit 131 and the driving power Sdrv is output from the first driving output end 130a and the second driving output end 130b to drive the LED module LM. Under the control of the switching control circuit 131, the driving power output from the converting circuit 132 is a stable current, so that the LED module emits light stably. Besides, the driving circuit 130 may further include a biasing circuit 133. The biasing circuit 133 can generate the working voltage Vcc based on the bus voltage of the power module, and the working voltage Vcc is provided to be used by the switching control circuit 131, so that the switching control circuit 131 can be activated and operates based on the working voltage Vcc.

The switching control circuit 131 of this embodiment can adjust the duty cycle of the output lighting control signal Slc in real time based on the current working state of the LED module LM, so that the switching circuit PSW is able to turn on or off in response to the lighting control signal Slc. The switching control circuit 131 can detect one or more of the input voltage (which can be the voltage level on the first connecting end 101/the second pin 102, the voltage level on the first rectifying output end 111, or the voltage level at the first filter output 121), the output voltage (can be the voltage level on the first driving output end 130a), the input current (can be the bus current, that is, the current flowing through the rectifying output end 111/112 and the filter output end 121/122) and the output current (can be the current flowing through the driving output end 130a/130b, the current flowing through the energy storage circuit ESE, or the current flowing through the switching circuit PSW) to determine the current working state of the LED module LM. The energy storage circuit ESE is repeatedly charged/discharged based on the on/off state of the switching circuit PSW, so that the driving power Sdrv received by the LED module LM can be stably maintained at a preset current level Ipred.

The input end of the demodulating module 140 is electrically connected to the first connecting end 101 and the second connecting end 102 to receive the modulated power supply Pin_C, and the output end of the demodulating module 140 is electrically connected to the driving circuit 130 to provide the dimming control signal Sdc. The demodulating module 140 generates the corresponding dimming control signal Sdc based on the phase cutting angle/conducting angle of the modulated power Pin_C in each cycle or half cycle, wherein the switching control circuit 131 adjusts the lighting control signal Slc based on the dimming control signal Sdc, so that the driving power Sdrv is changed in response to the change of the lighting control signal Slc. For example, the switching control circuit 131 can adjust the duty cycle of the lighting control signal Slc based on the dimming control signal Sdc, so that the driving power Sdrv increases or decreases in response to the luminance information indicated by the lighting control signal Slc. When the dimming control signal Sdc indicates a higher luminance or color temperature, the switching control circuit 131 would increase the duty cycle based on the dimming control signal Sdc, thereby causing the converting circuit ESE to output a higher driving power Sdrv to the LED module LM. On the contrary, when the dimming control signal Sdc indicates a lower luminance or color temperature, the switching control circuit 131 would lower the duty cycle based on the dimming control signal Sdc, thereby causing the converting circuit ESE to output a lower driving power Sdrv to be supplied to the LED module LM. In this way, the effect of dimming control can be achieved.

More specifically, the demodulation processing performed by the demodulating module 140 on the modulated power supply Pin_C can be, for example, signal conversion such as sampling, counting and/or mapping. For example, the demodulating module 140 can sample and count the zero-level duration of the modulated power supply Pin_C in each cycle or half cycle of the modulated power supply Pin_C, wherein the counted zero-level duration can be mapped to a voltage level linearly or non-linearly, and the mapped voltage level can be provided to the switching control circuit 131 as the dimming control signal Sdc. The mapped voltage level range can be selected based on the processable range of the switching control circuit 131, which can be, for example, 0V-5V. The signal waveforms and circuit operations of the LED lighting system of the present disclosure under different dimming states would be further described with reference to FIG. 8D below. FIG. 8D is a schematic diagram of a dimming waveform accordance with some embodiments of the present disclosure.

More specifically, the demodulation processing performed by the demodulating module 140 to the modulated power supply Pin_C can be, for example, signal conversion such as sampling, counting, and/or mapping. The configuration and circuit operation of the demodulating module 140 of the present disclosure are further described with reference to FIGS. 7A to 7C. FIG. 7A is a schematic diagram of functional modules of a demodulating module in accordance with some embodiments of the present disclosure, and FIGS. 7B and 7C are schematic circuit diagrams of LED lighting devices in accordance with some embodiments of the present disclosure.

Please refer to FIG. 7A, the demodulating module 140 of this embodiment includes a sampling circuit 141 and a signal converting circuit 145. The sampling circuit 141 receives the modulated power supply Pin_C, and is configured to collect/retrieve luminance information from the modulated power supply Pin_C, and accordingly generate a luminance indication signal Sdim' corresponding to the dimming signal (such as the dimming signal Sdim) in the dimmer. The signal converting circuit 145 is electrically connected to the sampling circuit 141 to receive the luminance indication signal Sdim' and is configured to generate a dimming control signal Sdc for controlling a subsequent circuit based on the luminance indication signal Sdim'. The signal format of the dimming control signal Sdc would be designed or adjusted based on the type of the subsequent circuit. For example, if the demodulating module 140 realizes the dimming function by controlling the driving circuit 130, the dimming control signal Sdc can be, for example, a signal in which at least one of voltage level, frequency and pulse width is proportional to the dimming information. If the demodulating module 140 controls the dimming switch 150 to realize the dimming function, the dimming control signal Sdc can be, for example, a signal with a pulse width proportional to the dimming information.

A specific example of the demodulating module 140 of some embodiments of the present disclosure is illustrated below with FIG. 7B and FIG. 7C. Please refer to FIG. 7B, in the power module of this embodiment, the driving circuit 130 includes a switching control circuit 131 and a converting circuit 132, and the demodulating module 140 includes a sampling circuit 141 and a signal converting circuit 145a. In the driving circuit 130, the converting circuit 132 includes a resistor R41, an inductor L41, a freewheeling diode D41, a capacitor C41, and a transistor M41, wherein the connection configuration between the above-mentioned components is similar to that of the resistor R21, the inductor L21, the freewheeling diode D21, the capacitor C21 and the transistor M21 shown in FIG. 4B, which would be omitted herein. The sampling circuit 141 includes a coupling circuit 142. The coupling circuit 142 is electrically connected to the first connecting end 101, the second connecting end 102 and the signal converting circuit 145a, and is configured to filter the DC component of the modulated power supply Pin_C, and extract the dimming information in the modulated power supply Pin_C. The coupling circuit 142 can be implemented, for example, by a capacitor C51.

In some embodiments, the sampling circuit 141 further includes a plurality of electronic components for voltage stabilization or voltage level adjustment, such as the resistors R51-R53 and the Zener diode ZD51. One end of the capacitor C51 is electrically connected to the first connecting end 101. The resistor R51 is electrically connected between the other end of the capacitor C51 and the second connecting end 102. One end of the resistor R52 is electrically connected to the connecting end of the capacitor C51 and the resistor R1, and the other end of the resistor R52 is electrically connected to the signal converting circuit 145a. The resistor R53 is electrically connected between the other end of the resistor R52 and the second connecting end 102. Zener diode ZD51 is connected in parallel with the resistor R51. Under the above configuration, the signal at the connecting end of the resistors R52 and R53 can be regarded as the luminance indication signal Sdim'.

The signal converting circuit 145a would generate a dimming control signal Sdc with a corresponding frequency, voltage and duty cycle based on the luminance information indicated by the luminance indication signal Sdim' and provide the dimming control signal Sdc to the switching control circuit 131, so that the switching control circuit 131 can generates a lighting control signal Slc to adjust the switching behavior of the transistor M41 based on the dimming control signal Sdc, so that the driving power Sdrv generated by the driving circuit 130 changes in response to the luminance information. In some embodiments, the lighting control signal may also be referred to as a dimming indication signal.

Figure 9A:
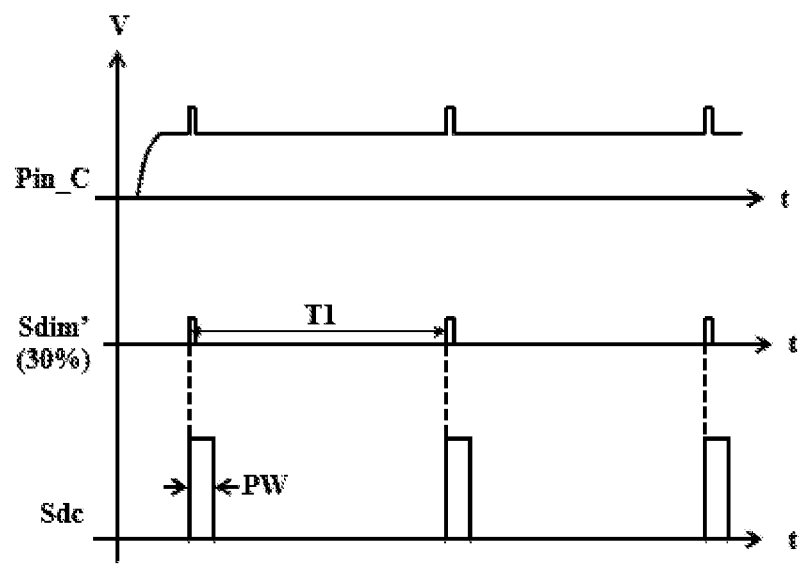
FIGS. 9A-9D are schematic diagrams of signal waveforms of LED lighting devices in accordance with some embodiments of the present disclosure.
Figure 9B:
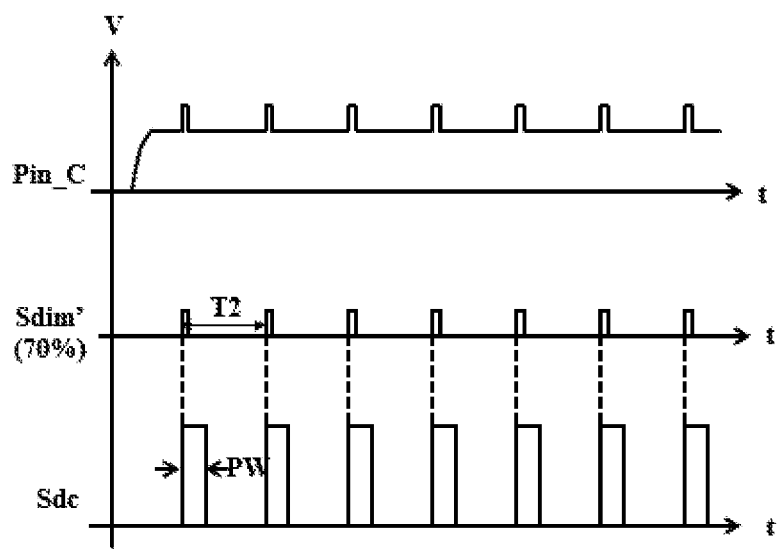

The operation of the above-mentioned demodulating module 140 is described below with FIG. 9A and FIG. 9B, wherein FIG. 9A and FIG. 9B are schematic diagrams of signal waveforms of LED lighting devices in accordance with some embodiments of the present disclosure. Here, similar to the foregoing embodiments, the luminance of the LED module is also adjusted to 30% and 70% of the maximum luminance as an example for illustration, but the disclosure is not limited thereto. Please refer to FIGS. 7B, 9A and 9B at the same time, when the LED device receives the modulated power supply Pin_C with a DC component (such as a DC set voltage Vset) and an AC component (such as a pulse based on the set voltage Vset), on the one hand, in response to the modulated power supply Pin_C, the driving circuit 130 would be activated and perform power conversion to generate the driving power Sdrv; and on the other hand, the demodulating module 140 would couple the AC component out from the modulated power supply Pin_C through the capacitor C51, and perform voltage division and voltage stabilization through the resistors R51-R53 and the Zener diode ZD51 to generate luminance indication signal Sdim'. As described herein, the luminance indication signal Sdim' can, for example, have a pulse waveform, and each pulse can be approximately synchronous with the AC component in the modulated power supply Pin_C. The dimming information/luminance information set from the dimmer can be regarded as being included in the frequency information of the luminance indication signal Sdim'. As shown in FIG. 9A and FIG. 9B, the frequency of the luminance indicating signal Sdim' indicating the 30% luminance would be smaller than that of the luminance indicating signal Sdim' indicating the 70% luminance, that is, the period T1 of the luminance indicating signal Sdim' indicating the 30% luminance would be greater than the period T2 of the luminance indication signal Sdim' indicating the 70% luminance.

The luminance indicating signal Sdim' would trigger the signal converting circuit 145a to generate a square wave with a fixed pulse width PW as the dimming control signal Sdc. In FIG. 9A and FIG. 9B, the signal converting circuit 145a triggers the generation of the square wave based on the rising edge of the luminance indication signal Sdim' is illustrated as an example, but the present disclosure is not limited thereto. In some embodiments, the signal converting circuit 145a can also be triggered based on the falling edge of the luminance indicating signal Sdim' or be triggered based on a manner of determining whether the voltage of the luminance indicating signal Sdim' reaches a specific value. In addition, since the square wave in the dimming control signal Sdc is triggered and generated based on the pulse of the luminance indicating signal Sdim', the frequency of the dimming control signal Sdc is substantially the same as that of the luminance control signal Sdim'.

Through the above-mentioned signal conversion operation, when the switching control circuit 131 receives the dimming control signal Sdc indicating a luminance with 30% of the maximum luminance, the switching control circuit 131 would lower the duty ratio of the transistor M41 to reduce the current value of the driving power supply Sdrv to 30% of the rated current value; and when the switching control circuit 131 subsequently receives the dimming control signal Sdc indicating a luminance with 70% of the maximum luminance, the switching control circuit 131 would increase the duty cycle of the transistor to make the current value of the driving power supply Sdrv from 30% of the rated current value rises to 70% of the rated current value, so as to achieve the effect of dimming.

Please refer to FIG. 7C, the embodiment in FIG. 7C shows another configuration of the demodulating module 140. The configuration of this embodiment is basically the same as that of the aforementioned embodiment in FIG. 7B. The main difference is that, the sampling circuit 141 of this embodiment further includes a transistor M5 and a resistor R54, and the signal converting circuit is implemented by the signal converting circuit 145b triggered by the falling edge, wherein the transistor M51 and the resistor R54 are configured to form a signal inversion module to reverse the signal on the connecting end of the resistors R52 and R53 and output luminance indicating signal Sdim'. The transistor M51 and the resistor R54 can be referred to as a signal converting circuit.

Specifically, the transistor M51 has a first end, a second end and a control end, the first end of the transistor M51 is electrically connected to the signal converting circuit 145b, the second end of the transistor M51 is electrically connected to the second connecting end 102 (also can be regarded as the ground end GND2), and the control end the transistor M51 is electrically connected to the connecting end of the resistors R52 and R53. One end of the resistor R54 is electrically connected to the bias power supply Vcc2 (for example, being divided from the bus), and the other end of the resistor R54 is electrically connected to the first end of the transistor M51, wherein the signal on the connecting end of the transistor M51 and the resistor R54 can be regarded as the luminance indication signal Sdim'.

In the embodiment of FIG. 7C, the signal on the connecting end of the resistors R52 and R53 would be configured as the control signal of the transistor M51. When the control signal is at a high level, the transistor M51 is turned on, and the first end of the transistor M51 can be regarded as being short-circuited to the ground end GND2, so the luminance indication signal Sdim' would be pulled down to a low level (e.g., ground level). When the control signal is at a low level, the transistor M51 is turned off, so the luminance indicator signal Sdim' would be pulled up to a high level (bias power supply Vcc2). In other words, the signal level of the luminance indicating signal Sdim' and the signal level at the connecting end of the resistors R52 and R53 are opposite to each other.

Figure 9C:
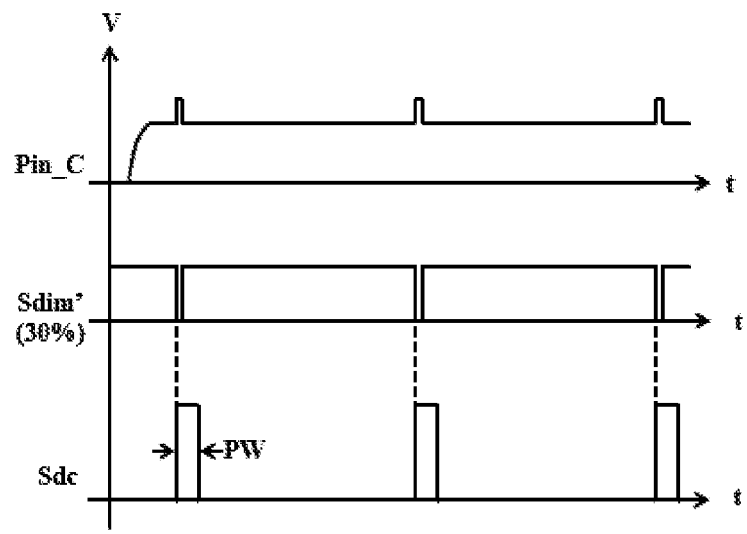
Figure 9D:
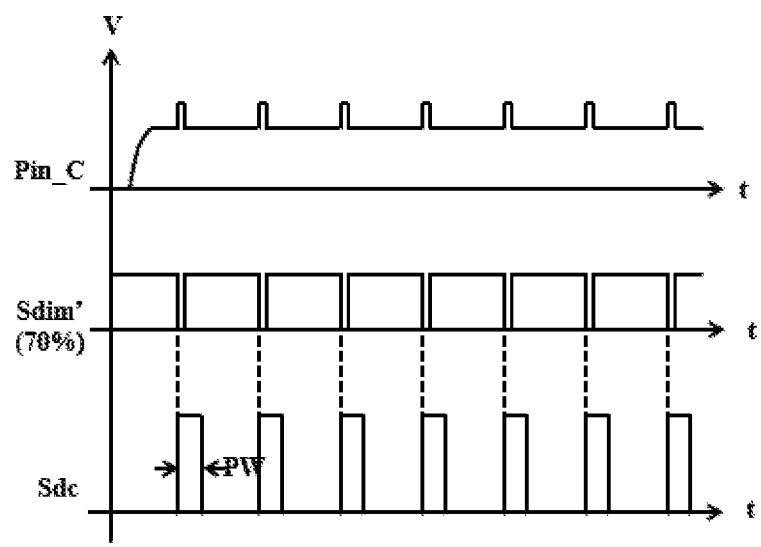

The operation of the demodulating module 140 is described below with reference to FIG. 9C and FIG. 9D, wherein FIG. 9C and FIG. 9D are schematic diagrams of signal waveforms of LED lighting devices in accordance with some embodiments of the present disclosure. Similar to the foregoing embodiment, the luminance of the LED module is adjusted to 30% and 70% of the maximum luminance as an example, but the present disclosure is not limited thereto. Please refer to FIG. 7C, FIG. 9C and FIG. 9D at the same time, when the LED device receives the modulated power supply Pin_C having a DC component (e.g., the DC set voltage Vset) and an AC component (e.g., a pulse based on the set voltage Vset), on the one hand, in response to the modulated power supply Pin_C, the driving circuit 130 would be activated and perform power conversion to generate the driving power supply Sdrv; and on the other hand, the demodulating module 140 would couple the AC component out from the modulated power supply Pin_C through the capacitor C51, and perform voltage division and voltage stabilization through the resistors R51-R53 and the Zener diode ZD51 to generate the control signal of the transistor M51. The transistor M51 is switched to affect the state of the signal on the first end thereof to form the luminance indicating signal Sdim'. Here, the luminance indicating signal Sdim' can have, for example, an inverted pulse waveform (that is, the reference level is at high level, and the pulse is switched to the low level), and each pulse is approximately synchronized with the AC component in the modulated power supply Pin_C. The dimming information/luminance information set by the dimmer can be regarded as being included in the frequency information of the luminance indicating signal Sdim'.

The luminance indication signal Sdim' would trigger the signal converting circuit 145b to generate a square wave with a fixed pulse width PW as the dimming control signal Sdc. In FIGS. 9C and 9D, the signal converting circuit 145b is shown as an example in which the generation of the square wave would be triggered by the falling edge of the luminance indication signal Sdim', but the present disclosure is not limited thereto.

Through the above signal conversion operation, when the switching control circuit 131 receives the dimming control signal Sdc indicating 30% of the maximum luminance, the switching control circuit 131 would reduce the duty cycle of the transistor M41 to reduce the current value of the driving power source Sdrv to 30% of the rated current value; and when the switching control circuit 131 subsequently receives the dimming control signal Sdc indicating 70% of the maximum luminance, the switching control circuit 131 would increase the duty cycle of the transistor to increase the current value of the driving power source Sdrv from 30% of the rated current value to 70% of the rated current value, such that the effect of dimming can be achieved.

Since the demodulating module 140 only uses the AC component in the modulated power supply Pin_C as the trigger of the dimming control signal Sdc, rather than directly controlling the dimming behavior of the driving circuit 130 based on this signal. Therefore, as a result, even if the dimmer 80 is under the influence by any other unexpected factors and cause the modulated power supply Pin_C being fluctuated or unstable, as long as the signal pulse can be identified, the demodulating module 140 can ensure that the dimming control would not be malfunctioned due to voltage fluctuations, such that the reliability of LED lighting devices can be improved.

In some embodiments, the sampling circuit 141 can be referred as a signal analyzing module, and the signal converting circuit 145 can be referred as a signal generating module. The driving circuit 130 can be referred as a power conversion module.

In some embodiments, the signal converting circuit 145 includes a triggering circuit, and the triggering circuit is coupled to the sampling circuit 141 and is configured to receive the luminance indicating signal Sdim'. For example, when the triggering circuit detects a rising edge signal in the luminance indicating signal Sdim', the triggering circuit would be triggered to generate a pulse with a pulse width Th, and the pulse width Th can be set by internal components of the triggering circuit. The converted signal (i.e., the pulse signal) is the dimming control signal Sdc, and the frequency of the dimming control signal Sdc is consistent with the luminance indicating signal Sdim', and the pulse width is Th.

Please refer to FIG. 7D and FIG. 7E at the same time, FIG. 7D is a schematic diagram of functional modules of a demodulating module in accordance with some embodiments of the present disclosure, and FIG. 7E a schematic waveform diagram of a demodulating module in accordance with some embodiments of the present disclosure, which shows the corresponding relationship of the waveform of the demodulating module. As shown in FIG. 7D, the demodulating module 240 includes a voltage level determining circuit 241, a sampling circuit 242, a counting circuit 243 and a mapping circuit 244. The voltage level determining circuit 241 is configured to detect whether the modulated power supply Pin_C is within the threshold interval VTB0 to determine whether the modulated power supply Pin_C is at zero level. Specifically, as shown in FIG. 7E, the voltage level determining circuit 241 compares the voltage level of the modulated power supply Pin_C with the upper threshold Vt1 and the lower threshold Vt2, thereby determining whether the voltage level of the modulated power supply Pin_C is within the threshold interval VTB0. When the modulated power supply Pin_C is within the threshold interval VTB0, the voltage level determining circuit 241 outputs a zero-level determination signal S0V with a first logic level (e.g., a high logic level) to indicate that the voltage level of the modulated power supply Pin_C is within the threshold interval VTB0. The sampling circuit 242 is configured to sample the zero-level determination signal S0V based on the clock signal CLK to generate a sampling signal Spls in the form of a pulse wave. As described herein, when the sampled zero-level determination signal S0V is at a high logic level (representing the modulated power supply Pin_C is within the threshold interval VTB0), the sampling signal Spls outputs a pulse wave, and then the counting circuit 243 counts the number of pulses of the sampling signal Spls to generate the count signal Scnt within, for example, half cycle of the mains electricity (e.g., which can be corresponded to 50 Hz or 60 Hz). Based on the ratio of the count signal Scnt (indicating the number of pulses of the sampling signal Spls) to the total number of clock signals CLK in half cycle of the mains electricity, the mapping circuit 244 maps and generates the dimming control signal Sdc as described above. A reset signal RST is set to be synchronized with the half cycle of the mains electricity to reset the counting circuit 243. It should be noted that, the dimming control signal Sdc in the present disclosure is not on the power circuit of the LED module LM and the driving power Sdrv. In other words, the dimming control signal Sdc is not configured to be set as power supply that directly drives the LED module LM. From another perspective, the current or power of the dimming control signal Sdc is much smaller than the current or power of the driving power Sdrv. Specifically, in some embodiments, the current or power of the dimming control signal Sdc is far less than $1/10$, $1/100$ or $1/100$ of the current or power of the driving power Sdrv.

Figure 10A:
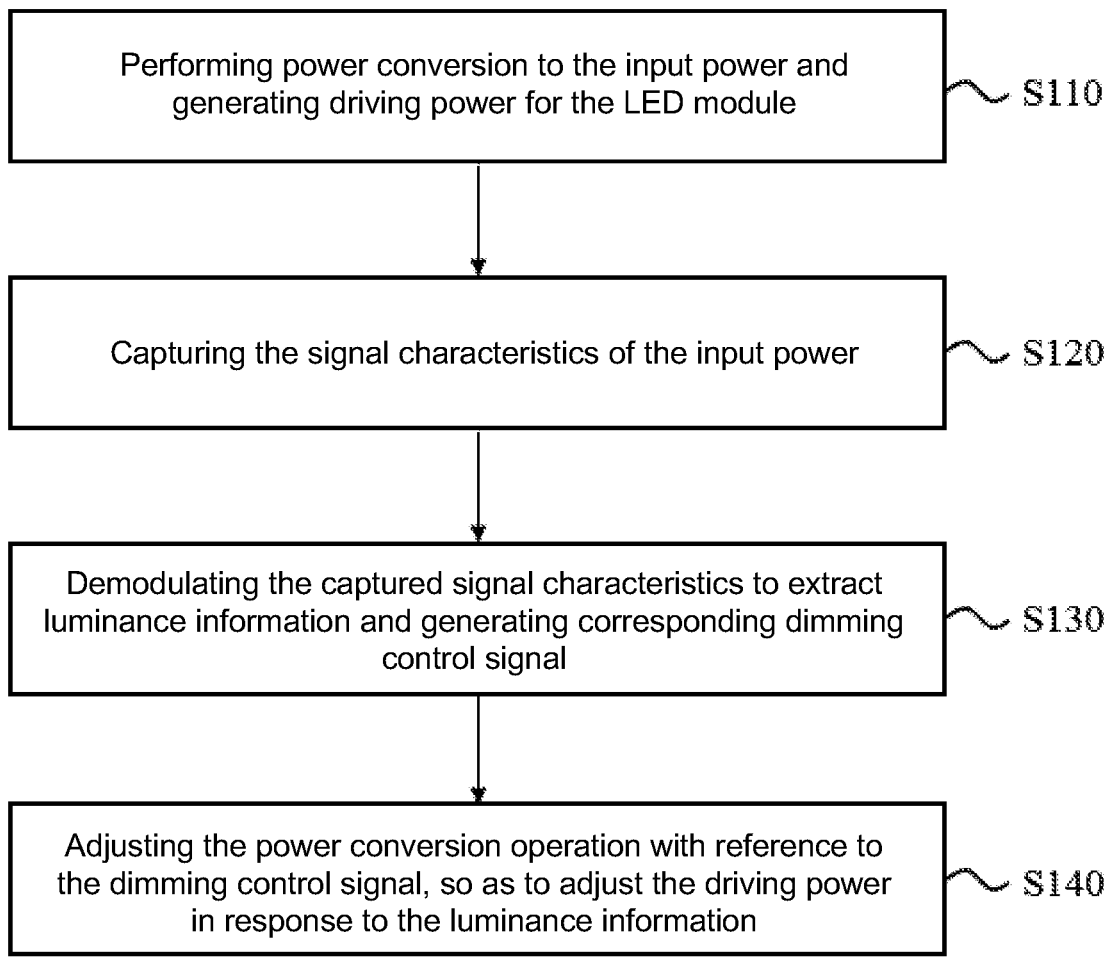
FIGS. 10A and 10B are flowcharts of a dimming control method for an LED lighting device in accordance with some embodiments of the present disclosure.
Figure 10B:
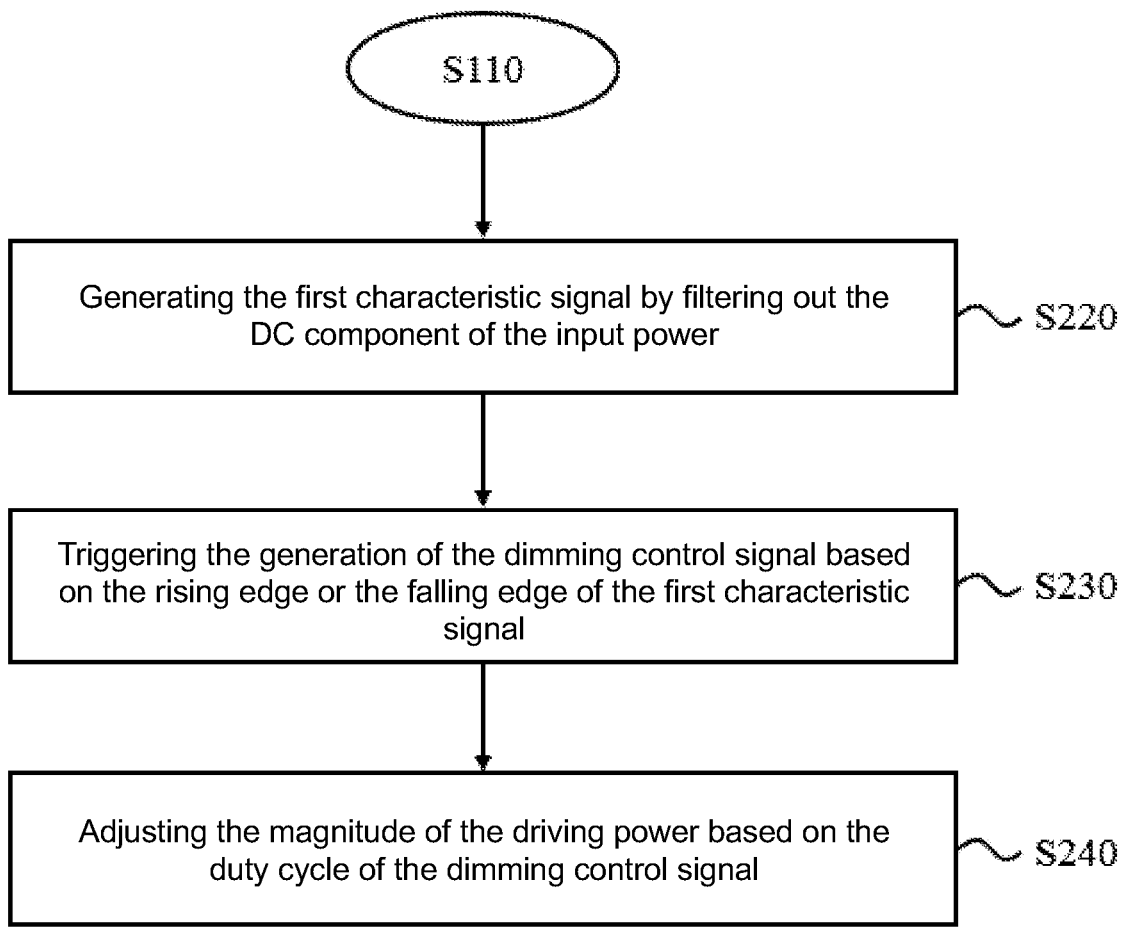

FIGS. 10A and 10B are flowcharts of a dimming control method for an LED lighting device in accordance with some embodiments of the present disclosure. The dimming control method described herein can be applied to the LED lighting system or LED lighting device described in any one of the above-mentioned embodiments in FIG. 1 to FIG. 7C. Please refer to FIG. 10A, in the dimming control method of this embodiment, the power module in the LED lighting device performs power conversion to the input power, and generates driving power for the LED module (step S110). On the other hand, the demodulating module in the LED lighting device would capture the signal characteristics of the input power (step S120). Then, the demodulating module demodulates the captured signal characteristics to extract luminance information and generate corresponding dimming control signals (step S130). Further, the power module adjusts the power conversion operation with reference to the dimming control signal generated by the demodulating module, so as to adjust the driving power in response to the luminance information (step S140).

In some embodiments, steps S120 to S140 can be further implemented based on the control method described in FIG. 10B. Referring to FIG. 10B, in this embodiment, the demodulating module can generate the first characteristic signal by filtering out the DC component of the input power (step S220). The first characteristic signal described herein can be the luminance indication signal Sdim' as mentioned in the above-described embodiments. Next, the demodulating module triggers the generation of the dimming control signal based on the rising edge or the falling edge of the first characteristic signal (step S230), and makes the switching control circuit in the power module adjust the magnitude of the driving power based on the duty cycle of the dimming control signal (step S240).

Figure 10C:
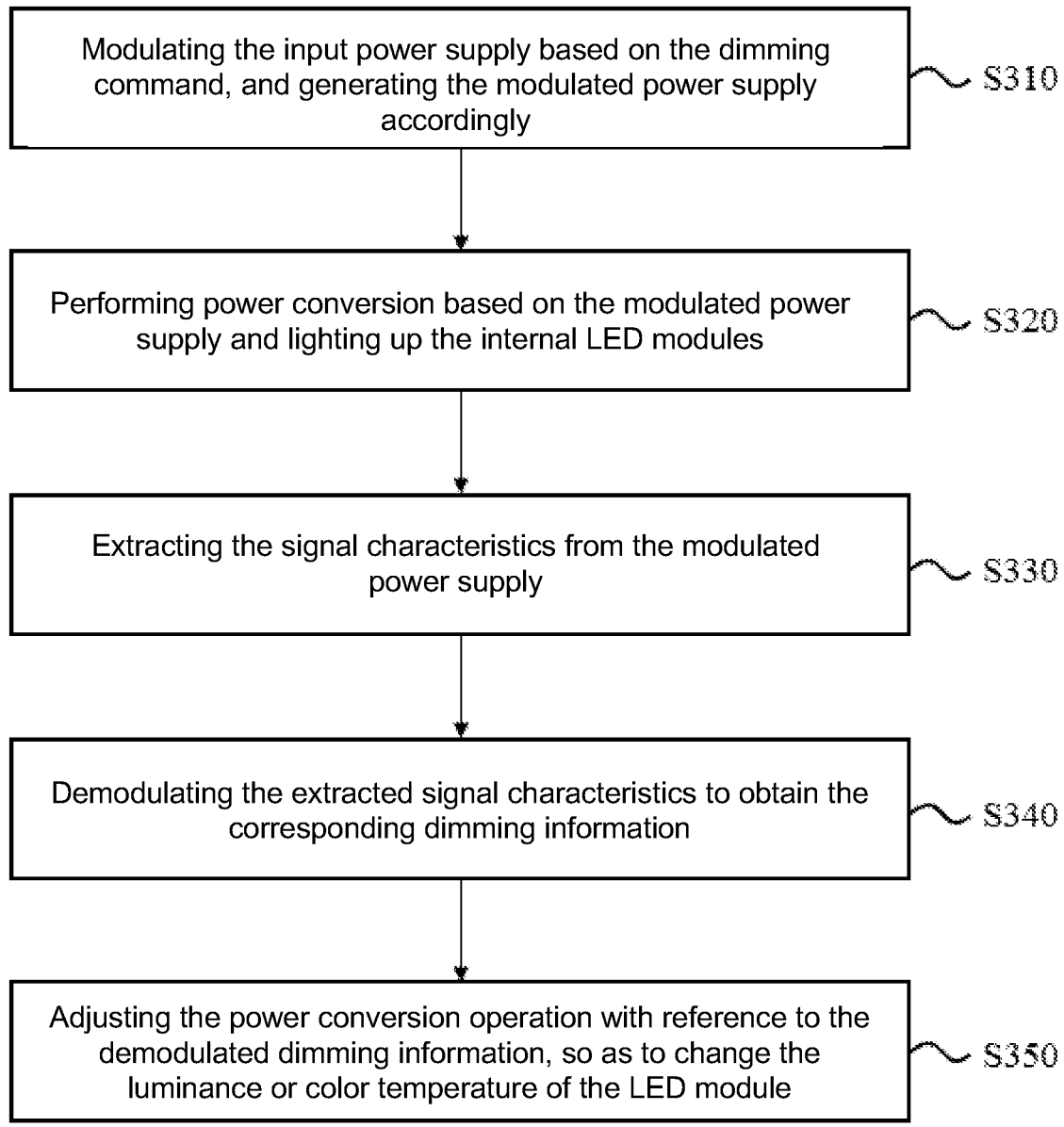
FIGS. 10C and 10D are flow charts of a dimming control method for an LED lighting system in accordance with some embodiments of the present disclosure.

FIG. 10C is a flow chart of a dimming control method for an LED lighting system in accordance with some embodiments of the present disclosure. Please refer to FIG. 1A and FIG. 10C together, and the overall dimming control method is described from the perspective of the LED lighting system 10. First, the dimmer 80 would modulate the input power supply Pin based on the dimming command DIM, and generate the modulated power supply Pin_C accordingly (step S310), wherein the modulated power supply Pin_C has signal characteristics indicating the dimming information, and the signal characteristics can be, for example, the phase cutting angle/conducting angle of the modulated power supply Pin_C. The modulated power supply Pin_C would be provided to the LED lighting device 100, so that the LED lighting device 100 performs power conversion based on the modulated power supply Pin_C and lights up the internal LED modules (step S320). On the other hand, the LED lighting device 100 would extract the signal characteristics from the modulated power supply Pin_C (step S330), and demodulate the extracted signal characteristics to obtain the corresponding dimming information (step S340). Next, the LED lighting device 100 adjusts the power conversion operation with reference to the demodulated dimming information, so as to change the luminance or color temperature of the LED module (step S350).

More specifically, with reference to FIG. 6A, the above-mentioned operation of extracting signal features (step S330) and demodulating the modulated power supply Pin_C (step S340) can be performed by the demodulating module 140 in the LED lighting device 100/200. In some embodiments, the operations of the LED lighting device 100 performing power conversion based on the modulated power supply Pin_C, lighting up the internal LED module (step S320) and adjusting the power conversion operation with reference to the dimming information, so as to adjust the luminance of the LED module (step S350) can be realized by the driving circuit 230 in the LED lighting device 100/200.

Figure 10D:
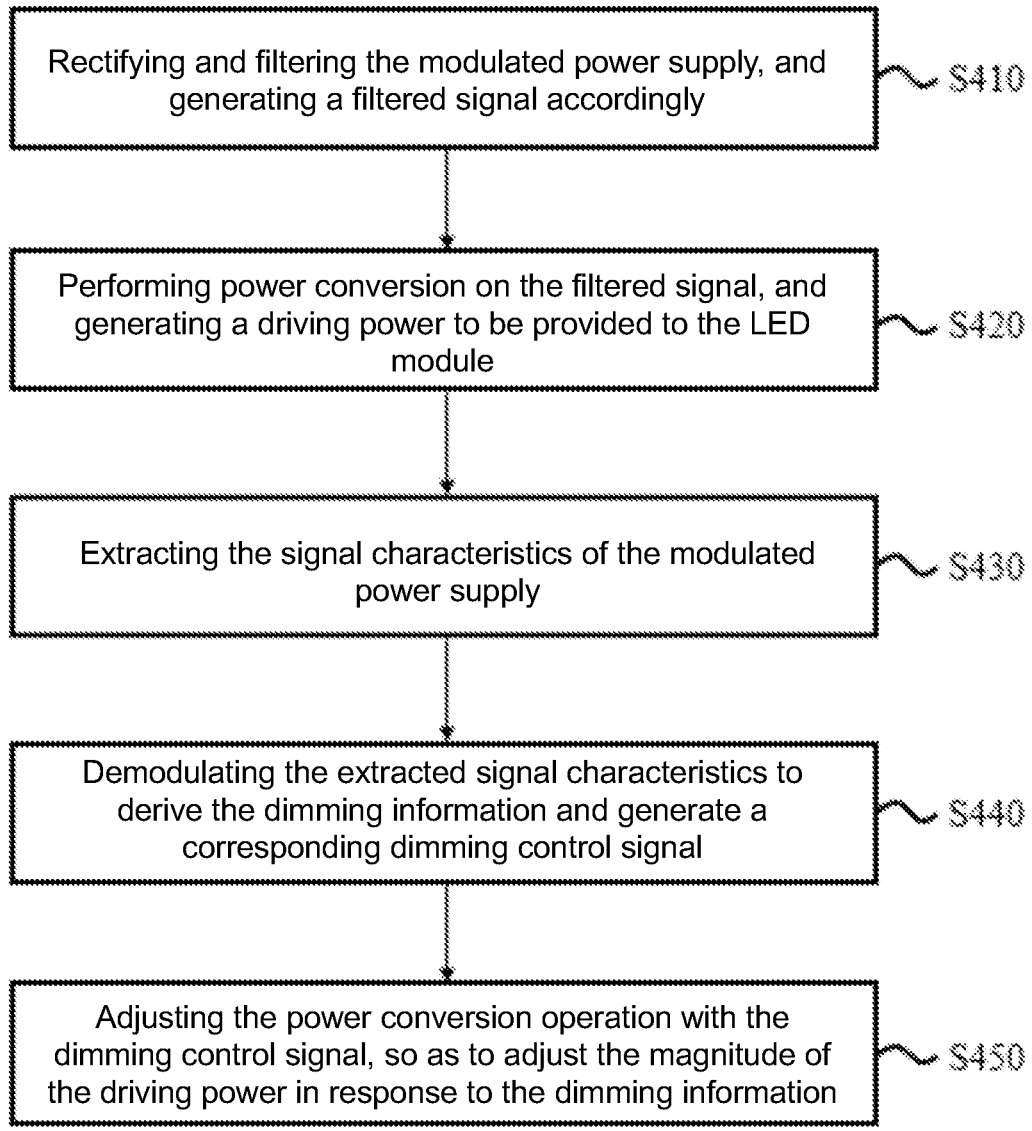

The overall dimming control method is further described below from the perspective of the LED lighting device 100, as shown in FIG. 10D. FIG. 10D is a flow chart of a dimming control method for an LED lighting system in accordance with some embodiments of the present disclosure. Please refer to FIGS. 1A, 6A and 10D together, when the LED lighting device 100 receives the modulated power supply Pin_C, the rectifying circuit 110 and the filtering circuit 120 would sequentially rectify and filter the modulated power supply Pin_C, and accordingly generate a filtered signal Sflr to be provided the driving circuit 130 (step S410). The driving circuit 130 performs power conversion on the received filtered signal Sflr, and generates a driving power Sdrv to be provided to the back-end LED module (step S420). On the other hand, the demodulating module 140 would extract the signal characteristics of the modulated power supply Pin_C (step S430), then demodulate the extracted signal characteristics to derive the dimming information (for example, the size/magnitude corresponding to the phase cutting angle), and generate a corresponding dimming control signal Sdc (step S440). Here, the driving circuit 130 adjusts the power conversion operation with reference to the dimming control signal Sdc, so as to adjust the magnitude of the generated driving power Sdrv in response to the dimming information (step S450), thereby making the luminance or the color temperature of the LED module LM change.

Further, the mode of adjusting the power conversion operation of the driving circuit 130 by the dimming control signal Sdc can be an analog control mode in some embodiments. For example, the level of the dimming control signal Sdc can be configured in an analog manner, which means, the voltage or current reference value of the driving circuit 130 is controlled in an analog manner, thereby adjusting the magnitude of the driving power Sdrv in an analog manner.

In some embodiments, the power conversion operation mode of the driving circuit 130 is adjusted with the dimming control signal Sdc. In some embodiments, this may be optionally configured as a digital control mode. For example, the dimming control Sdc may have different duty cycles in response to different phase cutting angles. In such embodiments, the dimming control signal Sdc may have, for example, a first state (e.g., a high logic state) and a second state (e.g., a low logic state). In some embodiments, the first state and the second state are configured to digitally control the magnitude of the driving power Sdrv of the driving circuit 130. For example, outputting current in the first state, stopping outputting current in the second state, and in this way, the LED module LM is dimmed.

Figure 13A:
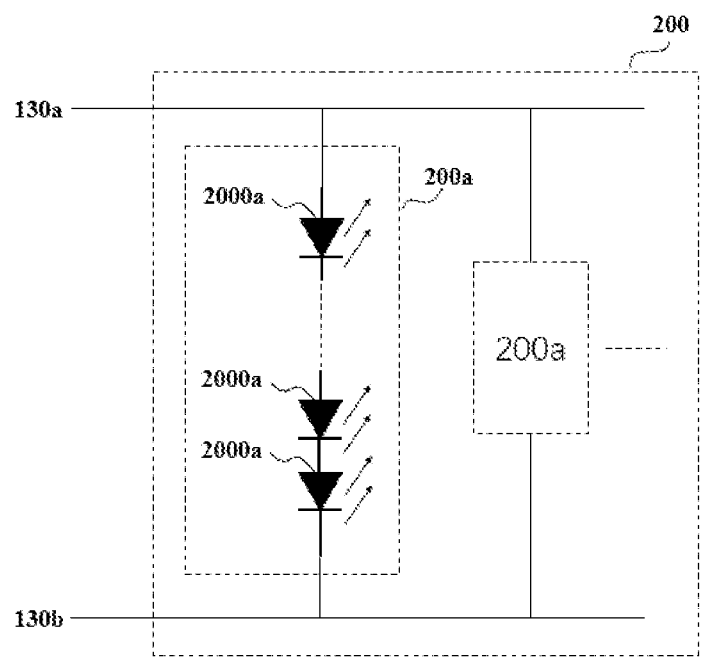
FIGS. 13A and 13B are schematic diagrams of circuit structures of LED modules in accordance with some embodiments of the disclosure.

Please refer to FIG. 13A, which is a schematic diagram o of circuit structures of LED modules in accordance with some embodiments of the disclosure. As shown in the figure, the positive end of the LED module LM is coupled to the first driving output 130a of the driving device and the negative end is coupled to the second driving output end 130b of the driving device. The LED module LM includes at least one LED unit 200a, and when there are two or more LED units 200a, the LED units 200a are connected in parallel. The positive end of each LED unit is coupled to the positive end of the LED module LM to be coupled to the first driving output end 130a; and the negative end of each LED unit is coupled to the negative end of the LED module LM to be coupled to the first driving output end 322. The LED unit 200a includes at least one LED assembly 2000a, that is, the light source of the LED lamp. When there are multiple LED assemblies 2000a included in the LED unit 200a, the LED assemblies 2000a are connected in series, the positive end of the first LED assembly 2000a is coupled to the positive end of the corresponding LED unit 200a, and the negative end of the first LED assembly 2000a is coupled to the next (e.g., the second) LED assembly 2000a. The positive end of the last LED assembly 2000a is coupled to the negative end of the previous LED assembly 2000a, and the negative end of the last LED assembly 2000a is coupled to the negative end of the corresponding LED unit 200a.

Figure 13B:
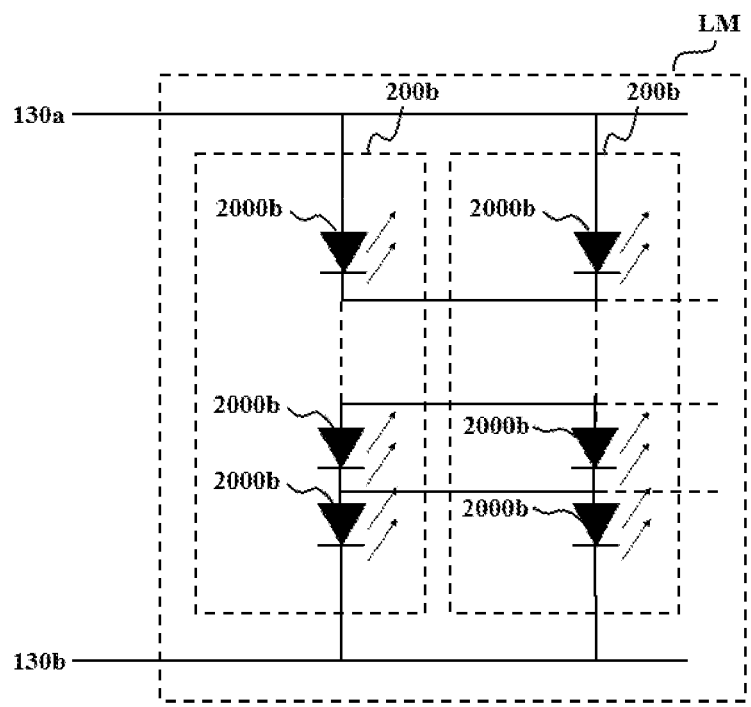

Please refer to FIG. 13B, which shows a schematic diagram of circuit structures of a LED module in accordance with some embodiments of the disclosure. As shown in the figure, the positive end of the LED module LM is coupled to the first driving output end 130a, and the negative end is coupled to the first driving output end 130b. The LED module LM of this embodiment includes at least two LED units 200b, and the positive end of each LED unit 200b is coupled to the positive end of the LED module LM, and the negative end of each LED unit 200b is coupled to the negative end of the LED module LM. The LED unit 200b includes at least two LED components 2000b. The negative end of the LED component 2000b is coupled to the positive end of the next LED component 2000b. The positive end of the first LED assembly 2000b is coupled to the positive end of the corresponding LED unit 200b, and the negative end of the last LED assembly 2000b is coupled to the negative end of the corresponding LED unit 200b. Furthermore, the LED units 200b in this embodiment are also connected to each other. The positive ends of the nth LED assemblies 2000b of each LED unit 200b are connected to each other, and the negative ends are also connected to each other. Therefore, the connection between the LED components of the LED module LM of the present embodiment is a mesh connection. In practical applications, the number of LED components 2000b included in the LED unit 200b is preferably 15-25, and more preferably 18-22.

In addition, it should be mentioned that although the above-mentioned embodiments are all described by adjusting the luminance of the LED module, those mentioned in the embodiments can also be applied to the adjustment of the color temperature of the LED module. For example, if the above-mentioned dimming control method is applied to the case where only the driving power provided to the red LED lamp bead is adjusted (that is, only the luminance of the red LED lamp bead is adjusted), the color temperature adjustment of the LED lighting device can be realized by the above-mentioned dimming control method.

Referring to FIG. 1D, which is a circuit block diagram of a fault detecting module in accordance with some embodiments of the disclosure. In this embodiment, the LED lighting system 10 further includes a fault detecting module 90. The fault detecting module 90 is electrically connected to the dimmer 80. Referring to FIGS. 1A-1C, the LED lamp 100 includes a plurality of lamps 100_1, 100_2 . . . 100_n, and the dimmer 80 is provided with a protection circuit. When one or more lamps in the LED lamp 100 fail, the protection circuit in the dimmer is triggered, or a dimming fault causes a paralysis of the entire LED lighting system 10, it is difficult for the maintenance personnel to determine whether the fault point is the dimmer 80 or any specific faulty lamp. Generally, it can be repaired by replacing the lamps, but when the LED lighting system 10 includes too many lamps, it is very troublesome to replace. The fault detecting module 90 can overhaul the LED lighting system 10 by bypassing the dimmer 80.

Figure 14A:
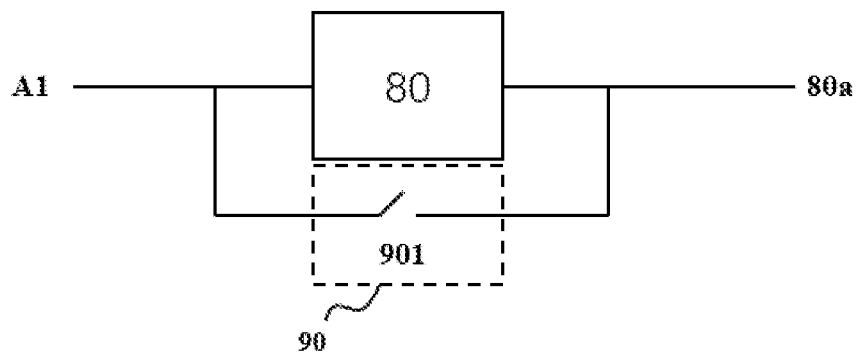
FIGS. 14A-14B are schematic diagrams of circuit structures of fault detecting modules in accordance with some embodiments of the present disclosure.

FIG. 14A is a schematic diagram of a circuit structure of a fault detecting module in accordance with some embodiments of the present disclosure.

The working principle of the fault detecting module 90 would be described. The fault detecting module 90 includes a switch 901, and the switch 901 is connected in parallel with the dimmer 80. The first pin of the switch 901 is electrically connected to the power input end A1, and the second pin of the switch 901 is electrically connected to the dimmer output end 80a. When the failure of the dimmer 80 or the failure of the LED lamp 100 causes the entire lighting system to be paralyzed, the switch 901 can be configured for failure detection. In a normal state, the switch 901 is in an off state, and the dimmer 80 can normally control the LED lamp 100. When the lighting system fails, the switch 901 can be set closed. At this time, the dimmer 80 is bypassed by the switch 901, and the external power EP can directly supply power to the LED lamp 100. At this time, if the LED lamp 100 is normally lit, failure of the LED lamp 100 can be excluded and then the dimmer 80 can be repaired; and if one or more lamps in the LED lamp 100 cannot be lit normally due to a fault and some of other lamps can be lit normally, and only the fault lamps are needed to be replaced. Through this configuration, it is convenient to detect system faults to determine the fault location, which is convenient for maintenance personnel to carry out maintenance.

In this embodiment, the switch 901 is a normally-opened switch, which can be arranged inside the dimmer 80, and can be triggered through a mechanical trigger or a control interface of the dimmer 80. In some embodiments, the dimmer 80 can also be other types of controllers, and the present disclosure is not limited thereto.

Figure 14B:
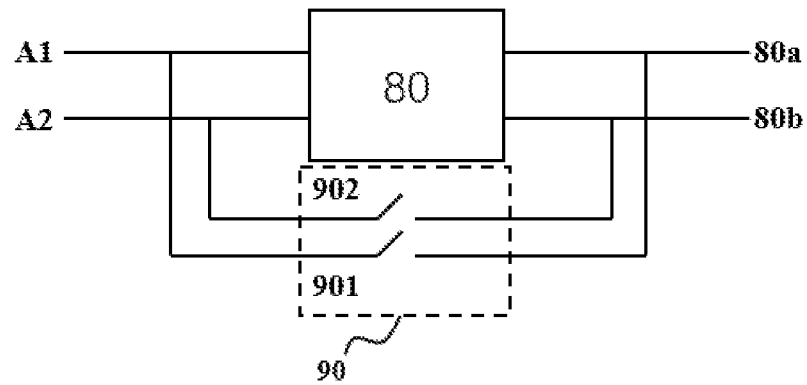

Referring to FIG. 14B, which is a schematic diagram of a circuit structure of a fault detecting module in accordance with some embodiments of the present disclosure. The fault detecting module 90 includes a switch 901 and a switch 902. In this embodiment, the dimmer 80 is electrically connected to the power input ends A1 and A2, is configured to receive external power signals, and has dimmer output ends 80 *a* and 80*b*. The dimmer output ends 80*a* and 80*b* are electrically connected to the LED lamp. The first pin of the switch 901 is electrically connected to the power input end A1, and the second pin thereof is electrically connected to the dimming output end 80*a*. The first pin of the switch 902 is electrically connected to the power input end A2, and the second pin thereof is electrically connected to the dimmer output end 80*b*. In a normal state, the switch 901 and the switch 902 are cut off, and the dimmer 80 works normally. When the LED lamp lighting system breaks down and the troubleshooting is carried out, the switches 901 and 902 can be set closed, the dimmer 80 is bypassed by the switches 901 and 902, and the external power signal can directly supply power to the LED lamp through the switches 901 and 902. At this time, if the LED lamp 100 lights up normally, the failure of the LED lamp 100 can be ruled out, and then the dimmer 80 can be overhauled; At this point, just replace the lamp that cannot be turned on. Through this configuration, the system fault can be detected conveniently to determine the location of the fault, which is convenient for the maintenance personnel to carry out maintenance.

In this embodiment, the switch 901 and the switch 902 are normally-opened switches, which can be arranged inside the dimmer 80, and can be triggered by mechanical triggering or a control interface of the dimmer 80. In some embodiments, the dimmer 80 can also be other types of controllers, and the present disclosure is not limited thereto.

Figure 17:
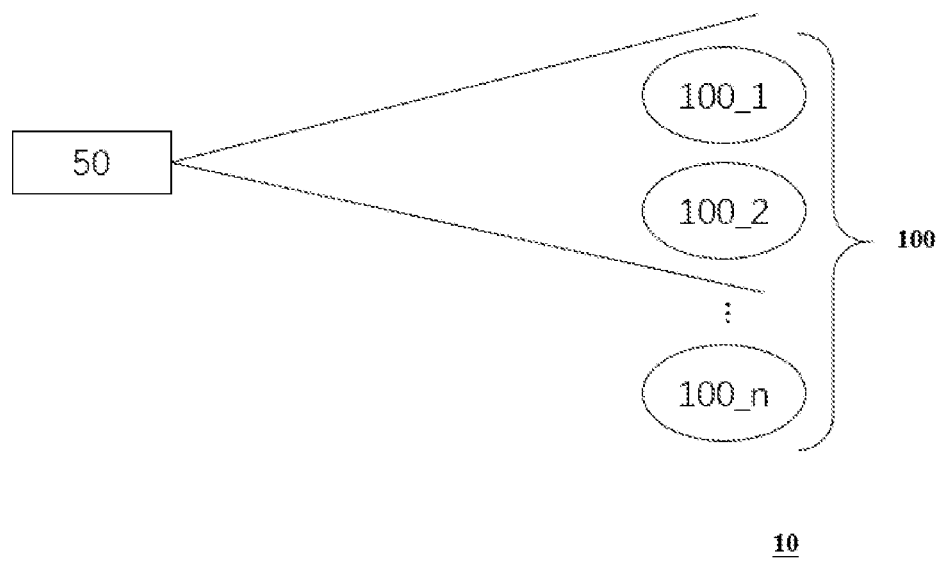
FIGS. 17, 18A-18C are schematic structural diagrams of lighting systems in accordance with some embodiments of the present disclosure.

Referring to FIG. 17, which is a schematic structural diagram of a lighting systems in accordance with some embodiments of the present disclosure. The lighting system 10 includes an infrared remote controller 50 and a lamp set 100. The infrared remote controller 50 is a kind of control interface. In this embodiment, the lamp set 100 includes lamps 100\_1, 100\_2 . . . 100\_*n*. The lamp is provided with an infrared signal receiving device and is configured to receive the infrared control signal from the infrared remote controller 50 and adjust the luminance of the lamp based on the infrared control signal. The infrared remote controller 50 is configured to generate infrared control signals. Since the infrared signal has directivity, when the infrared remote control 50 is configured to dim the lamp set 100, the lamps 100\_1 and 100\_2 within the signal range of the infrared remote control 50 can receive the infrared control signal and perform dimming. However, other lamps that are not within the signal range of the infrared remote controller 50 cannot receive the infrared control signal, and therefore the dimming cannot be performed.

In some embodiments, the infrared remote controller 50 can also control the color temperature of the lamp set 100, and the present disclosure is not limited thereto.

Figure 18A:
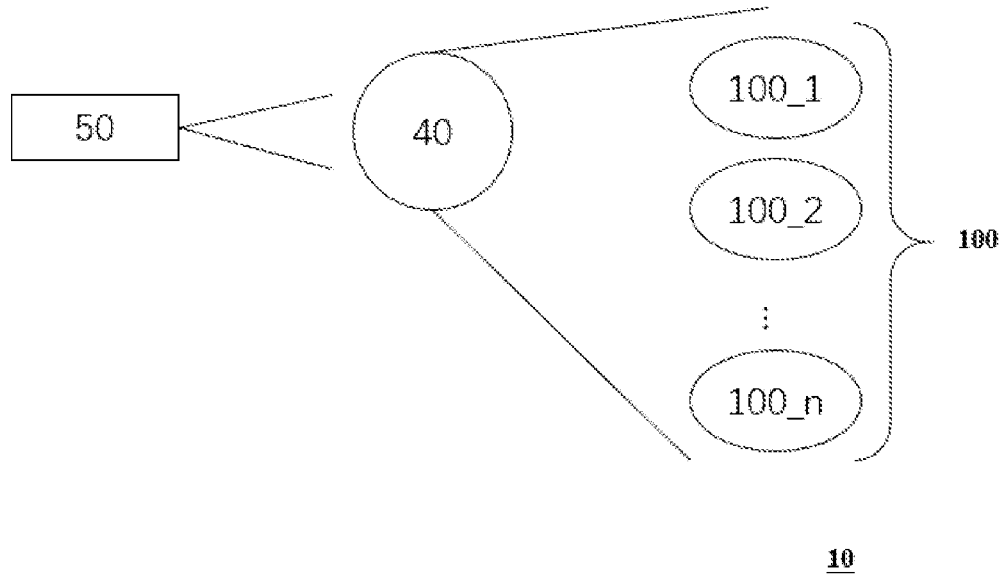

Referring to FIG. 18A, which is a schematic frame diagram of a lighting system in accordance with some embodiments of the present disclosure The lighting system 10 in this embodiment is similar to the embodiment shown in FIG. 17. The difference is that, the lighting system 10 in this embodiment further includes an infrared repeater 40.

Figure 19A:
FIGS. 19A-19B are schematic diagrams of circuit structures of infrared repeaters in accordance with some embodiments of the present disclosure.

The infrared repeater is disposed between the infrared remote controller 50 and the lamp set 100. FIG. 19A is a schematic diagram of a circuit structure of an infrared repeater in accordance with some embodiments of the present disclosure. The infrared repeater 40 includes an infrared signal receiving module 41, an infrared signal amplifying module 42, and an infrared signal transmitting module 43. The infrared signal receiving module 41 is configured to receive the infrared control signal from the infrared remote controller 50 and transmit the infrared control signal to the infrared signal amplifying module 42. The infrared signal amplifying module 42 performs operational amplification processing on the received infrared control signal, and sends the amplified infrared control signal to the infrared signal transmitting module 43. The infrared signal transmitting module 43 transmits the amplified infrared control signal. Through this configuration, the infrared repeater 40 amplifies the received infrared control signal, the power intensity of the infrared control signal is amplified, and the coverage angle of the infrared control signal is amplified as well, so that the infrared control signal can cover a larger space, and the problem of insufficient signal coverage of the remote control can be solved. The infrared control signal relayed and amplified by the infrared repeater can cover all the lamps in the use scenario, so that all lamps can be uniformly dimmed and controlled to increase the consistency of dimming.

In some embodiments, the infrared signal received and amplified by the infrared repeater is not limited to the infrared control signal in the lighting system. Similarly, other infrared control signals can be, for example, the infrared control signal of a TV set, the infrared control signal of an air conditioner, etc. All can use the infrared repeater in the present disclosure for relay amplification to obtain better signal coverage.

The infrared remote control 50 needs to be configured for mobile use, and generally uses dry batteries for power supply, the transmission power is small, and the effective transmission distance of the wireless control signal is limited. Since the infrared repeater 40 does not need to move frequently, it can be powered by lithium batteries or mains electricity, so the amplified infrared control signal has greater power and can transmit longer distances. The infrared repeater 40 can be set independently, and can also be integrated with one or more lamps in the lamp set 100, or integrated into other household appliances.

Figure 18B:
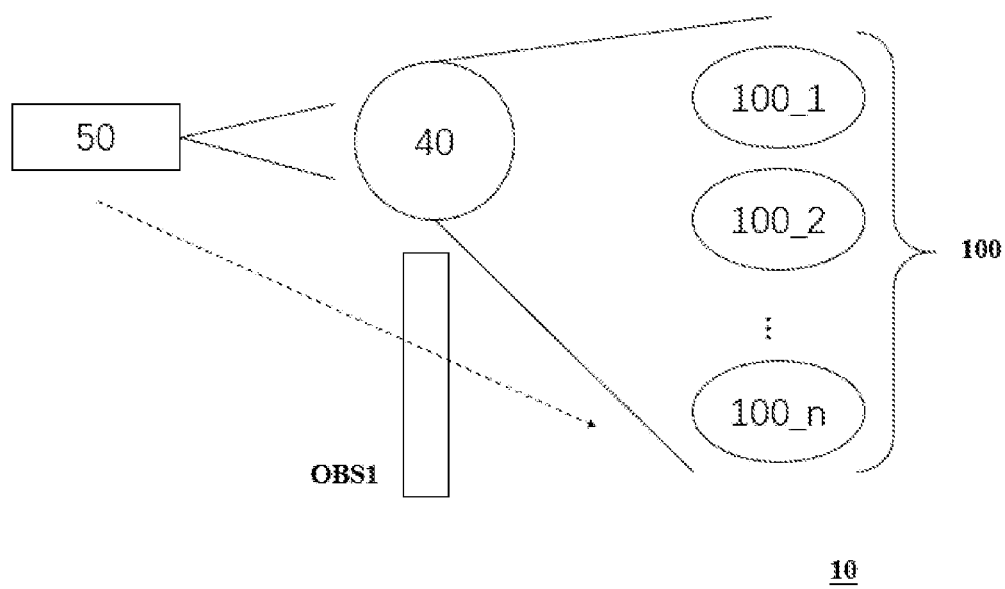

Referring to FIG. 18B, which is a schematic structural diagram of a lighting system in accordance with some embodiments of the present disclosure. In this embodiment, there is an obstacle OBS1 between the infrared remote control 50 and the lamp set 100. If the infrared repeater 40 is not arranged, the infrared signal of the infrared remote control 50 is blocked by the obstacle OBS1 and cannot completely cover the lights in the lamp set 100. Some lamps in the lamp set 100 cannot be configured normally because those lamps cannot receive control signals. After the infrared repeater 40 is arranged in the system, the control signal of the infrared remote control 50 can be relayed by the infrared repeater 40 to increase the coverage angle of the control signal, thereby covering all lamps in the lamp set 100 and ensuring the lighting system 10 operates normally.

Since the propagation of infrared signals is directional and the coverage angle of a single infrared emission component is limited, in order to obtain a larger coverage angle, the infrared emission module 43 can be configured with multiple infrared emission components. Multiple emitting components are arranged in an array to obtain a larger emitting angle. As shown in FIGS. 18A-18B, the infrared repeater 40 has a larger signal emission angle than the infrared remote control 50 and can cover all lamps in the lamp set 100.

Figure 18C:
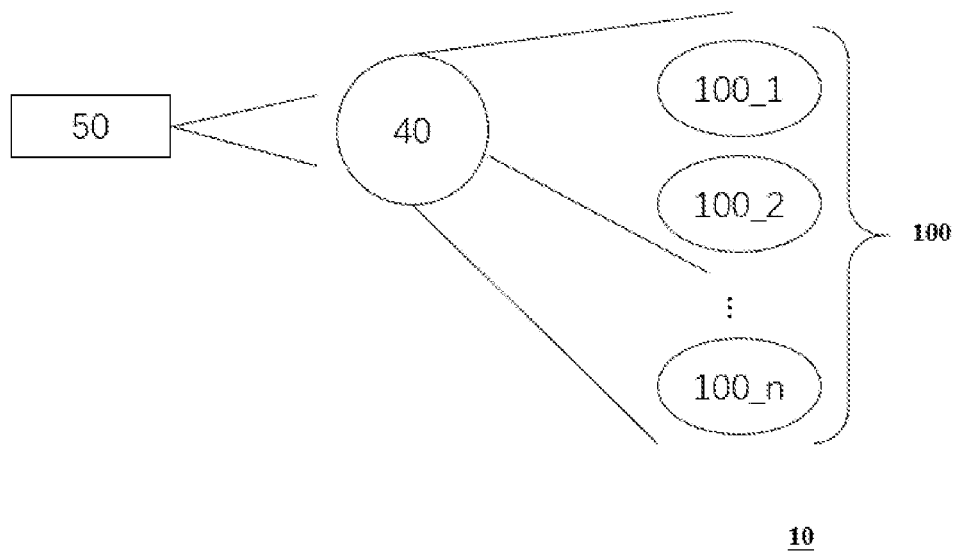

Referring to FIG. 18C, it is a schematic frame diagram of a lighting system in accordance with some embodiments of the present disclosure. Group control of the lamps in the lamp set 100 can be realized through the infrared repeater 40. For example, the lamps 100_1 and 1002 may be set as group 1, and the other lamps may be set as group 2. Group control can be performed by setting different channels. The lamps in group 1 can recognize the control signal of the first channel, the lamps in group 2 can recognize the control signal of the second channel, and the lamps in group 1 and group 2 can both receive the control signal of the third channel. The infrared remote control 50 dims the lamps of group 1 through the signal of the first signal, dims the lamps of group 2 through the signal of the second channel, and simultaneously dims the lamps of group 1 and group 2 through the signal of the third channel. The three channels are independent of each other and do not interfere with each other. The lamps in group 1 are not controlled by the signal of the second channel, and the lamps in group 2 are not controlled by the signal of the first channel. In this embodiment, more groups can be set to control the lamps, and the number of channels can be correspondingly increased as required, but the present disclosure is not limited to thereto.

Figure 19B:
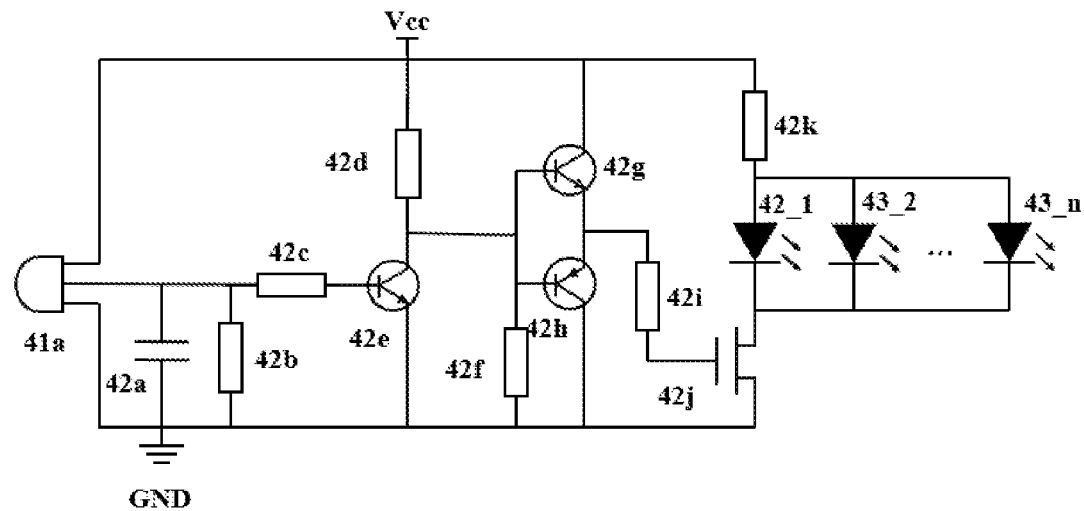

Referring to FIG. 19B, which is a schematic diagram of a circuit structure of an infrared repeater in accordance with some embodiments of the present disclosure. Referring to FIG. 19A, the infrared repeater 40 includes an infrared signal receiving module 41, an infrared signal amplifying module 42 and an infrared signal transmitting module 43. The infrared signal receiving module 41 includes an infrared receiving probe 41a. The first pin of the infrared receiving probe 41a is electrically connected to a common power supply end Vcc, the second pin is electrically connected to the first pin of the capacitor 42a, and the third pin is electrically connected to a common ground end GND. The infrared receiving probe 41a is configured to receive the infrared control signal and convert the optical signal into electrical signal.

The infrared signal amplifying module 42 receives the electrical signal generated by the infrared receiving probe 41a, and performs operational amplification processing. The infrared amplification module 42 includes a capacitor 42a, resistors 42b, 42c, 42d, 42f, 42i and 42k, transistors 42e, 42g and 42h, and a MOSFET 42j. The second pin of the capacitor 42a is electrically connected to a common ground end GND. The resistor 42b and the capacitor 42a are connected in parallel. The first pin of the resistor 42c is electrically connected to the first pin of the capacitor 42a, and the second pin of the resistor 42c is electrically connected to the first pin of the transistor 42e. The second pin of the transistor 42e is electrically connected to the second pin of the resistor 42d, and the third pin thereof is electrically connected to the common ground end GND. The first pin of the resistor 42d is electrically connected to the common power end Vcc. The first pin of the transistor 42g and the first pin of the transistor 42h are electrically connected to the second pin of the transistor 42e and the first pin of the resistor 42f. The second pin of the resistor 42f is electrically connected to the common ground end GND. The second pin of the transistor 42g is electrically connected to a power supply end Vcc, and the third pin thereof is electrically connected to the second pin of the transistor 42h. The third pin of the transistor 42h is electrically connected to the common ground end GND. The first pin of the resistor 42i is electrically connected to the third pin of the transistor 42g, and the second pin of the resistor 42i is electrically connected to the first pin of the MOSFET 42j. The second pin of the MOSFET 42j is electrically connected to the cathode of the infrared light emitting diode 43_1, and the third pin thereof is electrically connected to the common ground end GND. The first pin of the resistor 42k is electrically connected to a power supply end Vcc, and the second pin of the resistor 42k is electrically connected to the anode of the infrared light emitting diode 43_1.

The infrared emitting module 43 includes infrared light emitting diodes 43-1, 43_2 . . . 43_n (n is an integer greater than or equal to 1). The infrared light-emitting diodes 43-1-43_n are connected in parallel and arranged in an array structure to increase the emission angle of infrared signals.

Figure 20:
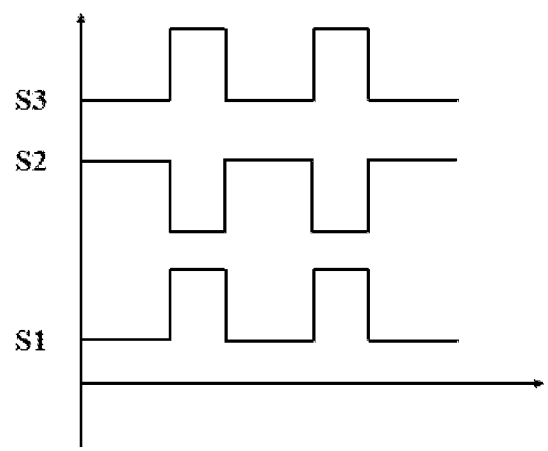
FIG. 20 is a schematic diagram of a working waveform of an infrared repeater in accordance with some embodiments of the present disclosure.

Referring to FIG. 20, which is a schematic diagram of a working waveform of an infrared repeater in accordance with some embodiments of the present disclosure. The working principle of the infrared repeater would be described below with reference to FIG. 19B. S1 is the infrared signal received by the infrared repeater 40, S2 is a schematic diagram of the waveform output by the infrared receiving probe 41a, and S3 is a schematic diagram of the output waveform of the infrared repeater 40. When the signal S1 is at a low level, the infrared receiver probe 41a outputs a high level signal, the transistor 42e is turned on, and the transistors 42g and 42h form a totem pole to improve the signal driving capability, and output and input signal thereof are set to be consistent, so the driving ability can be increased. The III signal received by the MOSFET 42j is a signal output by the totem pole, which is a low-level signal. At this time, the MOSFET 42j is disconnected, and the infrared light-emitting diodes 43_1, 43_2 . . . 43_n are not lit, that is, S3 is low level. When S1 is at a high level, the infrared receiving probe 41a outputs a low level signal, and the transistor 42e is cut-off. The infrared light-emitting diodes 43_1, 43_2 . . . 43_n light up, that is, S3 is high level.

Through this circuit configuration, the direction of level of S1 and S2 can be kept consistent, since the infrared emitting module 43 is included with a plurality of infrared light-emitting diodes, and the infrared repeater 40 can output a high-power infrared signal, so as to realize the amplification of the input signal. Through arranging the infrared light-emitting diodes in an array, the signal coverage of the infrared repeater can be significantly improve. Through the circuit architecture of this embodiment, only discrete components are configured to realize the relay amplification function of infrared signals, which is low in cost and high in system reliability.

Figure 21:
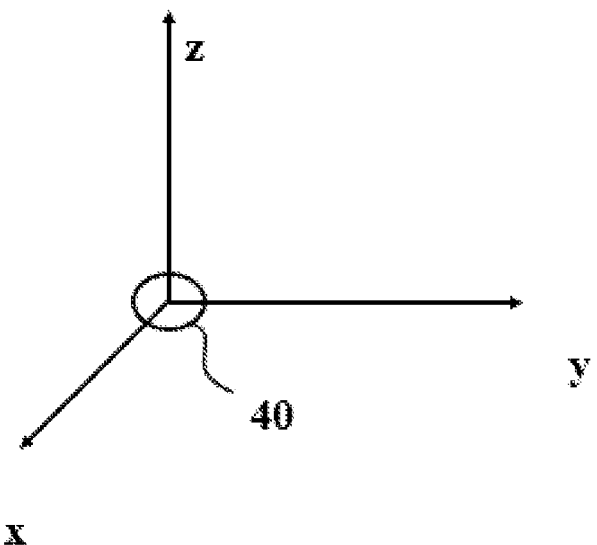
FIG. 21 is a schematic diagram of signal coverage of an infrared repeater in accordance with some embodiments of the present disclosure.

Referring to FIG. 21, which is a schematic diagram of signal coverage of an infrared repeater in accordance with some embodiments of the present disclosure, and the emission angle of the infrared repeater would be described. A three-dimensional coordinate system is established with the infrared repeater 40 as the center. The infrared repeater 40 includes a plurality of infrared emitting components, and the array of multiple infrared emitting components is distributed on the infrared repeater 40. The coverage angles of different infrared emitting components are partially overlapped, to achieve a larger angle of signal coverage. For example, setting a certain number of infrared emitting components in the positive direction of the z-axis can achieve signal coverage in the $Z \geq 0$ space or. In some embodiments, full-space signal coverage can be achieved by setting more infrared emitting components.

Similarly, in order to increase the use scenarios of the infrared repeater and obtain a more perfect use experience, the infrared receiving module 41 can be configured with multiple infrared receiving components, and multiple infrared receiving components can be arranged in an array to obtain a larger receiving angle, so as to receive infrared control signals from all directions.

The infrared repeater 40 receives the infrared control signal from the infrared remote control 50, and after performing amplification processing, an amplified infrared control signal can be generated. The amplification processing of the infrared repeater 40 includes two levels, one is to amplify the signal strength, so that the infrared control signal has greater power; and another is to amplify the angle of the signal, so that the infrared control signal has greater coverage angle.

What is claimed is:

1. An LED lamp lighting system, comprising:
    a dimmer including an input end electrically connected to a first external power input, the dimmer configured to convert a received external power signal into a dimming power signal based on a dimming command, and the dimming power signal comprising dimming information; and
    an LED lamp, electrically connected to an output end of the dimmer and a second external power input, and configured to execute a dimming operation based on a received dimming power signal,
    wherein the dimmer comprises:
    a dimming signal generating module, configured to generate a dimming signal based on the received dimming command;
    a zero-crossing detecting module, electrically connected to the first external power input and the output end of the dimmer, and configured to detect a zero-crossing point of the external power signal and generate a zero-crossing signal;
    a data modulating module, electrically connected to the first external power input, and configured to rectify the external power signal and load the dimming signal onto the external power signal to generate the dimming power signal;
    a filtering circuit, electrically connected to the data modulating module, and configured to filter a received signal to generate a filtered signal;
    a power supply module, electrically connected to the filtering circuit, and configured to execute a power conversion to the filtered signal to generate a power supply signal for use of the dimmer; and
    a control module, electrically connected to the zero-crossing detecting module to receive the zero-crossing signal, start to execute the data modulation at a specific time after the zero-crossing, and load the dimming signal onto the external power signal to generate the dimming power signal.

2. The LED lamp lighting system of claim 1, wherein the external power signal is a mains AC signal, and the dimmer executes a phase-cutting processing on the external power signal based on the dimming command to generate the dimming power signal.

3. The LED lamp lighting system of claim 2, wherein a phase cutting angle of the phase-cutting processing is less than 90 degrees, and the degree of the phase cutting angle corresponds to a luminance of the LED lamp.

4. The LED lamp lighting system of claim 3, wherein when the phase cutting angle is a constant value, the luminance of the LED lamp remains unchanged when the amplitude of the external power signal changes.

5. The LED lamp lighting system of claim 1, wherein the dimming signal generating module comprises a wireless remote controller and a signal receiving module, the wireless remote controller is configured to convert the dimming command into a wireless dimming signal, and the signal receiving module is configured to convert the wireless dimming signal into the dimming signal.

6. The LED lamp lighting system of claim 5, wherein the dimming signal generating module comprises a light sensing module, and the light sensing module generates the dimming signal based on the intensity of ambient light.

7. The LED lamp lighting system of claim 1, wherein the data modulating module comprises a first diode, a second diode, a first Zener diode, a first transistor, a second transistor and a third transistor;
    an anode of the first diode is electrically connected to the first external power input and a first pin of the first transistor, and a cathode of the first diode is electrically connected to a cathode of the second diode and a cathode of the first Zener diode;
    a second pin of the first transistor is electrically connected to a second pin of the second transistor and a first circuit node, and a third pin of the first transistor is electrically connected to the control module;
    a first pin of the second transistor is electrically connected to an anode of the second diode and an output end of the dimmer, and a third pin of the second transistor is electrically connected to the control module; and
    a first pin of the third transistor is electrically connected to an anode of the first Zener diode, and a second pin of the third transistor is electrically connected to the third pin of the second transistor, and a third pin of the third transistor is electrically connected to the control module.

8. The LED lamp lighting system of claim 7, wherein the external power signal is mains alternating current, and within half an AC cycle, the data modulating module comprises three working stages: a supply stage, a power stage and a data stage.

9. The LED lamp lighting system of claim 8, wherein the external power signal is configured to provide power to the dimmer in the supply stage, the external power signal is configured to provide power to the LED lamp in the power stage, and during the data stage, the dimmer is configured to load the dimming signal onto the external power signal to generate the dimming power signal.

10. The LED lamp lighting system of claim 8, wherein in the supply stage, the first transistor and the second transistor are in an off state.

11. The LED lamp lighting system of claim 8, wherein in the power stage, the first transistor and the second transistor are in a conducting state.

12. The LED lamp lighting system of claim 8, wherein in the data stage, the first transistor and the second transistor work in an amplification region, and the third transistor is turned on intermittently.

13. The LED lamp lighting system of claim 1, further comprising a fault detecting module, the fault detecting module being electrically connected to the dimmer and configured to bypass the dimmer and execute a fault detection.

14. The LED lamp lighting system of claim 13, wherein the fault detecting module comprises a first switch, and the first switch is electrically connected to the input end and the output end of the dimmer.

15. The LED lamp lighting system of claim 1, further comprising a sensor electrically connected to the dimmer and the LED lamp and configured to change a circuit state of the sensor based on environmental variation.

16. The LED lamp lighting system of claim 15, wherein the environmental variation is the intensity of ambient light, or whether a human body or ambient sound is detected.

17. The LED lamp lighting system of claim 15, wherein the sensor comprises:
- a rectifying circuit, electrically connected to an external power source and configured to rectify the received external power signal to generate a rectified signal;
- a filtering circuit, electrically connected to the rectifying circuit and configured to filter the rectified signal to generate a filtered signal;
- a power converting circuit, electrically connected to the filtering circuit and configured to execute a power conversion to the filtered signal to generate a low-voltage DC signal;
- a switch component, electrically connected to a power supply circuit of the LED lamp and serially connected with the LED lamp to turn the power supply circuit on or off; and
- a sensor control module, electrically connected to the power converting circuit and the switching component and configured to operate using the low-voltage DC signal, and control the on-off state of the switching component based on the environmental variation.

* * * * *